Dec. 2, 1969   R. J. EMINGER ET AL   3,481,372
COIL FORMING METHOD AND APPARATUS
Filed May 22, 1967   29 Sheets-Sheet 1
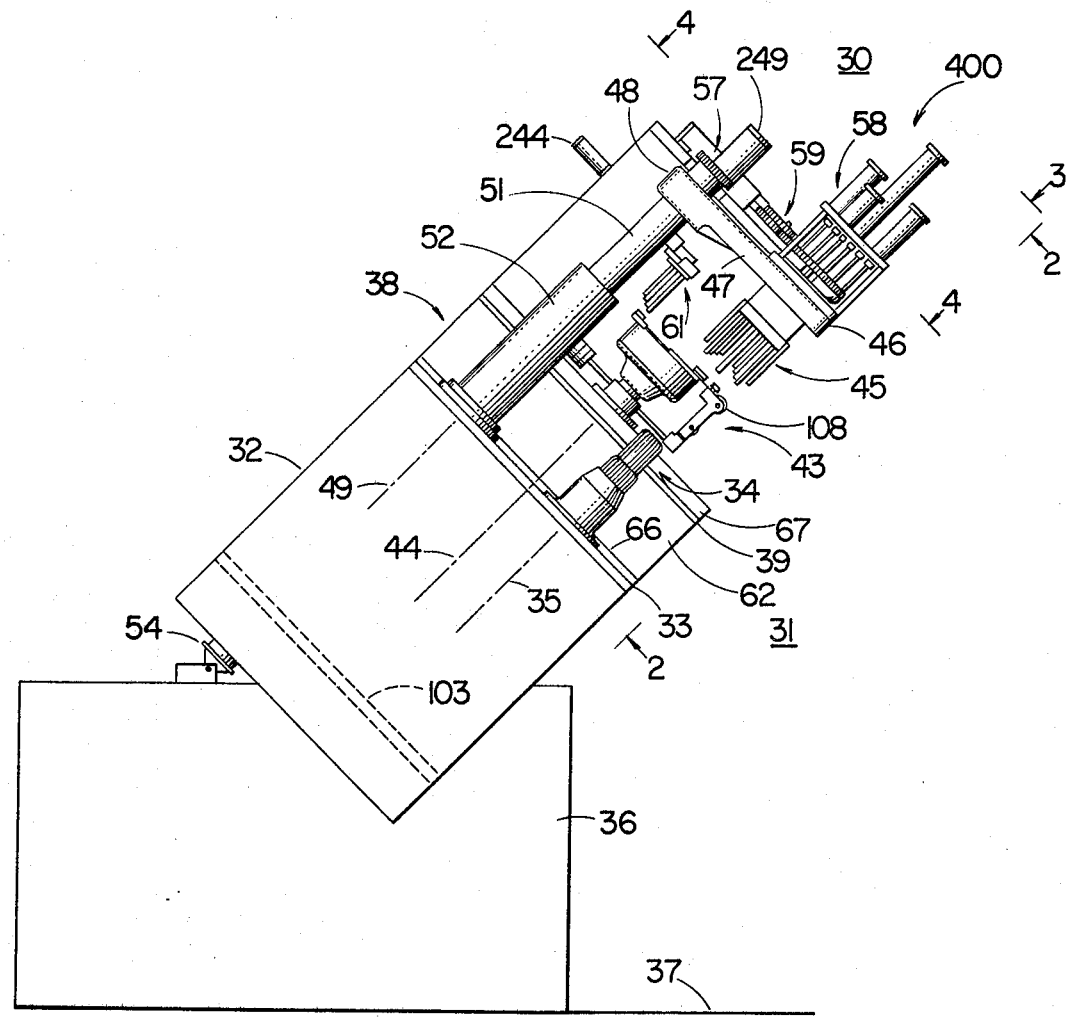
INVENTORS
ROBERT J. EMINGER
CLAYTON L. TYSON
BY Hood, Dust & Irish
ATTORNEYS Dec. 2, 1969   R. J. EMINGER ET AL   3,481,372
COIL FORMING METHOD AND APPARATUS
Filed May 22, 1967   29 Sheets-Sheet 2
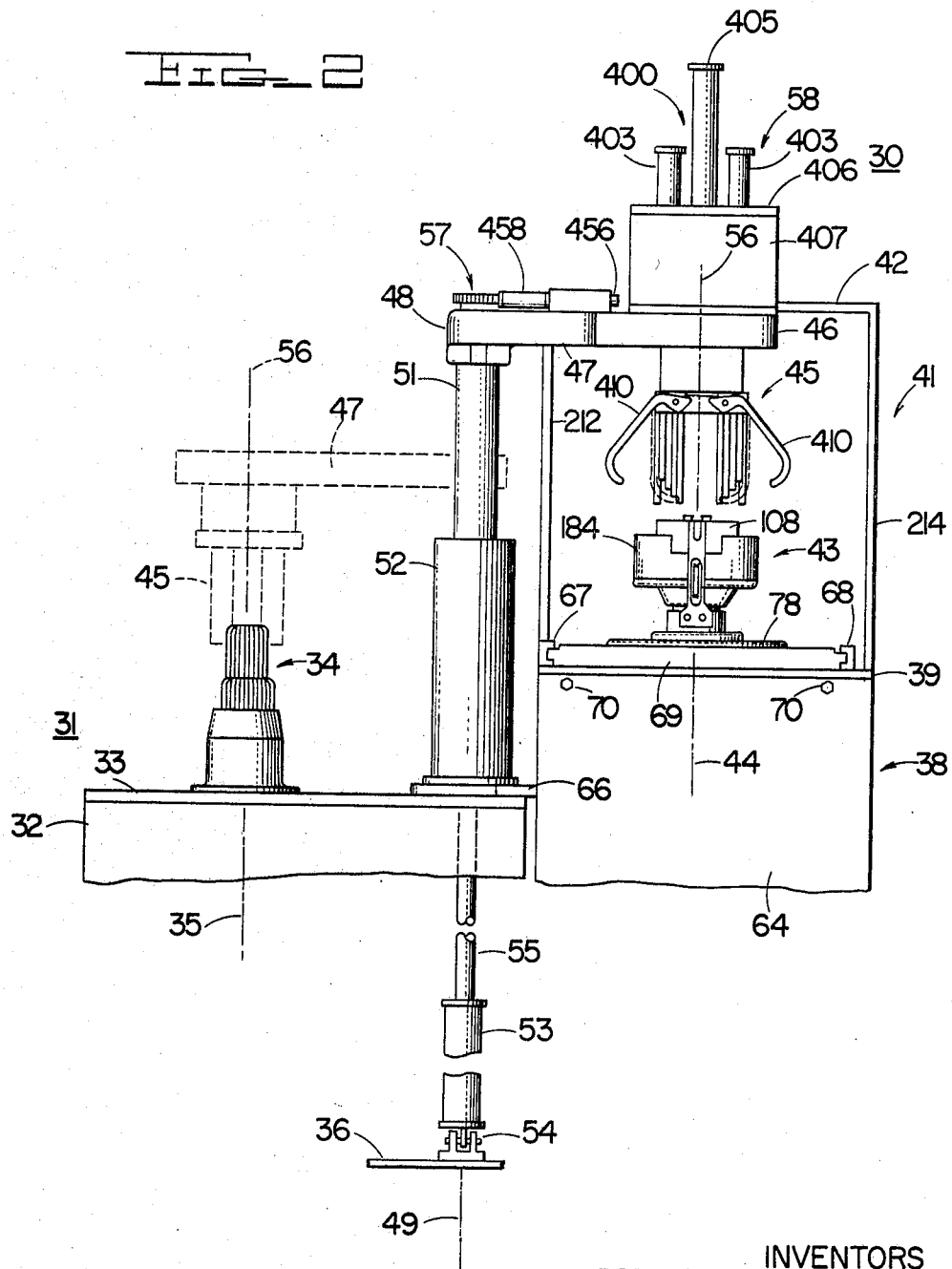
INVENTORS
ROBERT J. EMINGER
CLAYTON L. TYSON
BY Wood, Gust & Irish
ATTORNEYS Dec. 2, 1969  R. J. EMINGER ET AL  3,481,372
COIL FORMING METHOD AND APPARATUS
Filed May 22, 1967  29 Sheets-Sheet 3
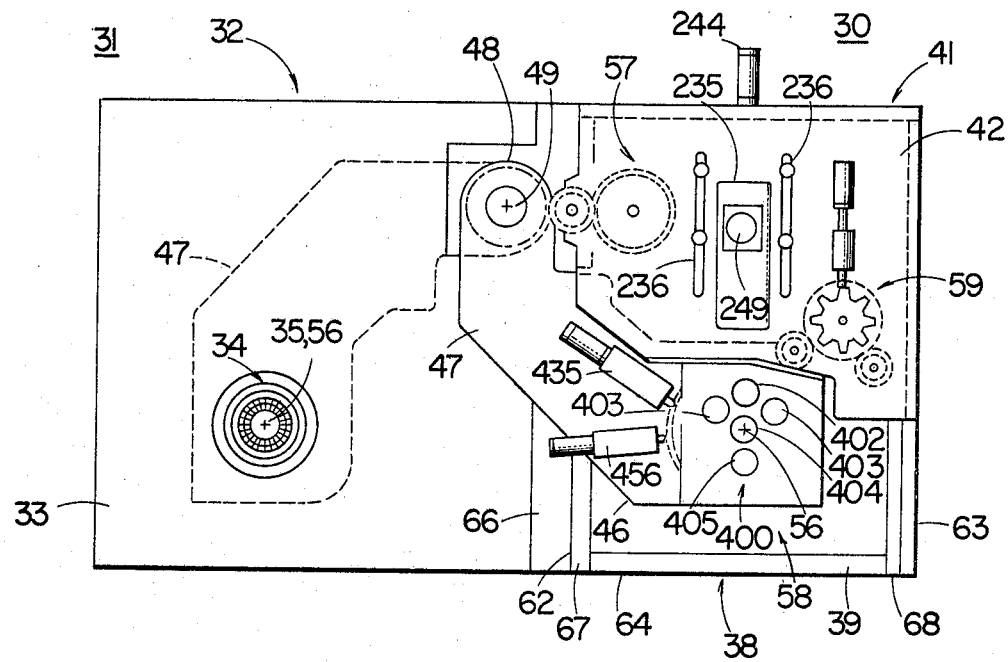
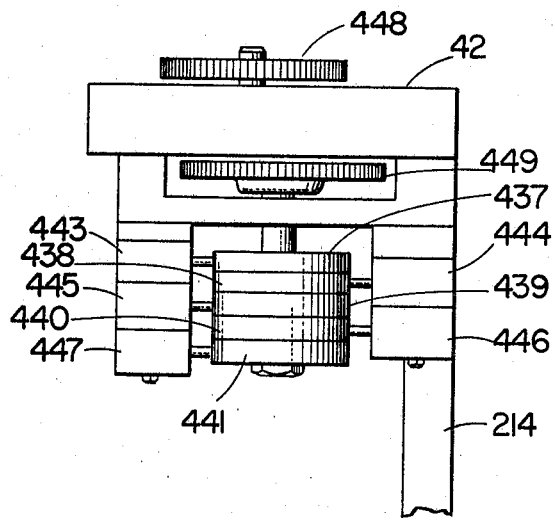
INVENTORS
ROBERT J. EMINGER
CLAYTON L. TYSON
BY Hood, Gust + Irish
ATTORNEYS Dec. 2, 1969     R. J. EMINGER ET AL     3,481,372
COIL FORMING METHOD AND APPARATUS
Filed May 22, 1967                        29 Sheets-Sheet 4

INVENTORS
ROBERT J. EMINGER
CLAYTON L. TYSON
BY Wood, Sust & Irish
ATTORNEYS

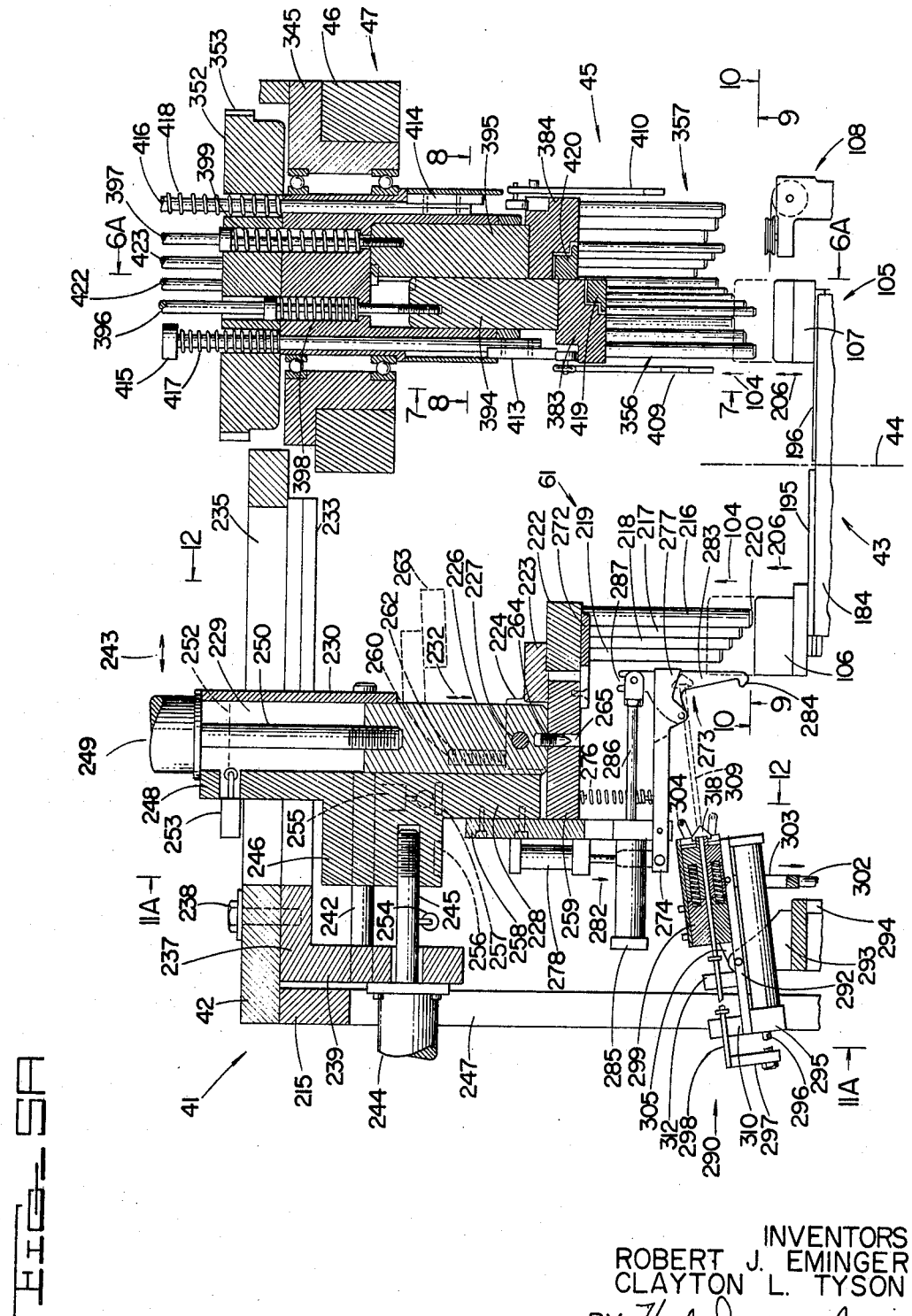

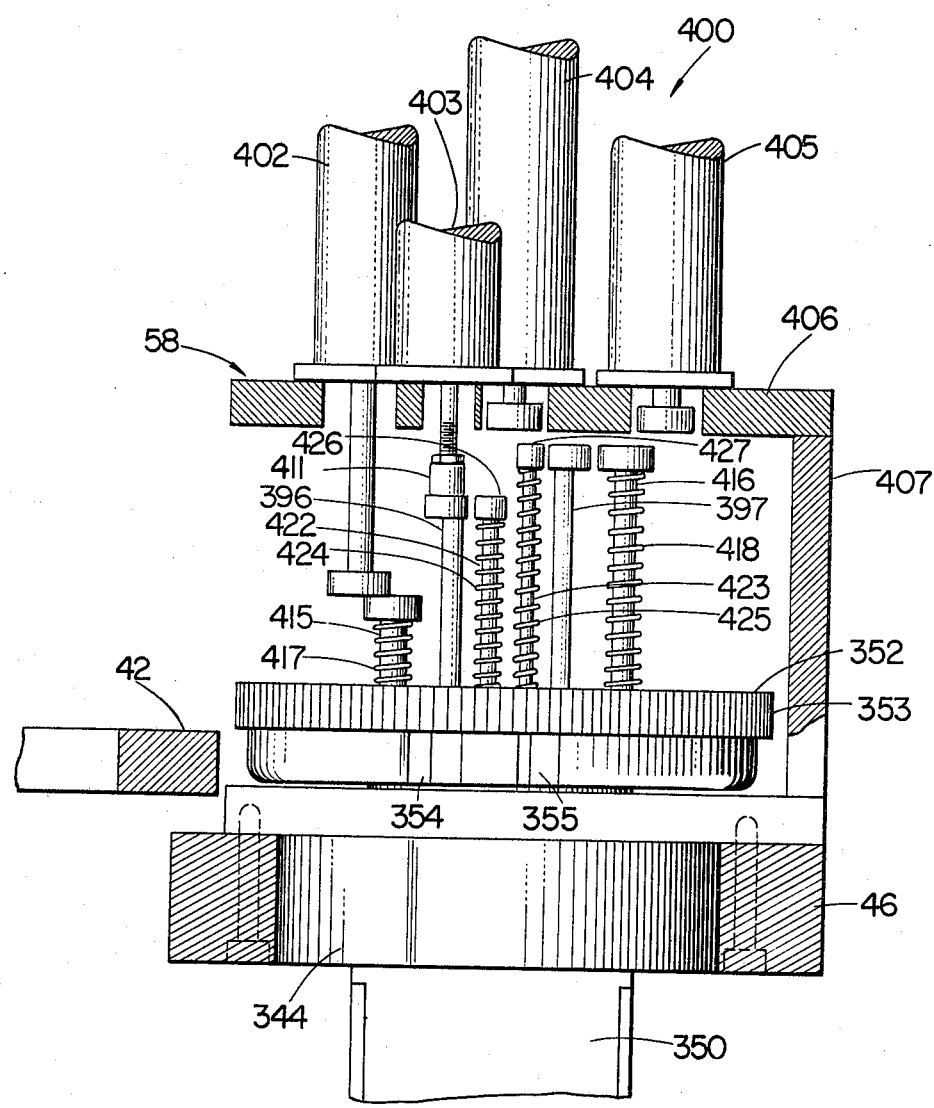

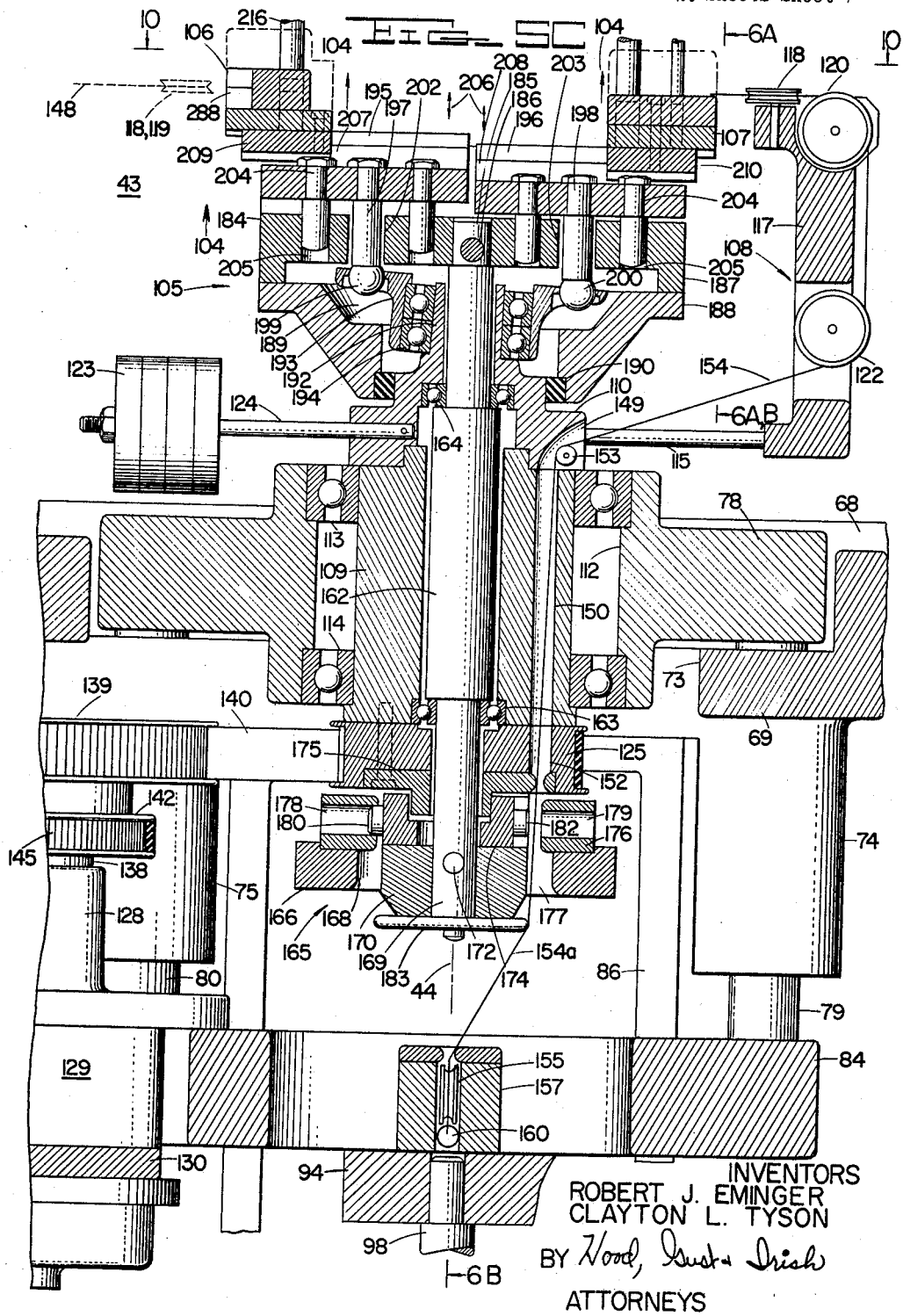

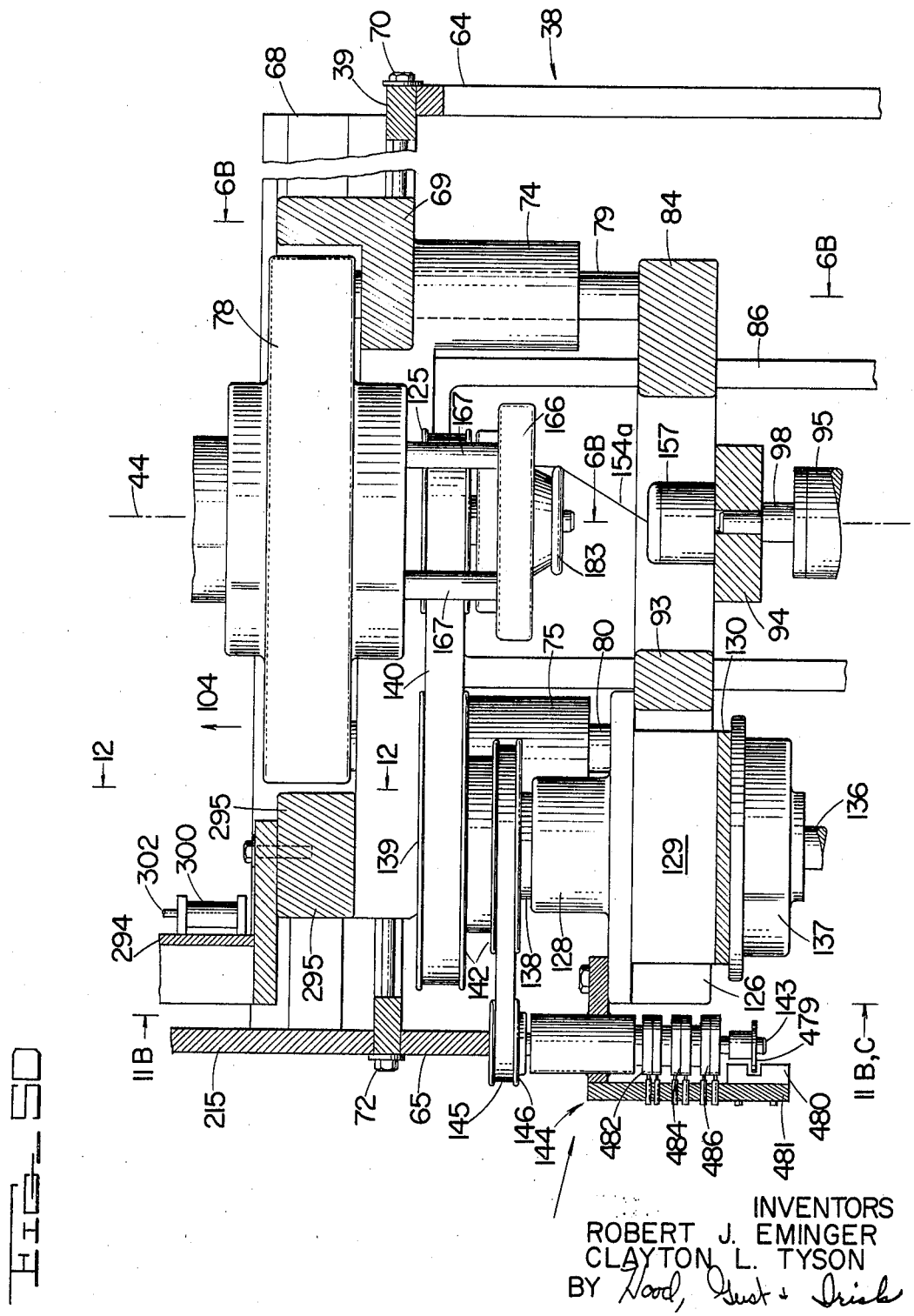

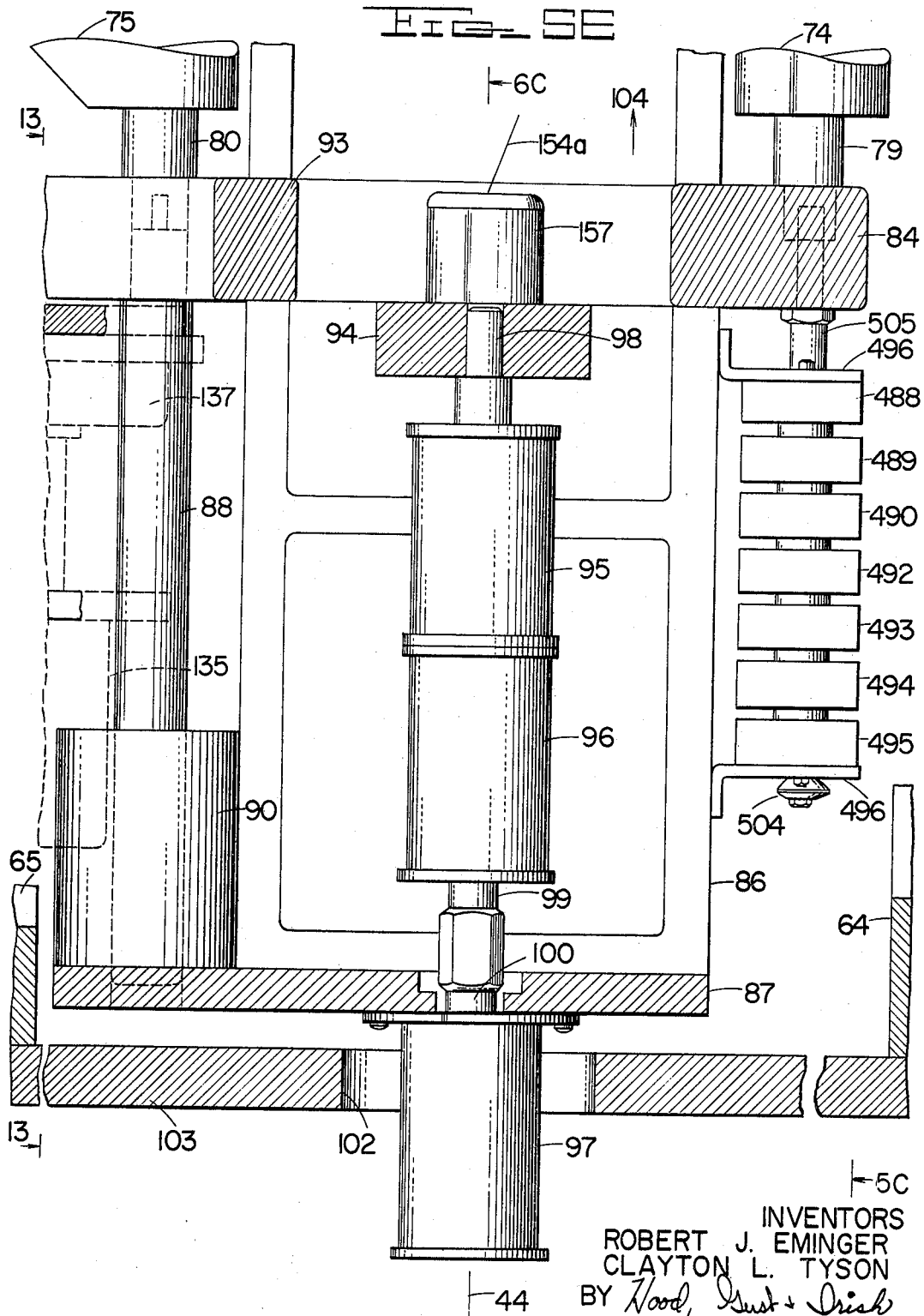

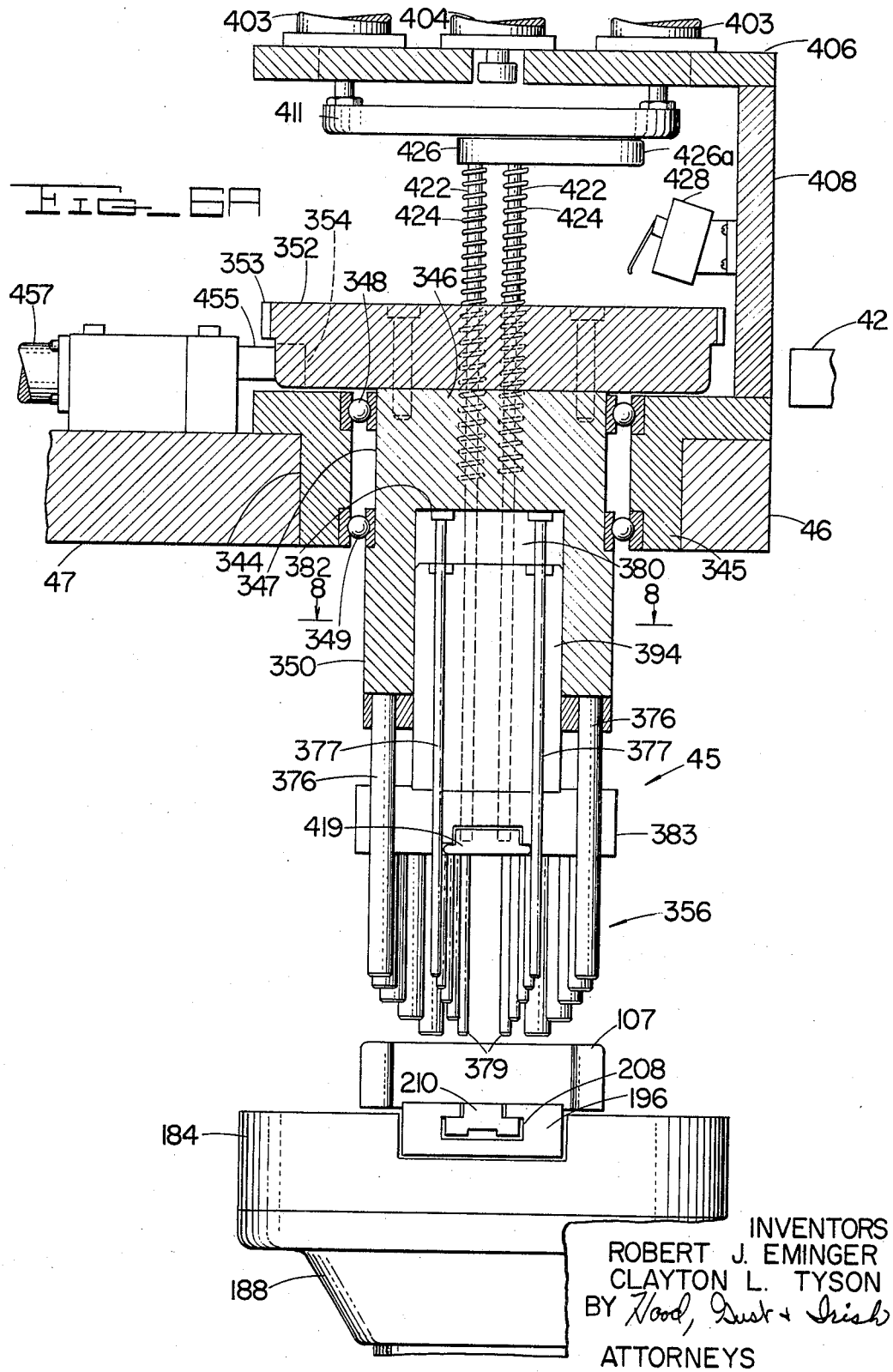

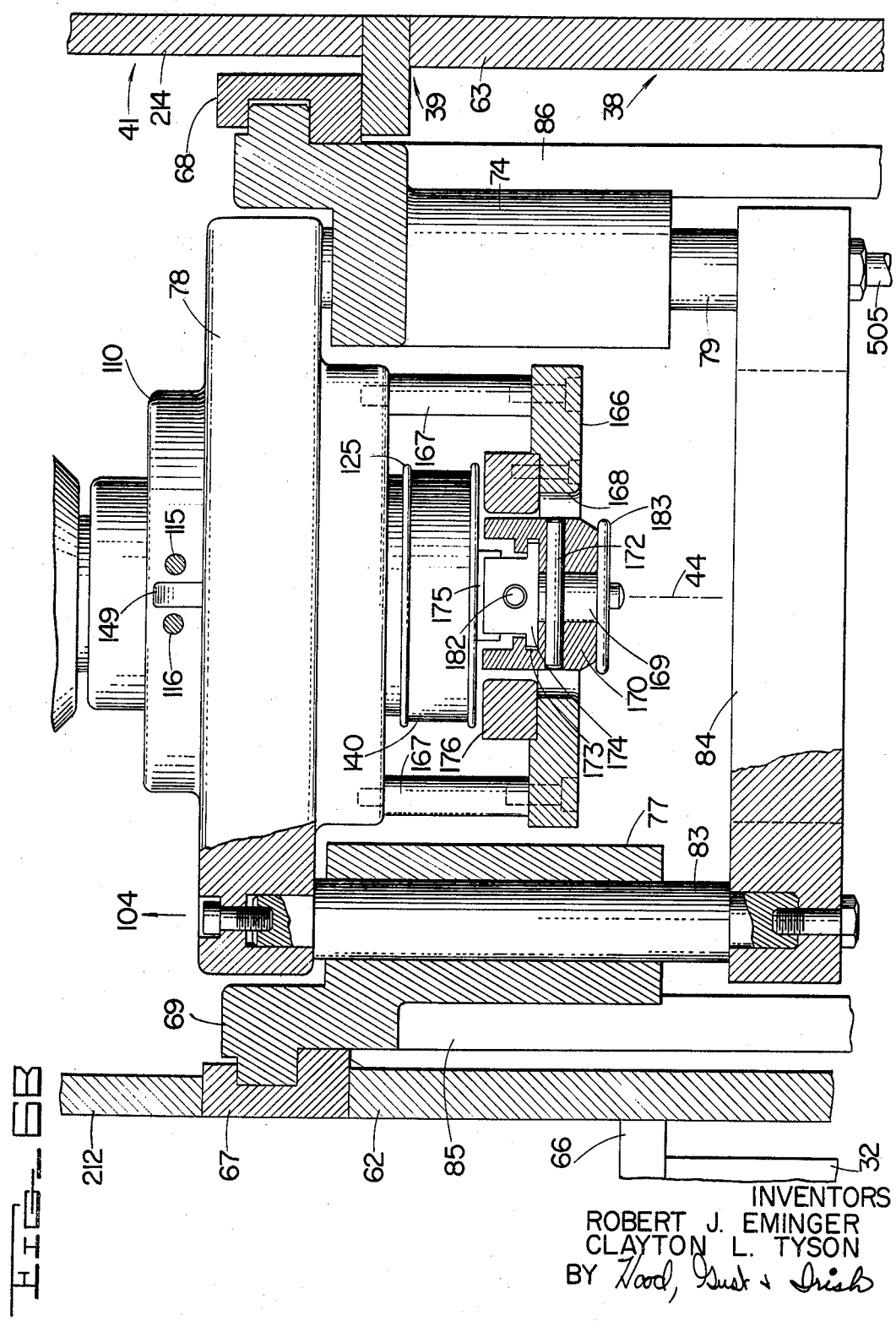

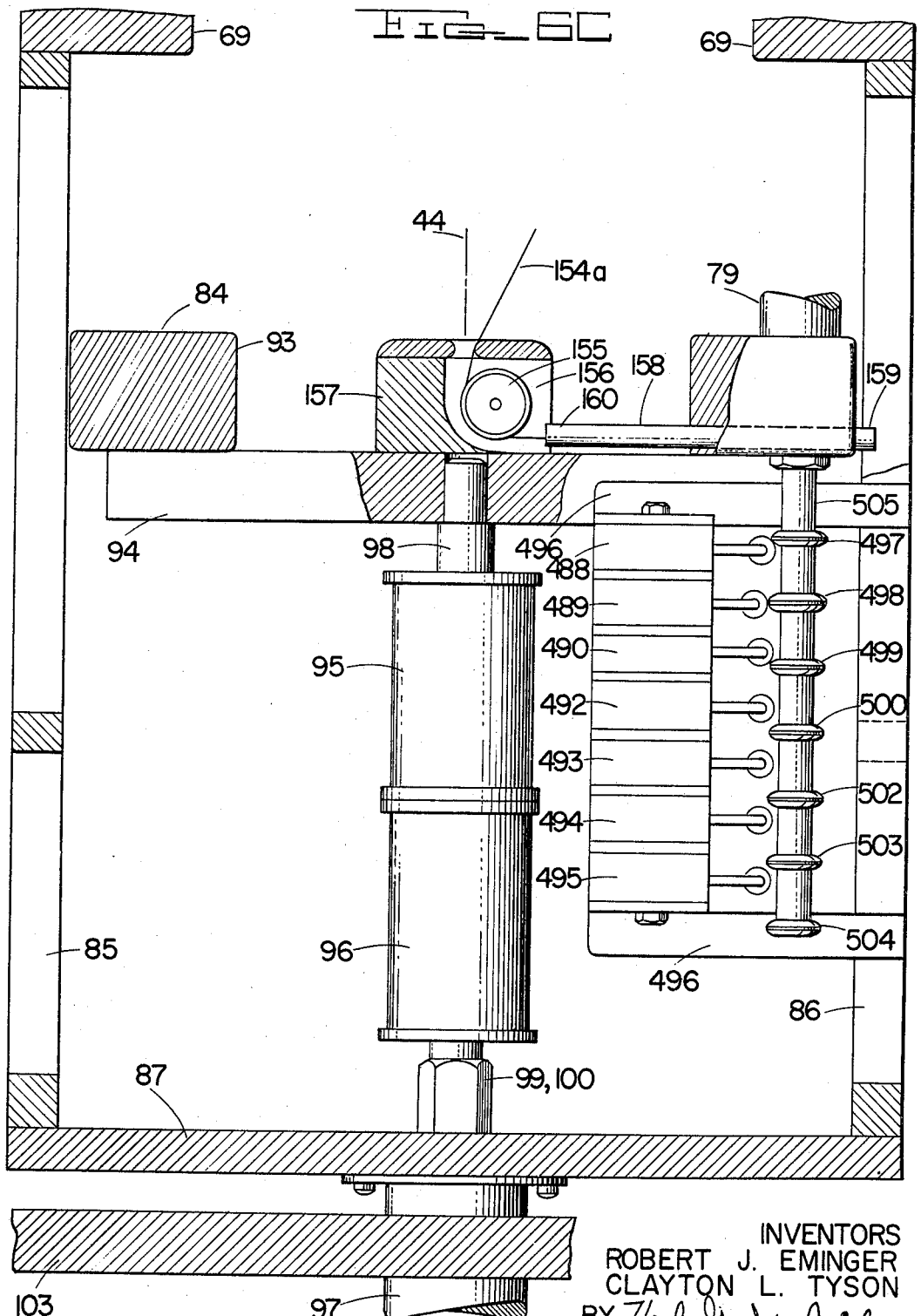

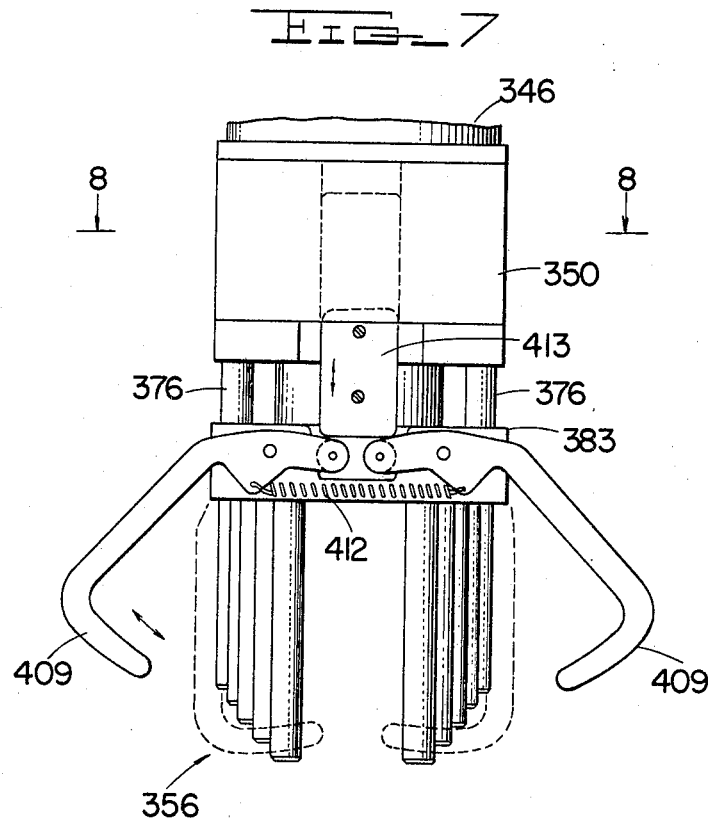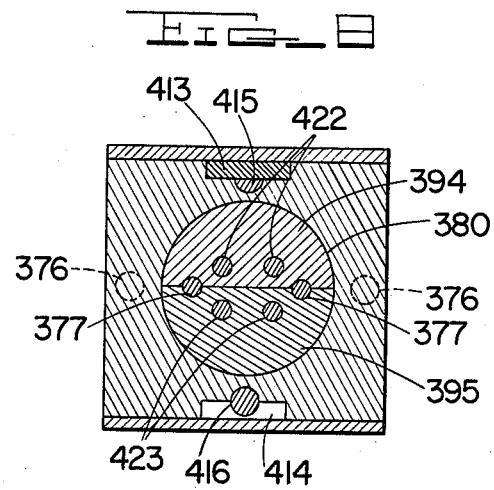

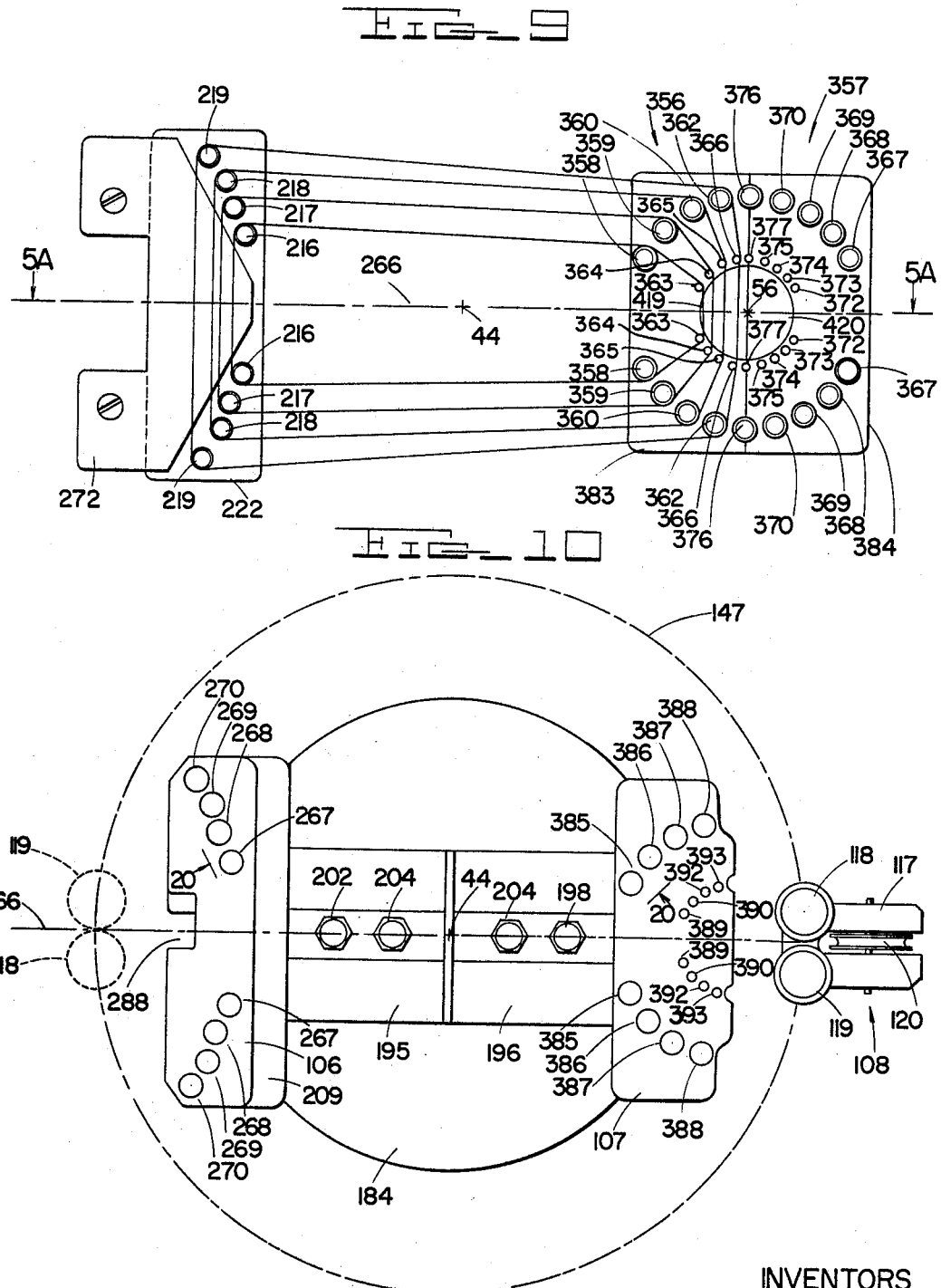

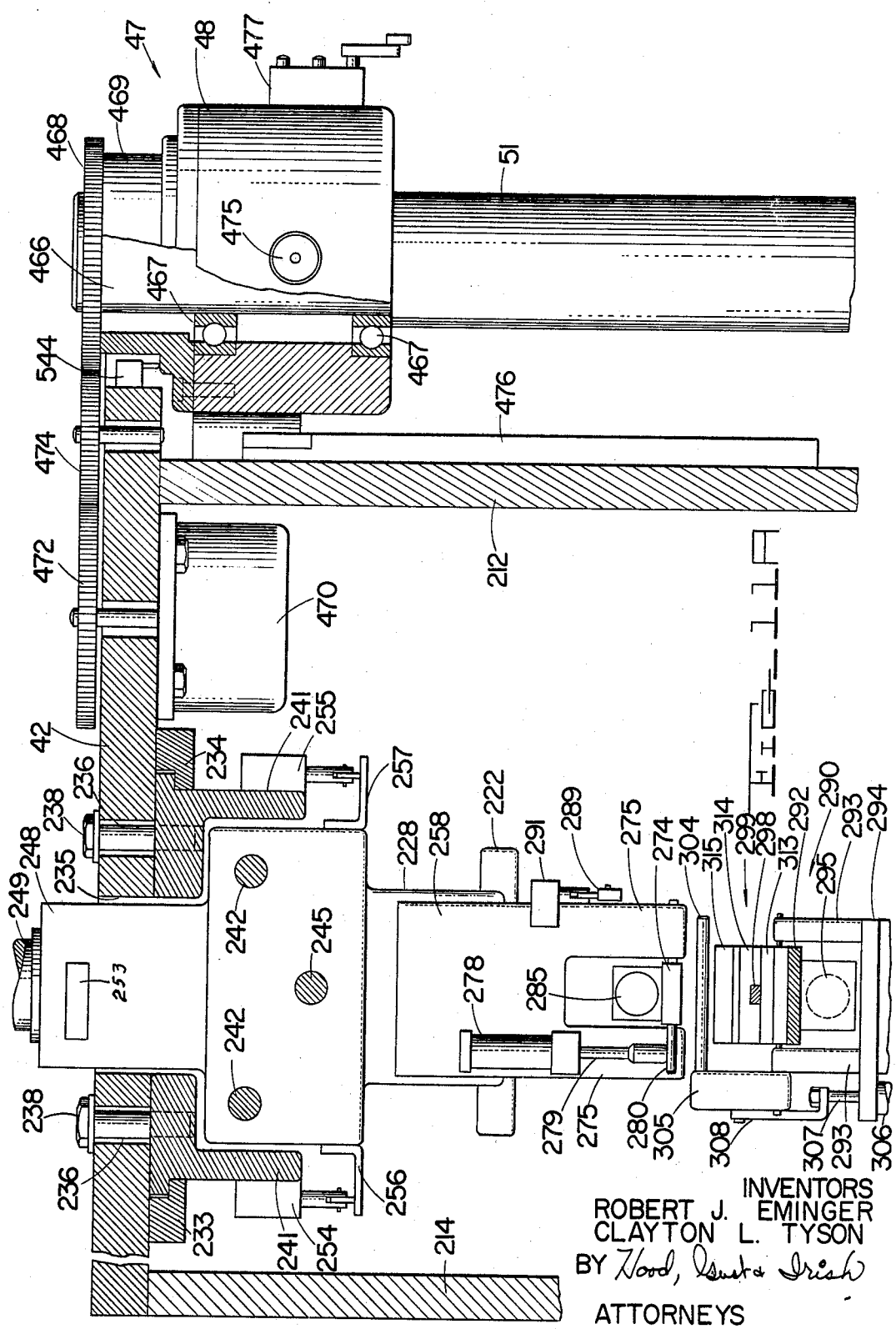

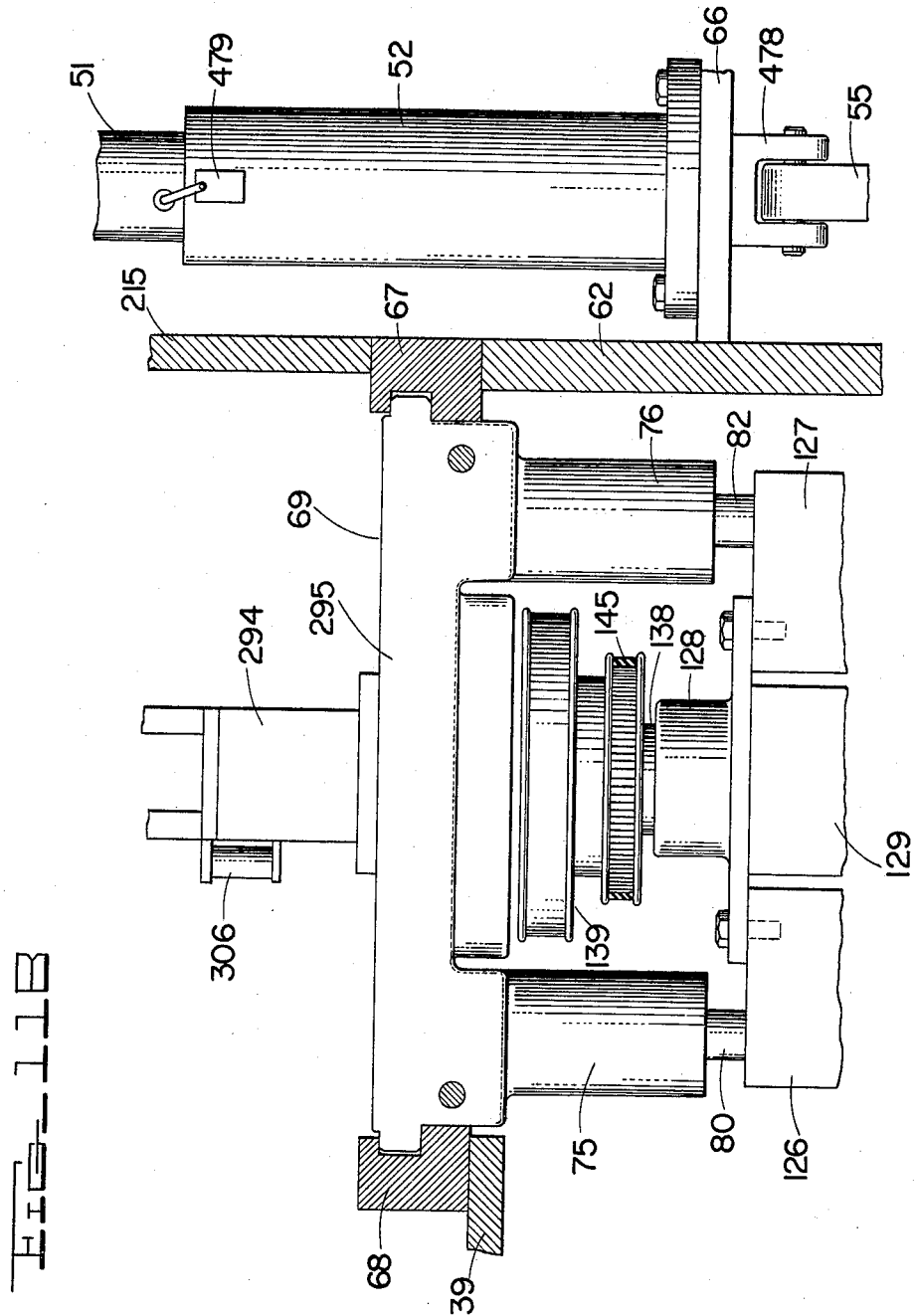

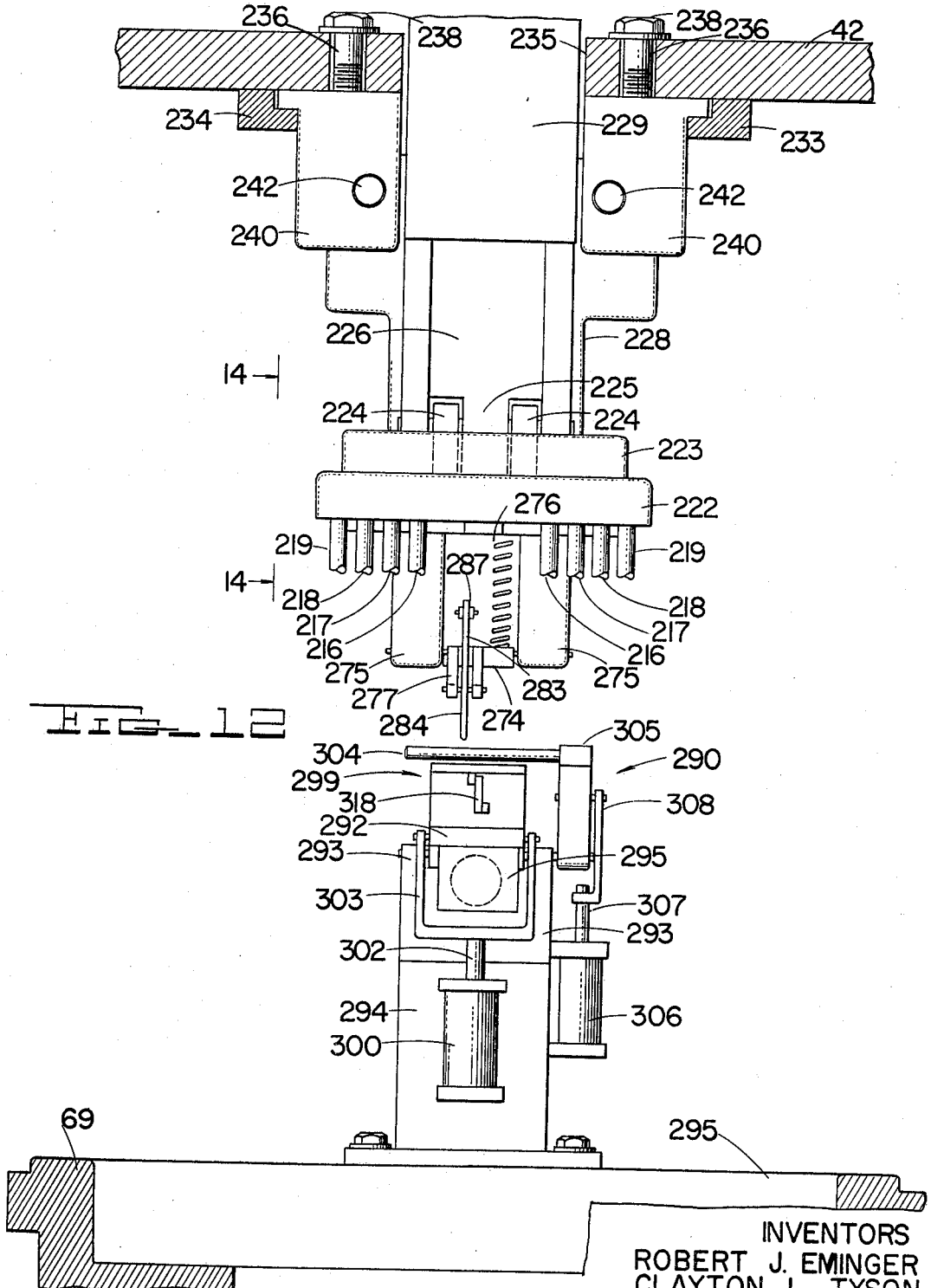

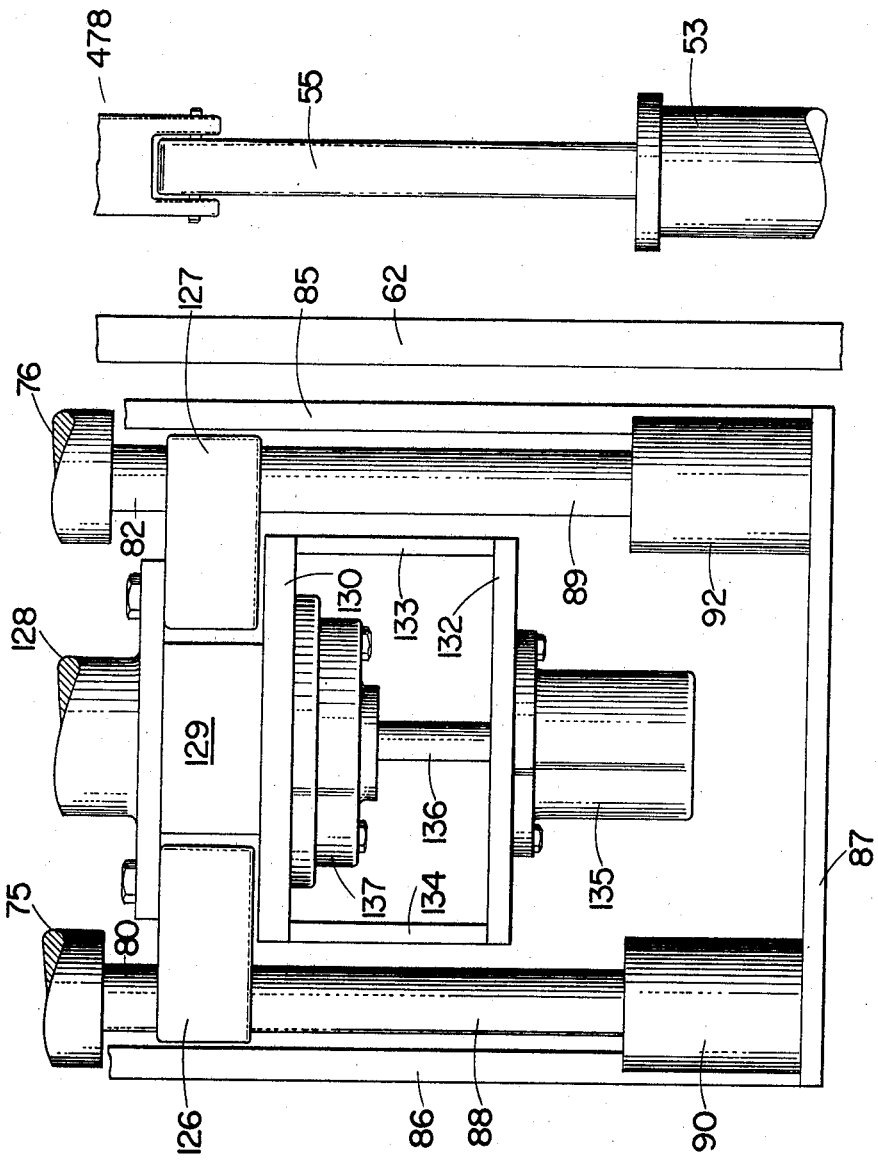

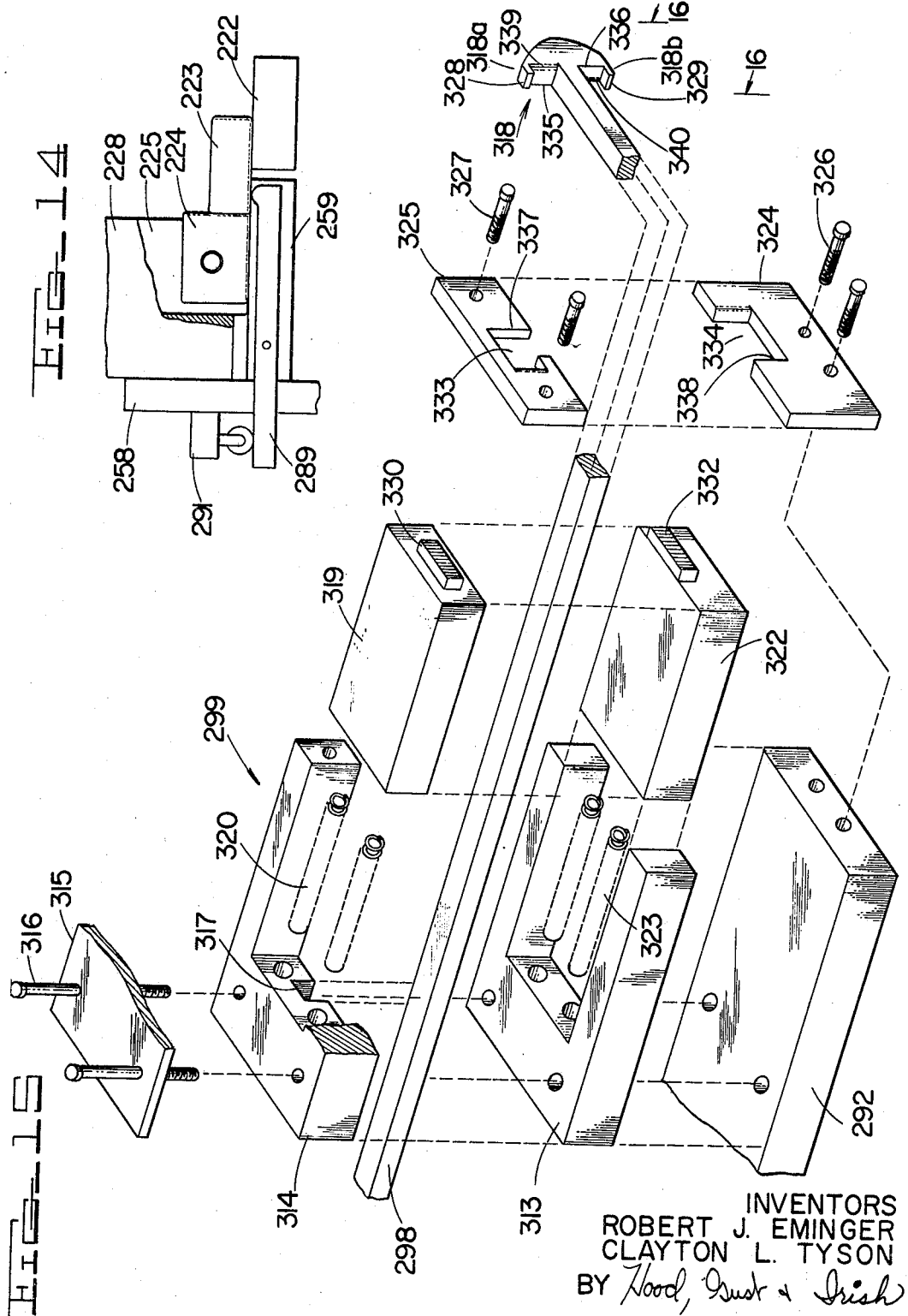

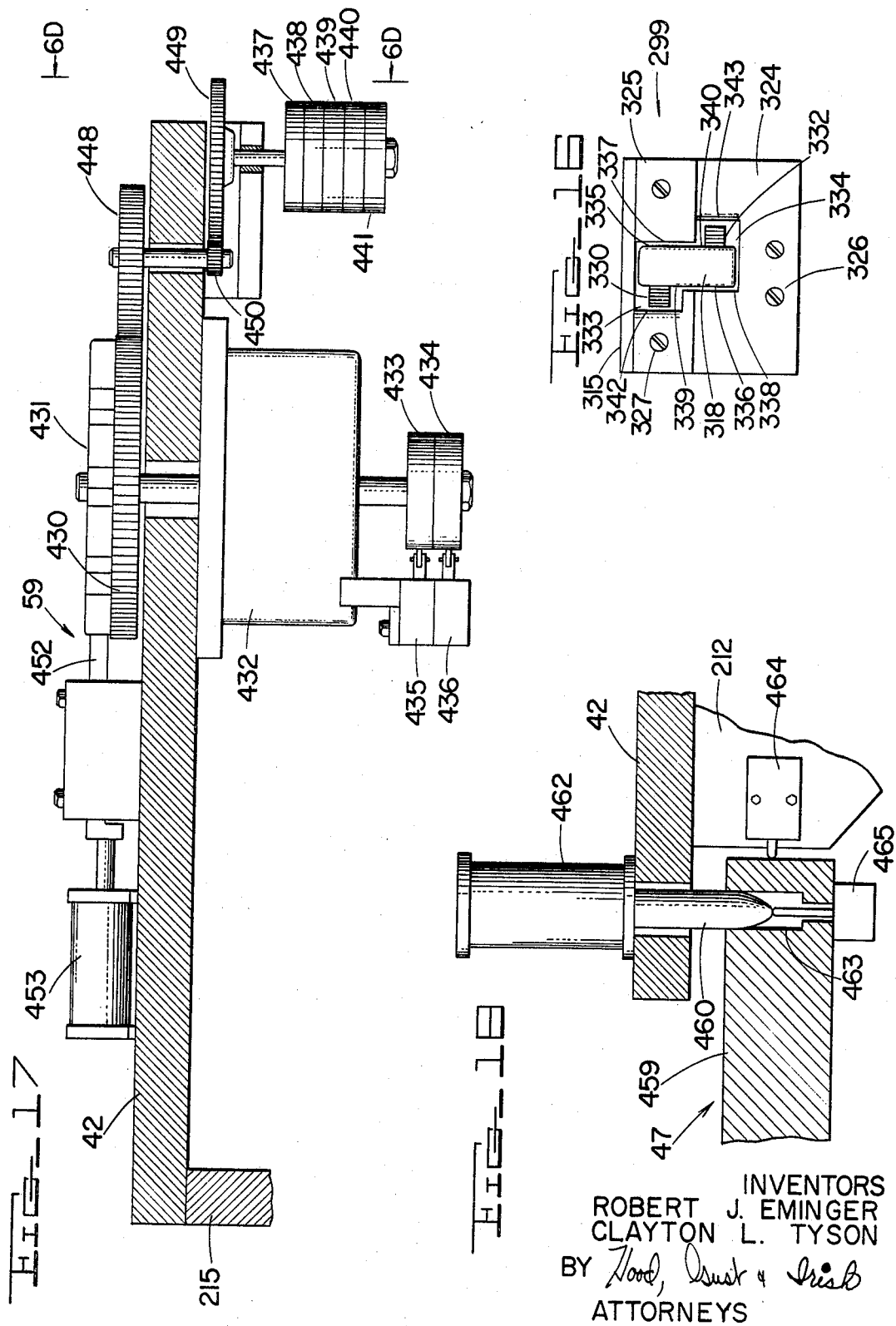

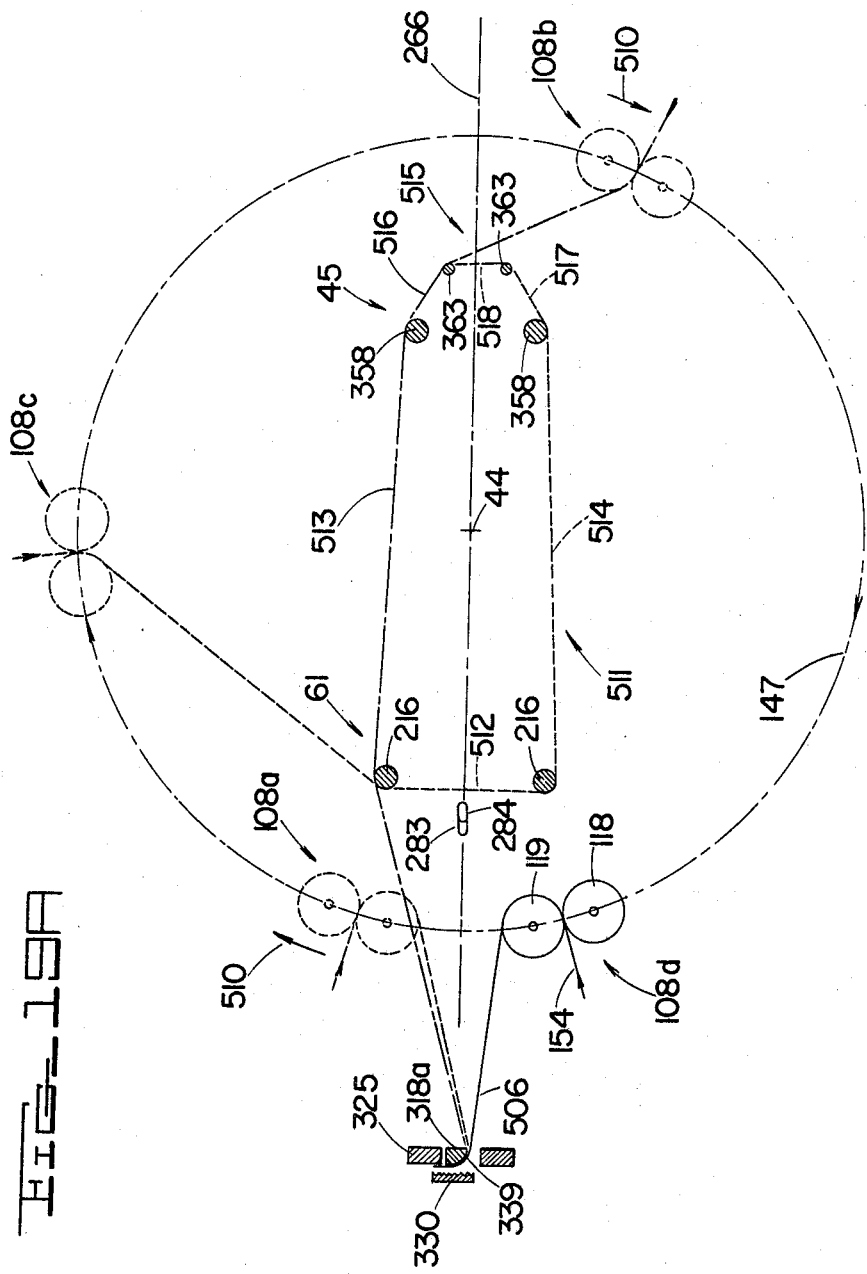

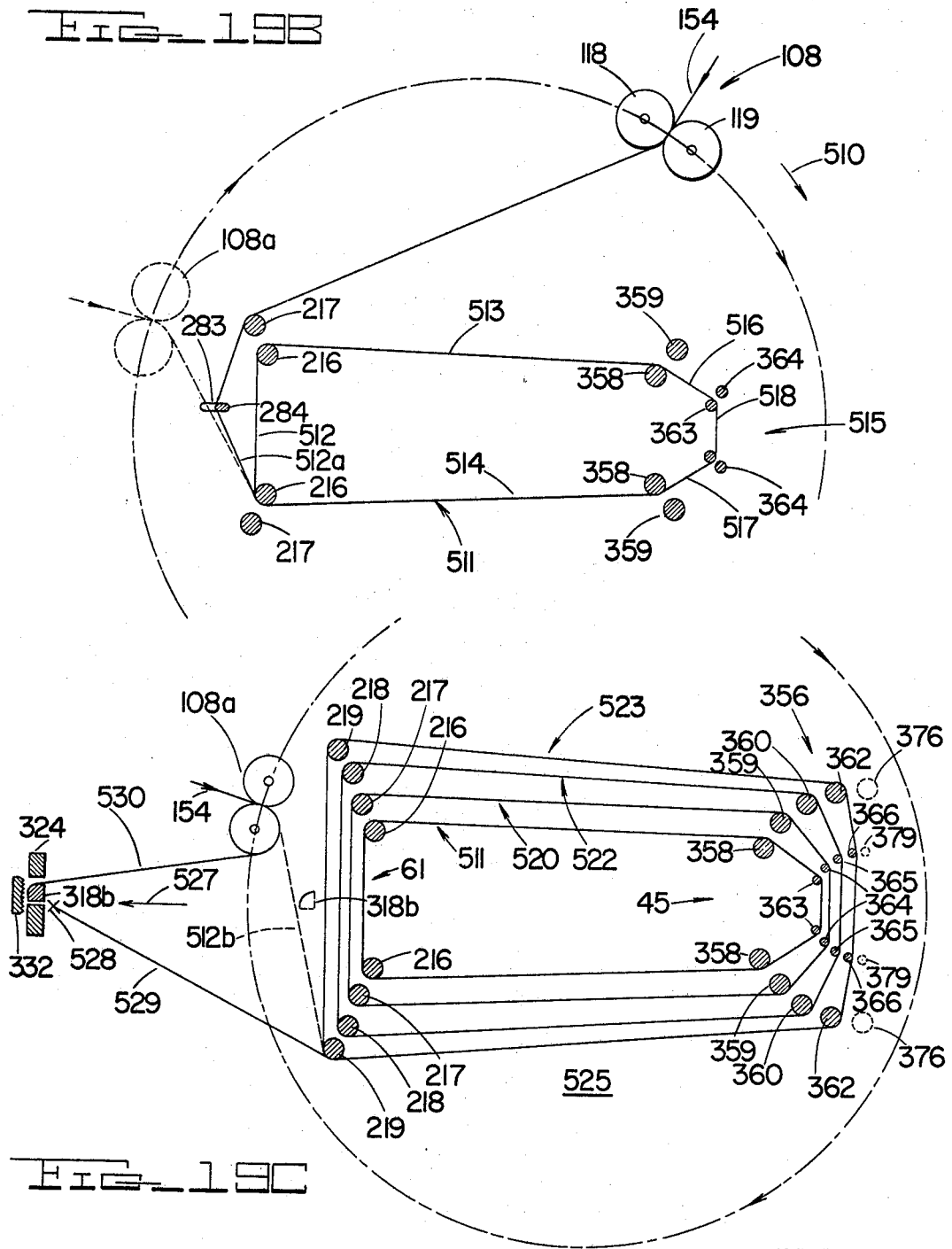

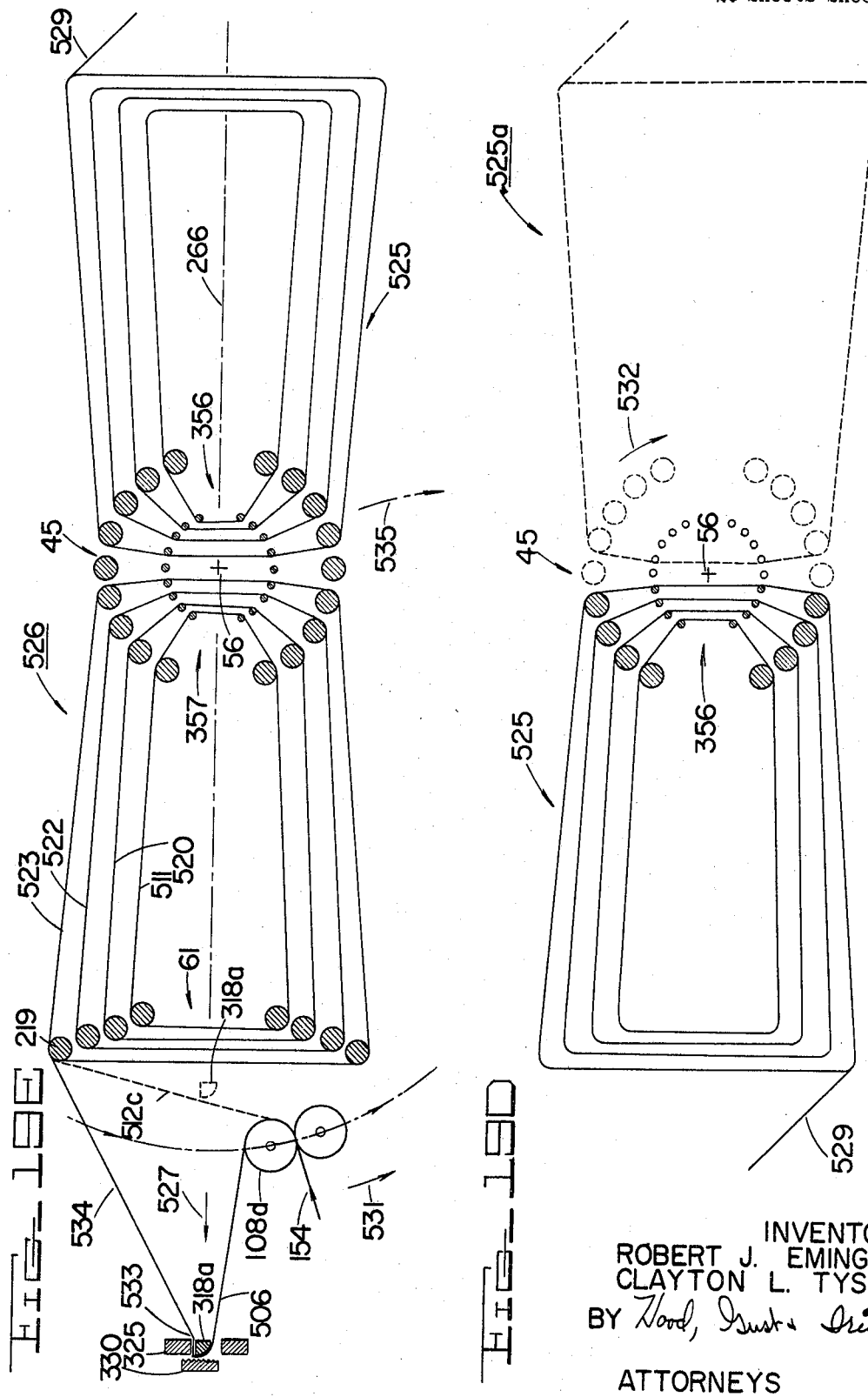

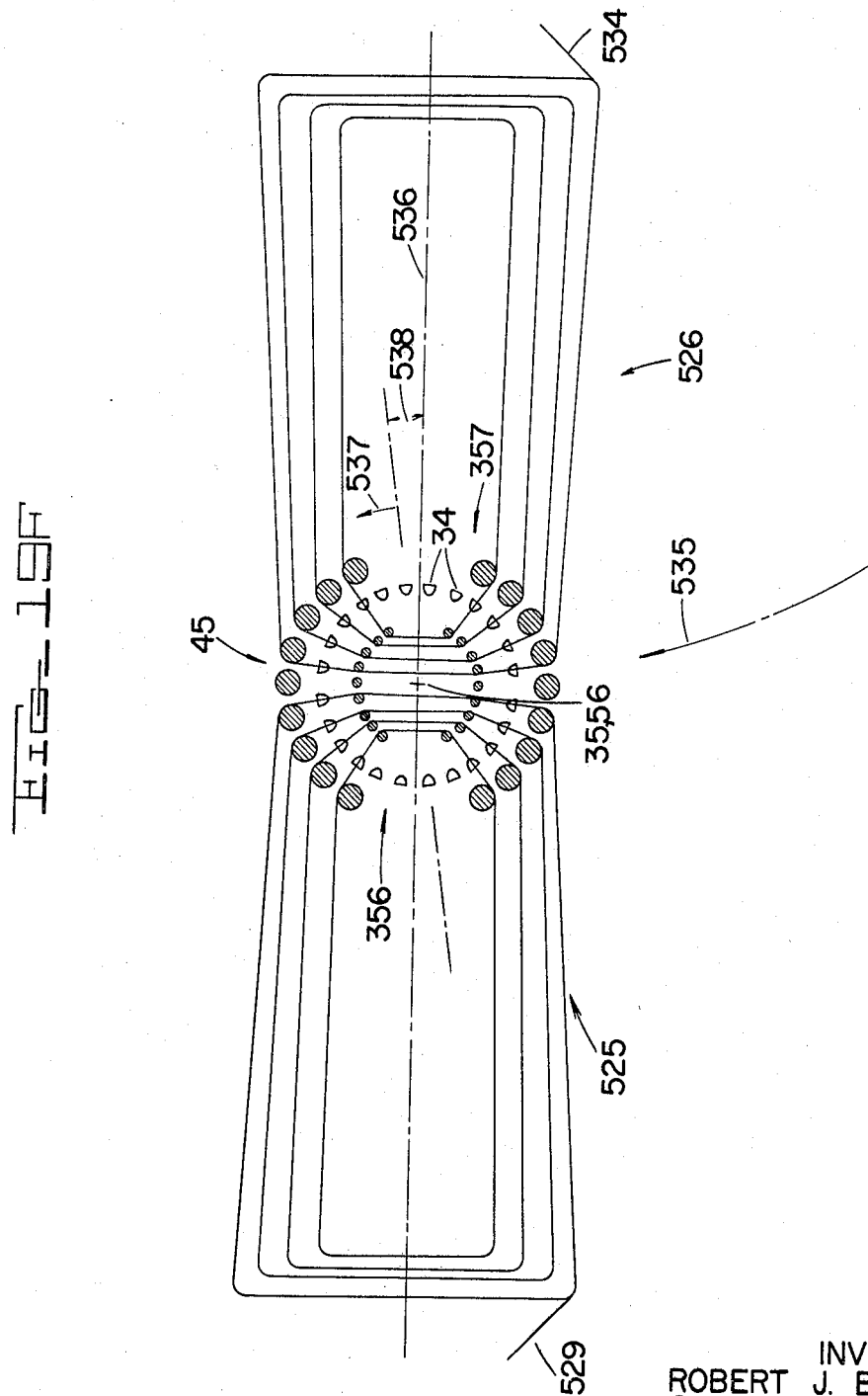

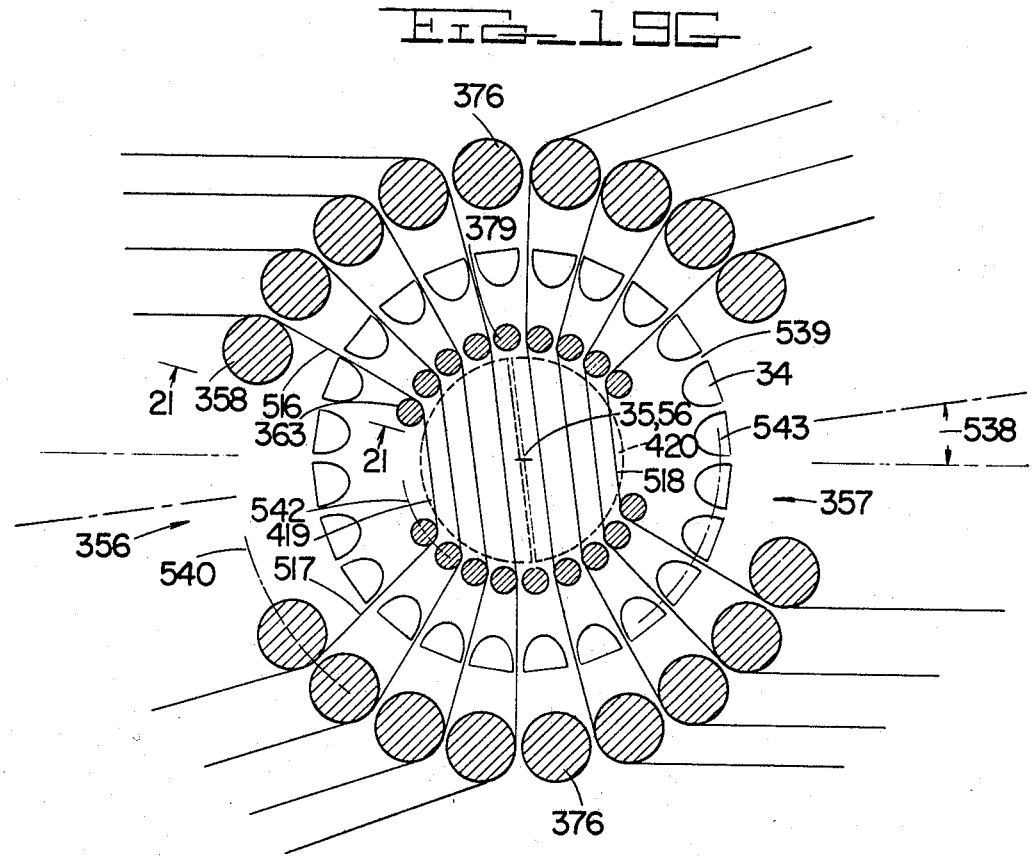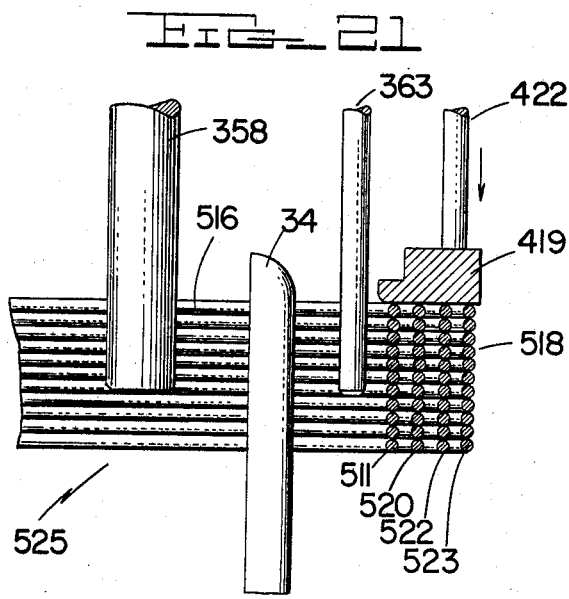

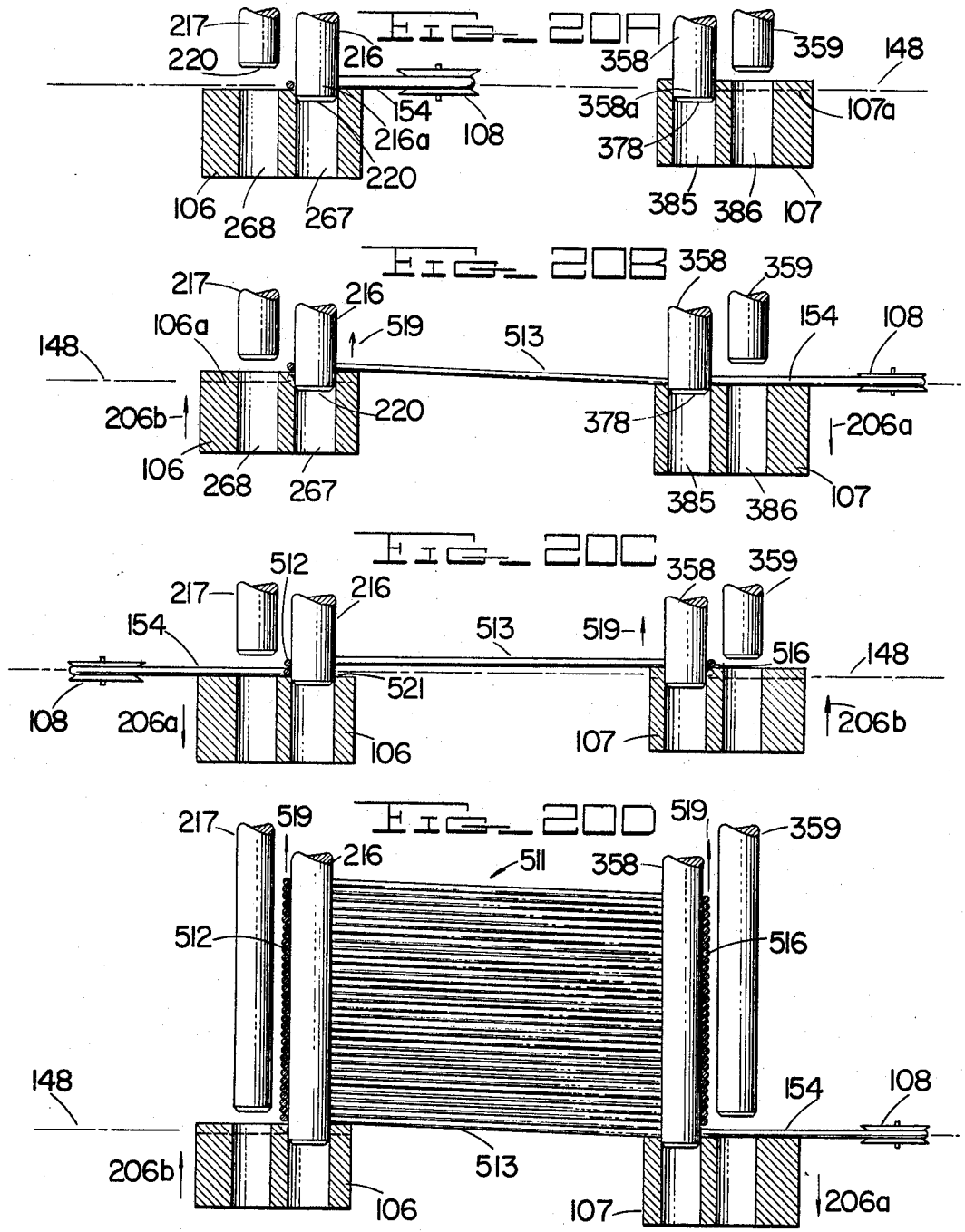

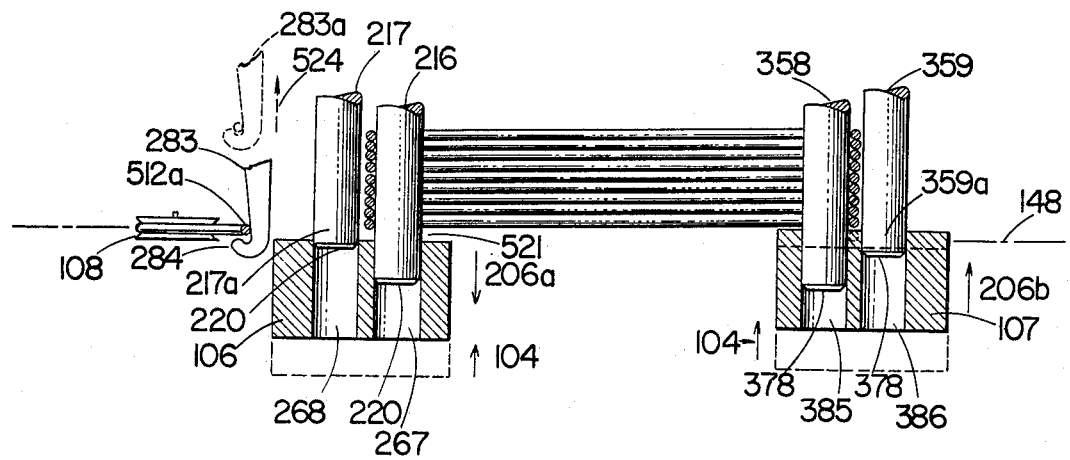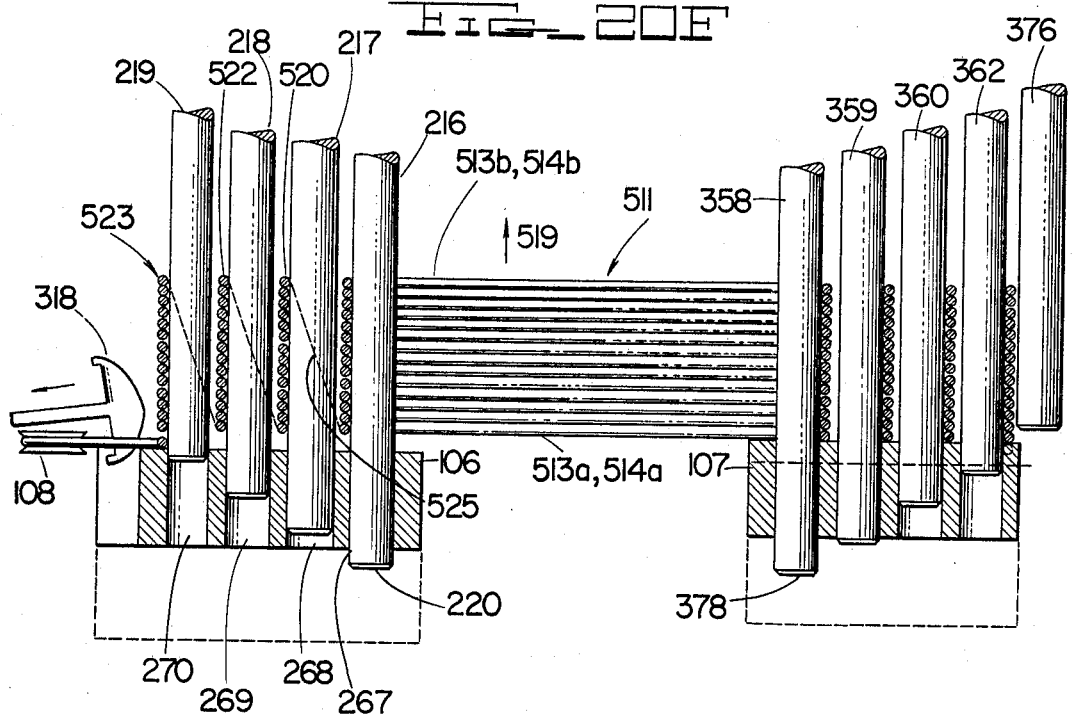

Dec. 2, 1969  R. J. EMINGER ET AL  3,481,372
COIL FORMING METHOD AND APPARATUS
Filed May 22, 1967  29 Sheets-Sheet 28
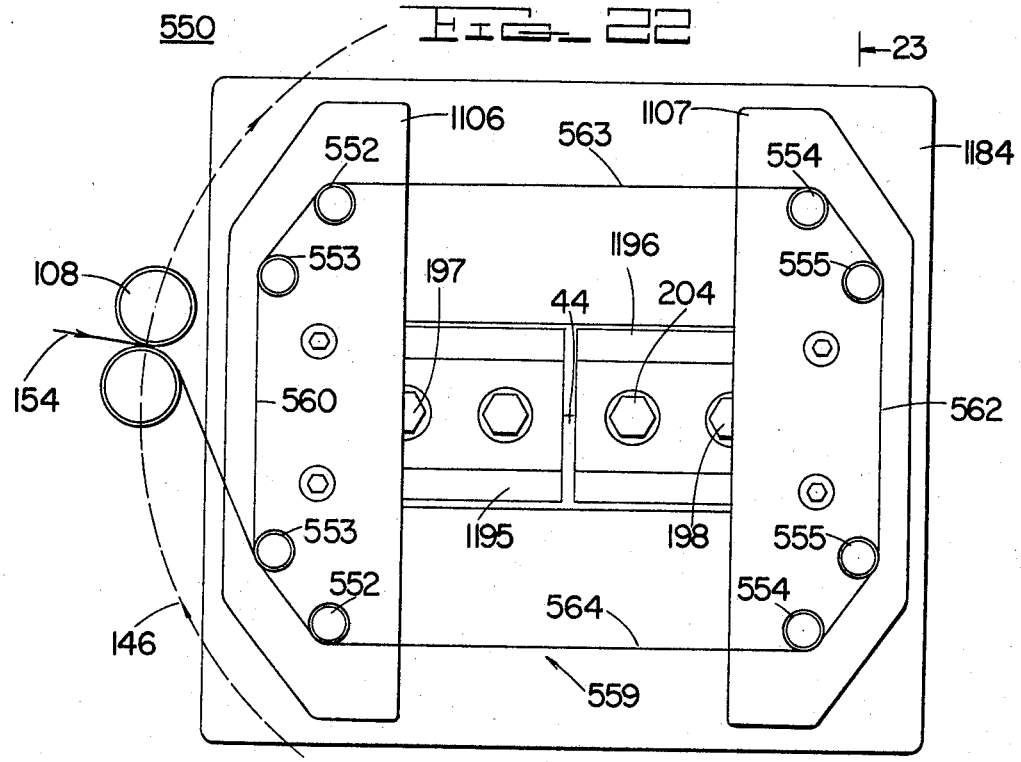
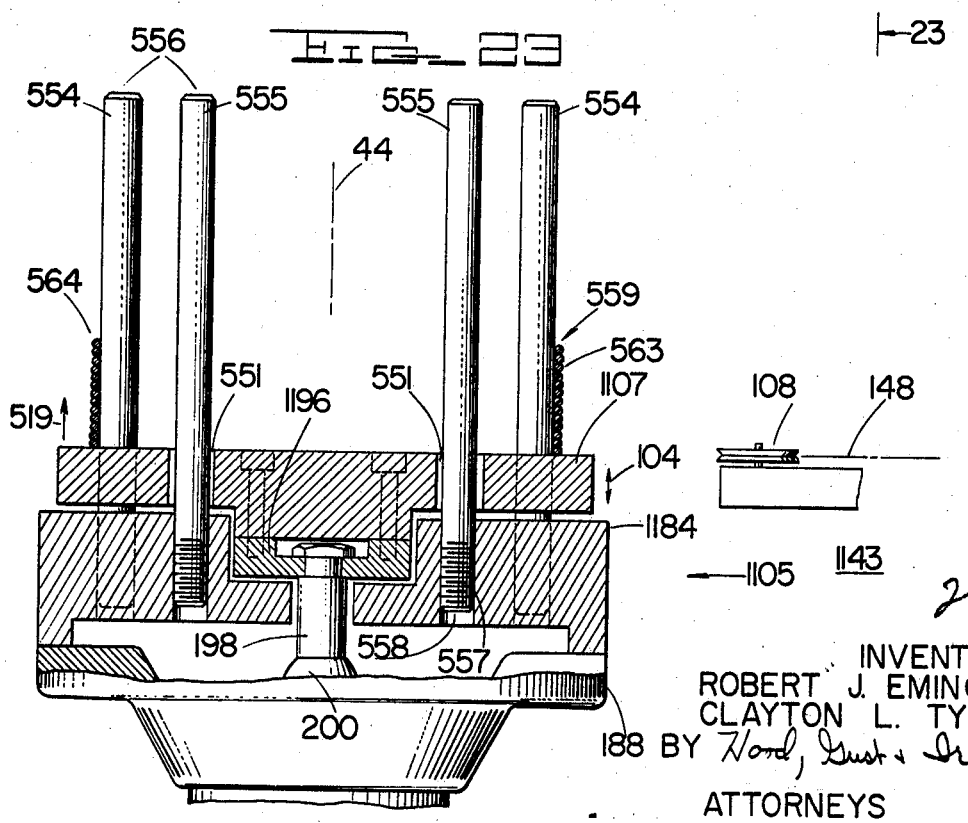
INVENTORS
ROBERT J. EMINGER
CLAYTON L. TYSON
BY Hood, Gust & Irish
ATTORNEYS

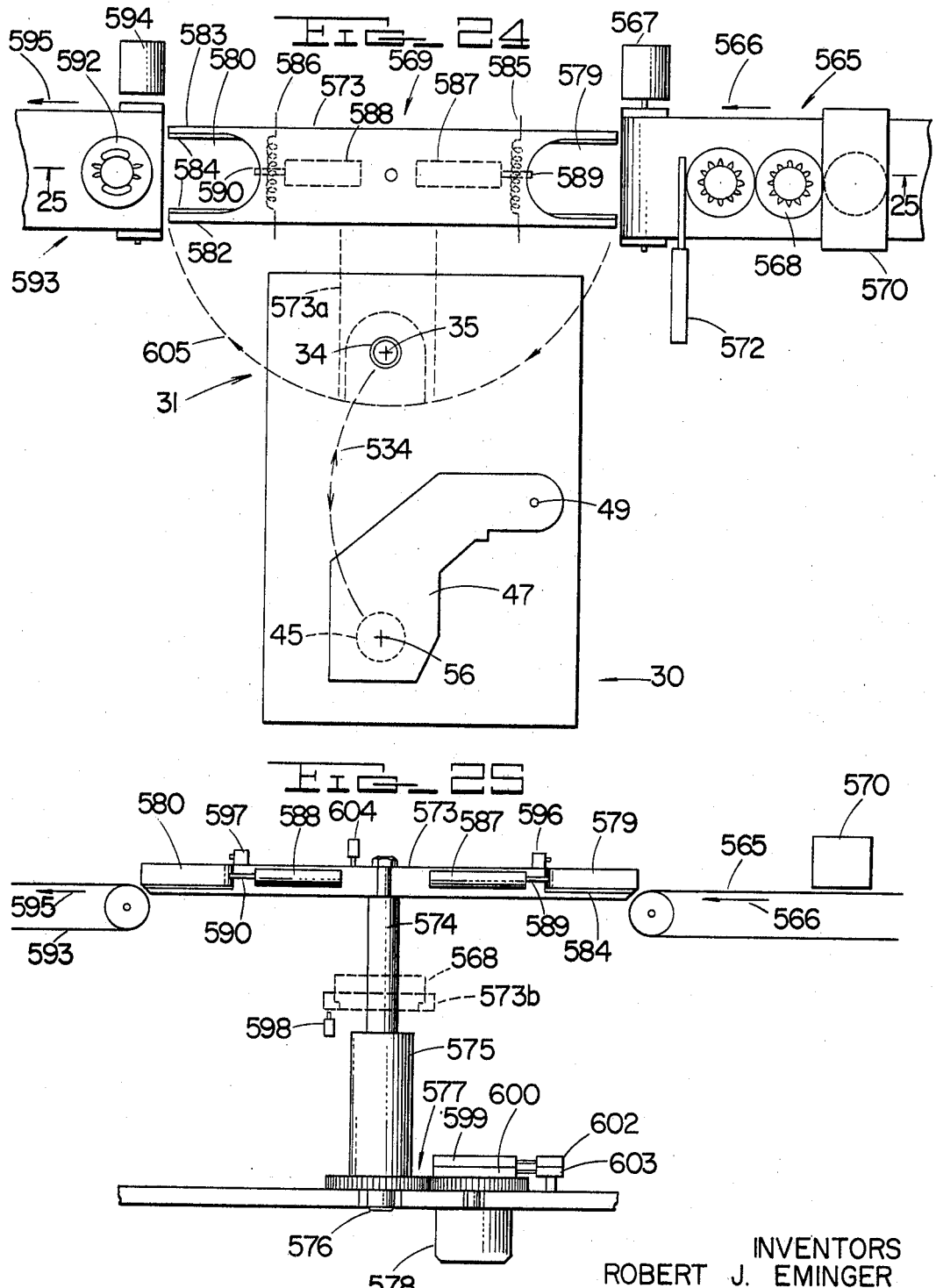

United States Patent Office 3,481,372
Patented Dec. 2, 1969

3,481,372
COIL FORMING METHOD AND APPARATUS
Robert J. Eminger and Clayton L. Tyson, Fort Wayne, Ind., assignors to Fort Wayne Tool & Die, Inc., Fort Wayne, Ind., a corporation of Indiana
Filed May 22, 1967, Ser. No. 640,156
Int. Cl. B21f 3/02; H02k 15/04
U.S. Cl. 140—92.1
53 Claims

ABSTRACT OF THE DISCLOSURE

A method of forming a multi-turn, single layer coil, such as a dynamoelectric machine field coil, in which turns of the coil are continuously and successively wound on a longitudinally extending coil form which has a substantially uniform transverse cross-sectional shape, the winding being in a plane transverse to the coil form and which is fixed with respect thereto, and in which each turn as it is wound is pushed longitudinally on the form in a direction away from the winding plane so that the next successive turn is wound in the space vacated by the preceding turn with each turn so pushed on the form pushing previously wound turns longitudinally on the form in the same direction.

An apparatus for forming a multi-turn, single layer coil, such as a dynamoelectric machine field coil, having a longitudinally extending coil form which has a substantially uniform, coil-defining transverse cross-sectional configuration throughout its length. A flyer is provided for winding an elongated strand on the coil form in a plane transverse to the coil form and fixed with respect thereto. A pushing means is provided actuated by the winder which pushes each turn as it is wound longitudinally on the coil form in a direction away from the winding plane so that each successive turn is wound in the space vacated by the preceding turn and each turn so pushed pushes previously wound turns longitudinally on the form in the same direction.

BACKGROUND OF THE INVENTION

Field of the invention

This invention relates generally to methods and apparatus for forming coils, and more particularly for forming a multi-turn, single layer coil, such as a dynamoelectric machine field coil. The invention further relates to the method and apparatus for transferring such multi-turn, single layer coils to coil insertion apparatus, which in turn inserts the coils in the slots of a dynamoelectric machine stator core member.

Description of the prior art

Multi-turn wire coils are used in a variety of applications in the electrical and electronics fields. Such coils have conventionally been formed or generated by winding the turns upon a form or mandrel. In some instances, the mandrel is rotated and the wire fed thereto from a head which is transversed in a direction parallel with the axis of rotation of the mandrel thereby to form a coil having the desired number of turns. In other instances, the turns are wound on a stationary form by a rotating flyer winder with either the winder or the form being moved axially with respect to the axis of rotation of the winder again to wind the requisite number of turns.

There are applications in which single-layer, precision wound coils are desired in which each turn has the same configuration and dimensions as adjacent turns and with adjacent turns abutting. Prior apparatus for producing such precision wound coils has required great accuracy in the traversing mechanism and extremely accurate adjustment since the amount of traverse for each turn of the coil must be exactly equal to the wire diameter. Thus, adjustment of the traverse of the wire dispensing head, flyer, or coil form, as the case may be, for different wire sizes is extremely critical, and the problem is complicated by the ordinary dimensional tolerances in the wire diameter.

In Patent No. 2,432,267 granted Dec. 9, 1947 to A. P. Adamson, there is disclosed an apparatus and method for inserting prewound coils in the slots of an internally slotted dynamoelectric machine stator core member. In such apparatus, a plurality of elongated finger members are provided adapted to extend through the bore of the stator core member and respectively to engage the inner extremities of the teeth which define the slots thereof. The coils to be inserted in the stator core member slots are prewound and are positioned on the fingers. In the past, it has been conventional practice to prewind such coils on a conventional coil winder, the coils then being removed from the winder by hand, transported to the inserter, and positioned on the stator fingers by hand. Such coils have conventionally been in the form of skeins following manual removal for the coil winding apparatus and transfer to the coil insertion apparatus. While it is possible for the operator who manually positions the coils on the inserter fingers to manually position the turns to form a single layer coil with no cross-overs, this requires appreciable additional operator time. Resultantly, the coils are most commonly manually positioned on the inserter fingers in skein fashion with the turns forming the coils thus having numerous cross-overs.

An important factor in the design of dynamoelectric machines is "slot-fill"; it is frequently important to provide the greatest possible number of turns of wire in a given slot. Maximum slot-fill is obtained when all of the wires in a given slot are parallel. Thus, the insertion of coils which have been manually positioned on the inserter teeth in a manner to provide numerous cross-overs between the turns results in the wires being twisted in the slots and thus occupying more space, i.e., reducing the slot-fill.

In order to eliminate the requirement for manually removing the coils from the coil winding apparatus and then transferring them in some manner to the coil inserting apparatus for subsequent manual positioning on the inserter fingers, apparatus has been provided, as disclosed in application Ser. No. 581,488 of Gene S. Ericson, in which the coil form of the coil winding apparatus is proportioned to receive the fingers of the coil insertion apparatus with means being provided for transferring the form with a coil wound thereon to the inserter teeth so as to permit the coil to be directly transferred from the form to the inserter teeth. While this apparatus eliminates several of the manual operations previously required, manual transfer of the coil from the coil form to the inserter teeth is still required. Further, this apparatus makes no effort to provide single layer precision wound coils and thus the resulting coils are still of the random-wound skein type having numerous cross-overs between turns.

Fully automatic production of fully wound stators is an objective which has not been met by the prior apparatus as described above. With the apparatus of the Ericson application, it is still necessary manually to transfer the coils from the coil forms to the inserter teeth, manually to position an unwound stator core on the inserter apparatus, manually to actuate the apparatus to insert the coils, and manually to move the wound stator from the apparatus.

SUMMARY OF THE INVENTION

In accordance with the broader aspects of the method of the invention, a multi-turn, single layer coil of the type in which each turn has the same configuration and dimensions as adjacent turns is formed by winding one turn of a strand on longitudinally extending coil form means which has a substantially uniform transverse cross-sectional shape proportioned to form the configuration and dimensions of the coil, the winding being in a plane transverse to the coil form and fixed with respect thereto, moving the one turn so wound longitudinally on the coil form means in a direction away from the winding plane, and winding a second turn of the strand on the form means in the winding plane. More particularly, each turn is pushed as it is wound to move the same longitudinally on the coil form means so that the next successive turn is wound in the space vacated by the preceding turn, each turn which is so moved longitudinally on the coil form means in turn pushing previously wound turns to move the same longitudinally on the coil form means in a direction away from the winding plane thereby to form a precision wound coil.

The apparatus of the invention in its broader aspects comprises a longitudinally extending coil form means having a substantially uniform, coil-defining, transverse cross-sectional configuration throughout its length. Means are provided for winding an elongated strand on the coil form means in a plane transverse to the coil form means and fixed with respect thereto. Means are provided for moving each turn so wound longitudinally on the coil form means in the direction away from the winding plane so that each successive turn is wound on the coil form means in the space vacated by the preceding turn. More particularly, the means for moving the turns longitudinally on the coil form means comprise means for pushing each turn as it is wound longitudinally on the coil form means so that each turn so wound pushes previously wound turns longitudinally on the coil form means to form a precision wound coil.

In the preferred embodiment of the invention, the coil form means is proportioned and arranged to form a plurality of concentric coils which form one pole group of a dynamoelectric machine stator, and also to form all of such pole groups required for a given stator. The apparatus of the invention also provides means permitting automatic transfer of the coil form means with the coils thereon to a position in cooperative relationship with the inserter teeth and automatic transfer of the coils from the coil form means to the inserter teeth.

The apparatus of the invention further provides means for automatically transferring an unwound stator core member to the inserter apparatus, and for subsequently automatically removing the wound stator core member from the inserter apparatus.

It is accordingly an object of the invention to provide an improved method for forming multi-turn, single layer coils.

Another object of the invention is to provide an improved method for forming multi-turn, single layer coils of the precision wound type which does not require the use of traversing mechanisms and in which the wire size is not critical.

A further object of the invention is to provide an improved method for forming multi-turn, single layer coils of any length.

Yet another object of the invention is to provide an improved method for forming multi-turn, single layer coils and for transferring the same to coil insertion apparatus.

Still another object of the invention is to provide improved apparatus for forming multi-turn, single layer coils.

A still further object of the invention is to provide improved apparatus for forming multi-turn, single layer, precision wound coils which does not require traversing mechanisms and in which wire size is not critical.

Still another object of the invention is to provide improved apparatus for forming multi-turn, single layer, concentric coils and for transferring the same to coil insertion apparatus.

The above-mentioned and other features and objects of this invention and the manner of attaining them will become more apparent and the invention itself will be best understood by reference to the following description of an embodiment of the invention taken in conjunction with the accompanying drawings, wherein:

BRIEF DESCRIPTION OF THE DRAWINGS

FIG. 1 is a side elevational view of the coil generating apparatus of the invention integrated with coil insertion apparatus;

FIG. 2 is a fragmentary front elevational view of the apparatus of the invention taken generally along the line 2—2 of FIG. 1, the apparatus being shown in its winding position in solid lines and its coil transferring position in dashed lines;

FIG. 3 is a top view of the apparatus of the invention, taken generally along line 3—3 of FIG. 1, the apparatus being shown in the winding position in solid lines and in its coil transferring position in dashed lines;

FIG. 5a is a fragmentary cross-sectional view, taken generally along line 5—5 of FIG. 4, and showing the coil form means of the apparatus of the invention;

FIG. 5b is a fragmentary cross-sectional view, taken generally along the line 5—5 of FIG. 4, and showing the pin-actuating and rotating mechanism of the coil form means;

FIG. 5c is a fragmentary cross-sectional view, taken generally along the line 5—5 of FIG. 4 and showing the flyer and wobble plate assembly of the apparatus of the invention;

FIG. 5d is a fragmentary cross-sectional view, taken generally along the line 5—5 of FIG. 4 and showing the flyer drive and elevating mechanism of the apparatus of the invention;

FIG. 5e is a fragmentary cross-sectional view, taken generally along the line 5—5 of FIG. 4, showing the lower portion of the flyer-elevating mechanism of the apparatus of the invention;

FIG. 6a is a fragmentary cross-sectional view taken generally along the line 6a—6a of FIGS. 4, 5a and 5c;

FIG. 6b is a fragmentary cross-sectional view taken generally along the lines 6b—6b of FIGS. 5c and 5d;

FIG. 6c is a fragmentary cross-sectional view taken generally along the line 6c—6c of FIG. 5e;

FIG. 6d is a fragmentary cross-sectional view taken generally along the lines 6d—6d of FIG. 4;

FIG. 7 is a fragmentary end view of the front pin assembly taken generally along the line 7—7 of FIG. 5a;

FIG. 8 is a fragmentary cross-sectional view of the front pin assembly taken generally along the line 8—8 of FIGS. 5a and 7;

FIG. 9 is a view looking upwardly on the front and rear pin assemblies of the coil form means of the apparatus of the invention, and showing one group of concentric coils wound thereon, taken generally along the line 9—9 of FIG. 5a;

FIG. 10 is a fragmentary cross-sectional view showing the pusher plates and flyer taken generally along the line 10—10 of FIG. 5a;

FIG. 11a is a fragmentary cross-sectional view taken generally along the line 11—11 of FIG. 4 and 11a—11a of FIG. 5a;

FIG. 11b is a fragmentary cross-sectional view taken generally along the line 11—11 of FIG. 4 and 11b—11b of FIG. 5d;

FIG. 12 is a fragmentary cross-sectional view taken generally along the line 12—12 of FIG. 5a;

FIG. 13 is a fragmentary rear-end view taken generally along the line 13—13 of FIG. 5e;

FIG. 14 is a fragmentary side view, partly broken away, of a part of the rear pin assembly;

FIG. 15 is a fragmentary exploded view, partly in cross-section, illustrating the coil end pull-off and cut-off assembly;

FIG. 16 is a front end view of the coil end pull-off and cut-off assembly viewed generally along the line 16—16 of FIG. 15;

FIG. 17 is a fragmentary cross-sectional view taken generally along the line 17—17 of FIG. 4;

FIG. 18 is a fragmentary cross-sectional view taken generally along the line 18—18 of FIG. 4;

FIGS. 19a through 19g are schematic views showing the sequence of coil forming and transferring operations performed by the apparatus of the invention;

FIGS. 20a through 20f are fragmentary cross-sectional views, taken generally along the lines 20—20 of FIG. 10 further showing the sequence of coil-forming operations performed by the apparatus of the invention;

FIG. 21 is a fragmentary cross-sectional view taken generally along the lines 21—21 in FIG. 19g further showing the transferring of coils from the coil generating apparatus of the invention to the coil inserting apparatus;

FIG. 22 is a fragmentary top view showing a modified form of the coil generating apparatus of the invention;

FIG. 23 is a fragmentary cross-sectional view taken generally along the line 23—23 of FIG. 22;

FIG. 24 is a schematic view illustrating transfer apparatus for automatically loading unwound stator core members on the coil inserting apparatus associated with the coil generating apparatus of the invention, and automatically unloading wound stator core members therefrom; and FIG. 25 is a fragmentary cross-sectional view taken generally along the line 25—25 of FIG. 24.

DESCRIPTION OF THE PREFERRED EMBODIMENTS

Figure 4:
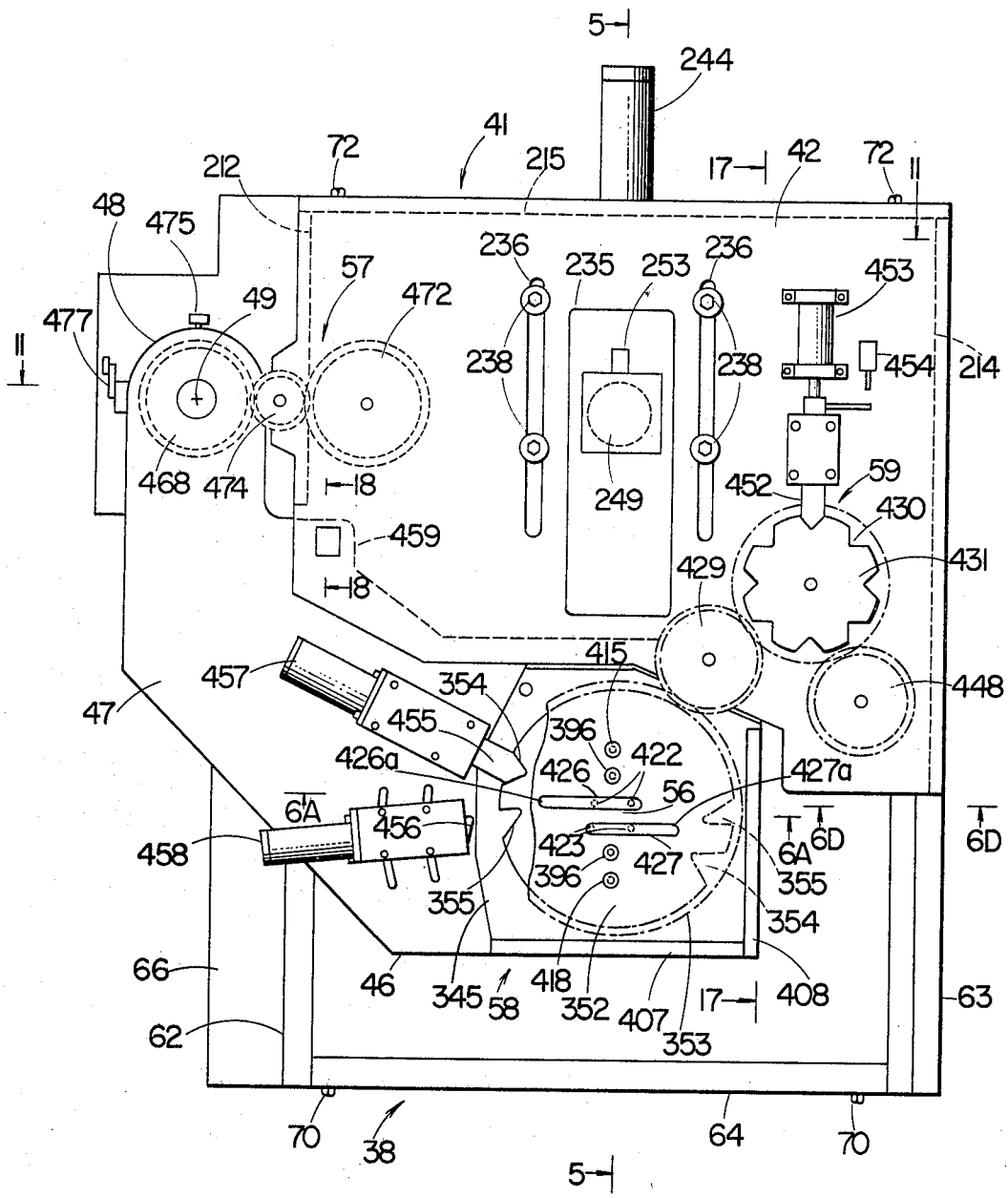
FIG. 4 is an enlarged top view of the apparatus of the invention, taken generally along the line 4—4 of FIG. 1.

Referring now generally to FIGS. 1 through 4 of the drawings, the coil generating and transferring apparatus of the invention, generally indicated at 30, is shown integrated with conventional coil inserting apparatus, generally indicated at 31. The coil inserting apparatus 31, in accordance with the aforesaid Adamson patent, includes an enclosing housing 32 having a top plate 33. A plurality of elongated, parallel inserter finger elements 34 are provided disposed in a circular array about axis 35, the finger elements 34 extending upwardly from the top plate 33. Inserter housing 32 is mounted on a base 36 which, in turn, is supported on a floor 37. In the illustrated embodiment, for operator convenience, the inserter housing 32, and likewise the coil generator 30 to be hereinafter described, is mounted on the base 36 so that the axis 35 of the inserter fingers 34 is inclined with respect to the floor 37. However, it will be readily understood that the axis 35 may be vertical with respect to the floor 37, or may alternatively be horizontal, i.e., spaced from and parallel with the floor 37.

The coil generator and transfer apparatus 30 includes a housing 38 mounted on base 36 in side-by-side relationship with the inserter housing 32 and having a top plate 39 spaced above the top plate 33 of the inserter housing. An upper frame assembly 41 having a top plate 42 is mounted upon and extends upwardly from the housing 38.

A winding head assembly 43 is provided mounted on the coil generator housing 38 and having an axis 44 spaced from and parallel with the axis 35 of the inserter finger elements 34. A front coil-forming pin assembly 45 is provided mounted on the outer end 46 of an arm 47 which has its other end 48 mounted for pivotal movement about an axis 49 spaced from and parallel with the axes 35 and 44, by means of a post 51 and a bearing 52 which is supported on the top plate 33 of the inserter housing 32. It will be observed that arm 47 is parallel with the top plates 33 and 39 of the inserter and generator housings 32 and 38, respectively.

Arm 47 is further arranged for vertical movement between upper and lower positions by means of a suitable hydraulic cylinder 53 having its lower end 54 connected to the base 36 and having an actuating rod 55 connected to the post 51. Thus, as will hereinafter be more fully described, arm 47 may be moved pivotally and vertically from a winding position in which the front pin assembly 45 is in winding relationship with the winding assembly 43, as shown in solid lines in FIGS. 1 through 4, to a lower coil inserting position in which the front pin assembly 45 cooperatively embraces the inserter fingers 34, as shown in dashed lines in FIGS. 2 and 3. The front pin assembly 45 has an axis 56 which is parallel with the winding assembly axis 44 in the winding position of arm 47, and coextensive with the inserter axis 35 in the inserting position of arm 47.

Mechanism 57 for pivotally moving arm 47 between its winding and unloading positions, to be hereinafter described, is mounted on the top plate 42 of the upper frame 41 of the generator 30. Mechanism 58 for actuating the front pin assembly 45 is mounted on the upper side of arm 47 adjacent its outer end 46. A rear coil-forming pin assembly 61 which cooperates with the front pin assembly 45 and the winding assembly 43 is provided mounted on the top plate 42 of the upper frame 41.

Referring now additionally to FIGS. 5c, 5d, 5e, 6b, 6c, 10, 11b, and 13, the winding assembly 43 and its mounting on the housing 38 of the generator 30 will be described. Generator housing 38 comprises spaced, parallel side plate members 62, 63, a front plate member 64 and a rear plate member 65 suitably secured together, as by welding. A flange 66 is secured to and extends outwardly from side plate member 62 and is in turn suitably secured to the top plate member 33 of the inserter housing 32.

A pair of elongated ways 67, 68 are respectively provided, way 67 being secured to side wall 62 while way 68 is secured to the top plate 34 of the generator housing 38. A slide 69 is slidably mounted on ways 67, 68 for longitudinal movement therein. The position of slide 69 and the apparatus mounted thereon, to be hereinafter described, is adjustably secured by means of suitable adjusting bolts 70, 72. Slide 69 has a central opening 73 and four bearing bosses 74, 75, 76 and 77 depending therefrom.

A winding assembly mounting member 78 is provided having four guide rod members 79, 80, 82, 83 which respectively extend downwardly through and are journaled in the bearing bosses 74, 75, 76, 77, thereby permitting vertical movement of the mounting member 78 with reference to the slide 69, as will hereinafter be described. The lower extremities of the guide rods 79, 80, 82, 83 are secured to a support plate member 84.

Side frame members 85, 86 are respectively secured to the slide 69 and depend therefrom in spaced-apart relationship. A bottom frame member 87 extends across and is secured to the bottom extremities of the side frame members 85, 86. Reference to FIGS. 6b, 6c and 13 will reveal that the support plate member 84 is disposed between the side frame members 85, 86.

Another pair of guide rods 88, 89 are secured to and depend from the support plate member 84 in general alignment with the guide rods 80, 82, respectively, and having their lower ends respectively journaled in bearing members 90, 92 which are secured to and extend upwardly from the bottom plate member 87. It will now be seen that the slide 69, side frame members 85, 86 and the bottom plate member 87 form an assembly which is supported on the generator housing 38 by means of the ways 67, 68, while the mounting member 78, guide rods 79, 80, 82, 83, support plate 84, and guide rods 88, 89 form another assembly which is mounted on the slide 69 and vertically movable with respect thereto.

The mounting member 78 and support plate 84 assembly is selectively vertically moved with respect to the slide 69 and the generator housing 38 by the mechanism now to be described. Support plate 84 has a central opening 93 formed therein. A member 94 is secured to the bottom surface of the support plate 84 and extends transversely across the opening 93. Three hydraulic cylinders 95, 96, 97 are provided respectively having different strokes, as will hereinafter be described. Cylinder 95 has its piston rod 98 acting upon the transverse member 94. Cylinder 96 is secured to cylinder 95 and its piston rod 99 is connected to the piston rod 100 of cylinder 97. Cylinder 97 is in turn secured to and depends from the bottom plate 87, extending downwardly through an opening 102 formed in the bottom plate member 103 of the generator housing 38 which joins the bottom extremities of the side plate members 64, 65. Thus, selective extension of any one or more of the piston rods 98, 99, 100 of the cylinders 95, 96, 97, as will hereinafter be described, will result in upward movement of mounting member 78 and support member 84 in the direction shown by the arrow 104, this upward movement being guided by guide rods 88, 89 in bearing bosses 90, 92 secured to the bottom plate 87, and guide rods 79, 80, 82 and 83 in bearing bosses 74, 75, 76 and 77, respectively depending from slide 69. It will be seen that the cylinders 95, 96, and 97 are disposed coaxially with the axis 44 of the winding assembly 43.

The winding assembly 43 comprises a wobble plate assembly 105 for imparting a reciprocal upward and downward movement to the pusher blocks 106, 107, to be hereinafter more fully described, and a flyer assembly 108. The flyer assembly 108 includes a rotatable member having a lower part 109 and an upper part 110 secured thereto. A central opening 112 is formed in the mounting member 78 and the lower rotatable part 109 is rotatably supported therein by means of suitable bearings 113, 114. A pair of transversely spaced apart flyer arms 115, 116 extend radially outwardly from the upper rotatable part 110. Flyer member 117 is connected to the outer extremities of the arms 115, 116 and extends upwardly therefrom. Wire guide pulleys 118, 119, 120, 122 are rotatably mounted on the flyer member 117. A suitable counterweight 123 is adjustably mounted on the outer end of another rod 124 which extends radially outwardly from the upper rotatable member 110 diametrically opposite the rods 115, 116.

A flyer drive sprocket 125 is secured to the bottom end of the lower rotatable member 109. Support plate 84 has a pair of transversely spaced-apart arms 126, 127 extending rearwardly therefrom. A bearing member 128 is mounted on the upper surfaces of the arms 126, 127. A casing 129 depends from bearing member 128 between the arm 126, 127 and has a transversely extending bracket member 130 connected thereto. A plate member 132 is supported below the bracket member 130 by side plate members 133, 134. A suitable drive motor 135, such as a hydraulic motor, is mounted on the plate member 132. The output shaft 136 of the drive motor 135 extends upwardly through the plate member 132 and is coupled to a conventional clutch-brake mechanism 137 mounted on the lower side of the bracket member 130. Clutch-brake 137 is coupled to drive shaft 138 which extends upwardly through the housing 129 and is journaled in the bearing 128. Drive shaft 138 has a driving sprocket 139 secured to its upper end and drivingly connected to the flyer drive sprocket 125 by a suitable drive belt 140. It will be readily seen that the drive motor 135 and clutch-brake mechanism 137, being supported from the arms 126, 127 of the support plate member 84 also move in the direction 104 as the support plate and mounting member assembly 78 is moved by selective actuation of hydraulic cylinders 95, 96 and 97. A timing drive sprocket 142 is also mounted on the drive shaft 138 and drives a timing shaft 143 of timing assembly 144, to be hereinafter more fully described, through timing belt 145 and sprocket 146.

It will now be seen that energization of drive motor 135 with clutch-brake 137 deactuated will cause rotation of the flyer assembly 108 about axis 44 thereby causing the pulleys 118, 119 to travel in a circular path, as shown by the dashed line 147 in FIG. 10, in a plane 148 normal to the axis 44, as shown in FIG. 5c.

An opening 149 is formed in one side of the upper rotatable member 110 between the flyer arms 115, 116 and communicates with an eccentric opening 150 extending longitudinally through the lower rotatable member 109. Opening 150 in turn communicates with an eccentric opening 152 in the drive sprocket 125. A suitable roller 153 is provided in the opening 149, the openings 152, 150, 149 and the roller 153 serving to guide wire 154 upwardly to the flyer 108 where it passes between the arms 115, 116, over the pulleys 122, 120 and between the pulleys 118, 119.

A wire guide pulley 155 is rotatably mounted in an opening 156 in a block 157 which is mounted on the upper side of the member 94. A wire guide tube 158 extends through the support plate member 84 having its outer end 159 communicating with the exterior of the generator apparatus 30 and its inner end 160 communicating with the opening 156 and block 157. The wire 154 is thus fed into the generator apparatus 30 from external source (not shown) through the tube 158, around the pulley 155, and then upwardly, initially concentric with the axis 44 of the winding assembly 43, and thence eccentrically to enter the openings 152, 150.

The winding mechanism 43 includes a wobble plate assembly 105 for imparting reciprocal movement to the pusher blocks 106 and 107 in directions parallel with the axis 44. The lower and upper rotatable members 109, 110 and the drive sprocket 125 are provided with a coaxial bore through which a spindle 162 coaxially extends, spindle 162 being supported within the lower and upper rotatable members 109, 110 by suitable bearings 163, 164. The spindle 162 is restrained against rotation while permitting rotation of the length 154a of the wire 154 which extends through the openings 152, 150 and 149 about the axis 44, by the mechanism 165 now to be described. A plate member 166 is suspended below the mounting member 78 by means of posts 167, it being observed that the sprocket 125 is disposed between plate member 166 and mounting member 78 and interiorally of the posts 167. Plate member 166 has a coaxial opening 168 and spindle 162 has its lower end 169 extending downwardly through the opening 168. A cam follower guiding member 170 is secured to the lower end 169 of the spindle 162 by means of a suitable pin 172 and has suitable transversely extending slots 173 formed therein for guiding the cam follower member 174 for transverse reciprocal movement therein.

A rotatable cam member 175 is secured to the sprocket 125 and rotates therewith, cam member 175 cooperatively engaging cam follower member 174 to impart reciprocal transverse motion thereto in response to rotation of sprocket 125. An annular member 176 is secured to the plate member 166 and surrounds the guide member 170 and the cam follower member 174. The outer peripheral surface of the guide member 170 is spaced radially inwardly from opening 168 in plate member 166 and from the inner surface of the annular member 176 thereby providing an annular passageway 177 communicating with the flyer opening 152 in the sprocket 125 through which the length of wire 154a passes.

The annular member 176 has a pair of diametrically opposite shot pin-receiving openings 179, 178 formed therein. Cam follower member 174 has a pair of diametrically opposite shot pins 180, 182 formed thereon. The cam follower member 174, rotatable cam 175, annular member 176, and shot pins 180, 182 are proportioned so that shot pin 180 is seated in opening 178 in one extreme position of cam follower 174 with shot pin 182 being spaced from annular member 176 thereby permitting the length of wire 154a to pass therebetween, and so that the shot pin 182 is seated in opening 179 in the other extreme position of cam follower 174 with pin 180 being spaced from annular member 176 likewise permitting the length of wire 154a to pass. With this arrangement, rotation of the sprocket 125, in turn rotating the flyer assembly 108, reciprocates the cam follower 174 between extreme positions with the shot pins 180, 182 alternately being seated in the openings 178, 179, thereby restraining the spindle 162 against rotation while nevertheless permitting the requisite rotation of the length of wire 154a. An annular wire guide member 183 is secured to the bottom end 169 of spindle 162 and serves to guide the length of wire 154a into the wire passage 177.

An annular plate member 184 is secured to the upper end 185 of the stationary spindle 162 in any suitable manner, as by a pin 186. Plate member 184 has a depending annular flange 187 to which is secured a housing 188 which defines a cavity 189 with the plate member 184. A running seal 190 is provided between the housing 188 and the upper rotatable member 110 thereby to permit suitable lubricant to be introduced into the cavity 189.

The upper rotatable member 110 has a journal portion 192 formed at its upper end which has an axis which is inclined with respect to the axis 44. A wobble plate member 193 is rotatably mounted upon the journal portion 192 by suitable bearings 194. A pair of wire pusher mounting blocks 195, 196 are respectively connected to the wobble plate 193 at diametrically opposite points thereon by pins 198, 198 having ball joints 199, 200 at their lower extremities and respectively extending through openings 202, 203 formed in the plate member 184. The mounting plates 195, 196 are further guided for reciprocal axial movement and restrained from rotation by suitable guide pins 204 slidably received in suitable openings 205 in the plate member 184.

It will now be seen that with the spindle 162 and the plate member 184 restrained against rotation, as above described, mounting plates 195, 196 and the wobble plate 193 connected thereto by pins 197, 198 are likewise restrained against rotation. Thus, rotation of the flyer assembly 108 and the upper rotatable member 110 will cause the journal portion 192 to impart a reciprocatory wobbling motion to the wobble plate 193, thereby imparting a reciprocal axial movement to the mounting plates 195, 196, as shown by the arrows 206.

The mounting plates 195, 196 respectively have T-slots 207, 208 formed in their upper surfaces which slidingly receive T-bolts 209, 210 to which the pusher blocks 106, 107 are respectively connected, thus respectively securing the wire pusher blocks 106, 107 to the mounting members 196, 195, while permitting transverse adjustment of their respective positions on opposite sides of the axis 44.

It will be observed that the entire winding assembly 43 including the wobble plate mechanism 105 and the flyer assembly 108 is moved upwardly in the direction 104 in response to selective actuation of the hydraulic cylinders 95, 96 and 97, as will hereinafter be more fully described. Referring particularly to FIGS. 5c and 10, the inclined journal portion 192 of the rotatable member 110, wobble plate 193 and the flyer assembly 108 are phased so that when the flyer assembly 108 is in radial alignment with the wire pusher blocks 106, 107, the pusher block adjacent the flyer is in its lowest extreme position with the plane 148 immediately above its upper surface, while the pusher block remote from the flyer 108 is in its extreme uppermost position with its upper surface above the plane 148. Thus, in the position of the flyer assembly 108 shown in solid lines in FIGS. 5c and 10, pusher block 107 is in its extreme lowermost position while pusher block 106 is in its extreme uppermost position, and when the flyer assembly 108 is diametrically opposite, as shown in dashed lines, pusher block 106 is then in its extreme lowermost position while pusher block 107 is in its extreme uppermost position, the reciprocal motion of the wire pusher blocks 106, 107 thus being 180° out of phase. For a reason to be hereinafter more fully described, the extent of the reciprocal motion of the wire pusher blocks 106, 107, i.e., the distance traveled by each block between its extreme lowermost and extreme uppermost positions, is preferably at least equal to the diameter of the largest wire size to be wound.

Referring now particularly to FIGS. 5a, 5b, 6a, 6b, 6d, 7, 8, 9, 11a, 11b, 12 through 18 and 20, the upper frame 41 comprises side plates 212, 214, respectively secured to and extending upwardly from the way 67 and top plate 39 of the housing 38 and secured to and supporting the top plate 42, and a rear wall 215 which likewise is secured to and extends upwardly from top plate 39 of housing 38 and is secured to and supports top plate 42. In the illustrated embodiment, which is arranged to wind two pole groups of windings, each group having four concentric coils, the rear pin assembly 61 comprises four pairs of pins 216, 217, 218 and 219, respectively disposed in a pattern as best seen in FIG. 9. Each of the pins 216, 217, 218, 219 has a distal end 220 and has its opposite end secured to a mounting block 222, the pins thus extending in spaced parallel relationship. For a purpose to be hereinafter more fully described, the pins 216, 217, 218, 219 are progressively shorter, i.e., a distal end 220 of the pair of pins 216 projects beyond the distal end of the pair of pins 217, etc. as best seen in FIGS. 5a and 20f.

Mounting block 222 is in turn secured to a pivot plate 223 which has a pair of ears 224 respectively extending on either side of and pivotally connected to a projection 225 of a slide 226, as by a pin 227. A guide member 228 is provided having a slot 229 formed therein which is closed by a cover member 230, slot 229 serving to guide the slide 226 for vertical movement in the direction shown by the arrows 232.

A pair of longitudinally extending ways 233 are provided secured to the bottom surface of the top plate 42 and disposed on either side of and parallel with an elongated opening 235. A pair of elongated slots 236 are formed in the top plate member 42 respectively parallel with and between the opening 235 and the ways 233, 234. A mounting member 237 is provided slidably mounted in ways 233, 234 and adjustably secured by means of suitable bolts 238 which extend through the slots 236. Mounting member 237 has a rear portion 239 joined to front portions 240 by side portions 241. A pair of guide rods 242 are supported by and extend between the rear portion 239 and the front portions 240 of the mounting member 237 and slidably support guide member 228 and rear pin assembly 61 for transverse movement in the direction shown by the arrows 243. Guide member 228 together with rear pin assembly 61 is selectively moved in the direction shown by the arrows 243 between forward and rear positions by means of a suitable hydraulic cylinder 244 mounted on the rear portion 239 of mounting member 237 and having its piston rod 245 secured to rearwardly extending portion 246 of guide member 228. Cylinder 244 extends rearwardly through a vertically extending slot 247 formed in the rear plate 215.

Guide member 228 has an upper portion 248 which extends upwardly through the elongated opening 235 in the top plate 42. Slide 226 with rear pin assembly 61 is moved vertically in the direction shown by the arrows 232 by means of a suitable hydraulic cylinder 249 mounted on the upper portion 248 of guide member 228 and having its piston rod 250 extending downwardly in the slot 229 and secured to the slide 226. Slide 226 together with the rear pin assembly 61 is thus selectively vertically movable between a lower position shown in solid lines in FIG. 5a, and an upper position, as shown in dashed lines at 252. A limit switch 253 is mounted on the upper portion 248 of the guide member 228 to sense the slide member 226 in its upper position 252. Limit switches 254 and 255 are also respectively mounted on the side portions 241 of the mounting member 237 and respectively engage spaced-apart flanges 256 and 257 for sensing the rearward and forward positions of the guide member 228, respectively.

A plate member 258 is secured to the rear side of guide member 228 and extends downwardly therefrom. Another plate member 259 is secured to plate member 258 and extends forwardly therefrom. Slide 226 has a recess 260 formed therein containing a spring 262 which engages one of the arms 224 of mounting member 223 and normally pivots the same together with the mounting block 222 and the pins 216, 217, 218, 219 forwardly, as shown by the dashed lines 263 in FIG. 5a. However, when the slide 226 is in its lowermost position, arms 224 engage the plate member 259 thus pivoting member 223, mounting block 222 and the rear pin assembly 61 downwardly to a winding position in which the pins are parallel with the axis 44. A locating pin 264 is secured in the bottom end of projection 225 of the slide 226 and extends into a locating opening 265 in plate member 259 when the slide 226 is in its lowermost position.

It will now be seen that the entire rear pin assembly 61 may be selectively moved between a rear and a forward position as shown in FIG. 5a, by actuation of hydraulic cylinder 244, and between a lower winding position and an upper retracted position by actuation of hydraulic cylinder 249, movement of the rear pin assembly 61 to its upper retracted position being accompanied by pivotal movement of the pins forwardly and upwardly as above-described. Further, the forward position of the rear pin assembly 61, which is determined by the length of the coils to be wound, is determined by selective adjustment of the position of the guide member 237. It will further be seen with reference to FIGS. 9 and 10 that when the rear pin assembly 61 is in its lower winding position, the pairs of pins 216, 217, 218, and 219 are symmetrically disposed on opposite sides of a longitudinally extending, i.e., from front to rear, axis 266 which intercepts the winding axis 44.

For a purpose to be hereinafter more fully described, the rear wire pusher block 106 has a plurality of pairs of openings 267, 268, 269, 270 which respectively receive the distal ends of the respective pairs of pins 216, 217, 218 and 219 as the winding assembly is sequentially moved upwardly by the hydraulic cylinders 95, 96 and 97, as will hereinafter be more fully described.

A stripper plate 272 is mounted on the bottom surface of the plate member 259 and extends forwardly to a point adjacent the pairs of pins 216, 217, 218 and 219, as best seen in FIG. 9. As will be hereinafter described, when the rear pin assembly 61 is moved to its retracted position, stripper plate 272 facilitates removal of the fully wound coils from the rear pins.

A cross-over loop pull-out mechanism 273 is provided mounted on the plate member 258. A lever member 274 is pivotally mounted between downwardly extending arms 275 of the plate member 258. Lever member 274 is normally biased to a downward position, as shown in FIG. 5a, by a spring 276 extending between the lever member 274 and plate member 259. The front end 277 of the lever member 274 is actuated to an upper position by means of a conventional hydraulic cylinder 278 mounted on the rear side of the plate member 258 and having its piston rod 279 engaging a pin 280 extending outwardly from lever member 274. Thus, extension of the piston rod 279 of the cylinder 278 in the direction shown by the arrow 282 will result in upward pivotal movement of the end 277 of lever member 274.

A cross-over loop pull-off hook member 283 is pivotally mounted on the forward end 277 of the lever member 274 and having a hook portion 284 at its lower end. Hook member 283 is actuated to a released position by a conventional hydraulic cylinder 285 mounted on the lever member 274 and having its piston rod 286 operatively connected to the upper end 287 of the hook member 283. Thus, retraction of piston rod 286 of cylinder 285 will pivot the hook member 283 so as to move the hook end 284 forwardly to release a cross-over loop of wire engaged therewith as will be hereinafter described. A slot 288 is formed in the rear side of the rear wire pusher block 106 in order to accommodate the hook end 284 of member 283 when the winding assembly 43 is moved upwardly in direction 104.

Another limit switch 291 mounted on the plate member 258 is actuated by a lever member 289 pivotally mounted on one of the arms 275 (FIGS. 11a and 14) and which has its other end arranged to be engaged by the mounting block 223 in its lower position, thereby to sense the positioning of the rear pin assembly 61 in its winding position.

A wire end clamping and cut-off mechanism 290 is provided comprising a lever member 292 pivotally mounted between arms 293 of a bracket member 294 mounted on the upper surface of rear portion 295 of slide 69. A conventional hydraulic cylinder 295 is mounted on the bottom surface of lever member 292 and along with the lever member 292 projects rearwardly through the opening 247 in the rear plate member 215. Piston rod 296 of the hydraulic cylinder 295 extends rearwardly therefrom and is connected by bracket member 297 to the actuating rod 298 of the cut-off and clamping mechanism 299 which is mounted on the upper surface of the lever member 292 adjacent its forward end.

The clamping and cut-off assembly 290 is pivotally moved from an upper inactive position, as shown in solid lines in FIG. 5a to a lower position, by a conventional hydraulic cylinder 300 mounted on the bracket member 294 and having its piston rod 302 connected to the lever member 292 by a yoke 303.

A wire end positioning pin 304 is provided disposed forwardly of the cut-off and clamping mechanism 299 and mounted on a lever member 305 pivotally mounted on one of the arms 293 of the bracket member 294. Wire positioning pin 304 is pivotally moved between an upper position shown in solid lines in FIG. 5a and a lower position shown in dashed lines by a conventional hydraulic cylinder 306 mounted on the bracket member 294 and having its piston rod 307 connected to the lever member 305 by a member 308. Cylinder 295, when extended, positions the actuating rod 298 as shown in solid lines in FIG. 5a and when retracted positions the actuating rod as shown in dashed lines at 309. A pair of limit switches 310, 312 are respectively provided mounted on the lever member 292 for sensing the retracted and extended positions of the actuating rod 298.

Referring now particularly to FIGS. 15 and 16, the cut-off and clamping mechanism 299 comprises lower and upper U-shaped blocks 313, 314 and a cover plate 315 secured to the lever member 292 adjacent its forward end by means of suitable screws 316. The upper block 314 has a slot 317 formed therein which receives the actuating rod 298. Rod 298 has a cut-off and clamping head 318 formed at its forward end. An upper clamping block 319 is positioned between the legs of the upper block 314 and is biased forwardly by means of suitable springs 320. A lower clamping block 322 is positioned between the legs of the lower block 313 and is likewise biased forwardly by suitable springs 323. Forward cut-off end clamping plates 324 and 325 are respectively secured to the forward ends of the blocks 313, 314 by means of suitable screws 326, 327. The clamping and cut-off head 318 includes two hook portions 328, 329, respectively spaced above and below the actuating rod 298. Serrated wire clamping portions 330, 332 are respectively formed on the forward ends of the blocks 319, 322 and respectively extend into the cut-out portions 333, 334 of the front plate members 325, 324. The two cut-out portions 333, 334 are laterally off-set, as best seen in FIG. 16. For a purpose to be hereinafter described, the clamping and cut-off head 318 has sharp edges 335, 336 on opposite sides thereof respectively extending between the actuating rod 298 and the hook portions 328, 329, these sharp edges 335, 336 being closely spaced from corresponding sharp edges 337, 338 of the front plate members 325, 324. The head 318 has rounded edges 339, 340 on its sides opposite the sharp edges 335, 336 and respectively transversely spaced from corresponding rounded edges 342, 343 of the plate members 325, 324 thereby exposing portions of the serrated wire clamping portions 330, 332, respectively.

The front pin assembly 45 is mounted on the end 46 of the pivoted arm 47 in the manner now to be described. An opening 344 is formed in the arm 47 adjacent end 46 and a bearing member 345 is seated therein and secured thereto. A mounting member 346 is provided having an upper journal surface 347 rotatably supported in the bearing member 345 by means of suitable bearings 348, 349 and having a lower portion 350 depending below arm 47. A positioning member 352 is provided secured to the upper end of the mounting member 346. A spur gear 353 is formed on the upper portion of the positioning member 352 and a plurality of pairs of positioning notches 354, 355 are formed in the lower portion of positioning member 352. In the illustrated embodiment for winding two pole groups of concentric coils, two pairs of diametrically opposite positioning notches 354, 355 are provided, as best seen in FIG. 4.

Two groups 356 and 357 of elongated pins are provided in the illustrated embodiment for winding two pole groups of coils, each having four concentric coils. Group 356 comprises outer pairs of pins 358, 359, 360 and 362 and inner pairs of pins 363, 364, 365 and 366. Group 357 comprises outer pairs of pins 367, 368, 369 and 370 and inner pairs of pins 372, 373, 374 and 375. An outer pair of pins 376 and an inner pair of pins 377 are common to the two groups 356, 357. Inspection of FIGS. 9 and 19g will reveal that the outer and inner pins are disposed on concentric circles 540, 542 coaxial with the axis 56 of the front pin assembly 45, which is the axis of rotation of the mounting member 346 and the positioning member 352.

Each of the outer pins has a distal end 378, the pairs of pins 358, 367 being the longest and the pairs of pins 359 and 368, 360 and 369, and 362 and 370 being progressively shorter. Each of the inner pins likewise has a distal end 379 with the pairs of pins 363 and 372 being the longest and the pairs of pins 364 and 373, 365 and 374, and 366 and 375 being progressively shorter.

The common outer pins 376 are mounted on the lower end of the depending portion 350 of the mounting member 346 and extend downwardly therefrom parallel with the axes 44, 56. Portion 350 has a cylindrical cavity 380 formed therein extending upwardly from its bottom end. The common inner pins 377 are mounted on the bottom wall 382 of the cavity 380 and extend downwardly therefrom likewise parallel with the axes 44, 56. The inner and outer pins comprising group 356 are mounted on a mounting block 383 and extend downwardly therefrom while the outer and inner pins comprising group 357 are mounted on a mounting block 384 and extend downwardly therefrom, all of the pins of the front pin assembly 45 being in spaced parallel relationship.

For a purpose to be hereinafter described, front wire pusher block 107 has pairs of outer openings 385, 386, 387 and 388 and pairs of inner openings 389, 390, 392 and 393 formed therein respectively in alignment with the outer and inner pins of the groups 356, 357 for receiving the same as the winding assembly 43 is moved upwardly (FIGS. 10 and 20).

The pin mounting blocks 383, 384 are respectively secured to semi-cylindrical slide members 394, 395 which extend upwardly in the cavity 380 in the mounting member portion 350 in side-by-side relationship. Slide members 394, 395 respectively have semi-cylindrical grooves formed in their facing surfaces for accommodating the common inner pins 377.

Actuating rods 396 and 397 extend downwardly through openings in the positioning member 352 and mounting member portion 346 and have their lower ends respectively connected to the slides 394, 395. Suitable springs normally bias actuating rods 396, 397 together with the respective slides 394, 395 and the pin groups 356, 357 connected thereto upwardly to a coil-transferring and unloading position, slide 395 and pin group 357 being shown in this position in FIG. 5a. A group 400 of actuating hydraulic cylinders 402, 403, 404 and 405 is mounted on top plate 406 which is supported above the positioning member 352 by side plates 407, 408 which, in turn, are mounted on bearing member 345. The piston rods of the two cylinders 403 are connected together by a bridge member 411 which engages the upper end of one or the other of the actuating rods 396, 397 depending upon the rotational position of positioning member 352 and the finger groups 356, 357. Thus, actuation of the cylinders 403 and extension of their piston rods will move one or the other of the actuating rods 396, 397 downwardly against the force exerted by the respective spring 398, 399, thereby to move one or the other of the slides 394, 395 and the associated pin group 356 or 357 downwardly to a winding position. In FIGS. 5a, 6a and 9, positioning member 352 is shown in a rotational position in which pin group 356 is in facing relationship with the rear pin assembly 61 and with the pins thereof symmetrically disposed on either side of the axis 266, FIG. 5a further showing the cylinders 403 actuated to extend their piston rods and to thereby move actuating rod 396, slide 394 and pin group 356 downwardly to the winding position.

A pair of clamping arms 409, 410 are respectively pivotally mounted on each of the pin mounting blocks 383, 384. The clamping arms 409, 410 are normally biased to closed positions, as shown in dashed lines in FIG. 2 and in FIG. 7, by suitable springs 412, but are pivotally moved to released positions by selective downward movement of slide members 413, 414 which are respectively connected to actuating rods 415, 416. Actuating rods 415, 416 extend upwardly through openings in positioning member 352 and mounting member portion 346 and are normally urged ot their upward positions by suitable springs 417, 418. Actuating rods 415, 416 are selectively moved downwardly, thereby respectively to move slide members 413, 414 downwardly so as to pivot the respective arms 409, 410, outwardly to their released positions, by actuating of cylinders 402, 405 causing extension of their respective piston rods so as to engage and depress the respective actuating rods 415, 416.

Coil stripping members 419, 420 are provided normally seated in recesses in the bottom surfaces of the finger mounting blocks 383, 384. Stripping members 419, 420 are respectively connected to actuating rods 422, 423 which extend upwardly through the respective slides 394, 395, the mounting member portion 346, and positioning member 352. Actuating rods 422, 423 are normally biased upwardly so as to position the stripping members 419, 420 in their respective recesses by means of suitable springs 424, 425. The upper ends of actuating rods 422, 423 are respectively connected by bridging members 426, 427 and both are simultaneously actuated by extension of the piston rod of cylinder 404.

The bridging members 426, 427 have extension portions 426a, 427a which actuate limit switch 428 when the cylinder 404 has been actuated to move the actuating rods 422, 423 and the strippers 419, 420 to their lower coil-unloading positions. It will be observed in FIG. 4 that the extensions 426a, 427a of the bridging members 426, 427 respectively associated with the actuating rods 422 and 423 respectively extend in opposite directions so that limit switch 428 is actuated when the positioning member 352 is in either of its two rotational positions.

The front pin assembly 45 is selectively rotated by means of the rotating mechanism 59 on the top plate 42. A pinion 429 is rotatably mounted on the top plate 42 and meshes with the gear portion 353 of the positioning member 352 when the arm 47 is pivoted to its winding position. Pinion 429 further meshes with gear 430 driven by a suitable actuating motor 432. Suitable cams 433, 434 are also driven by the actuating motor 432 and actuate limit switches 435, 436 for a purpose to be hereinafter more fully described. Gear 430 also drives program cams 437, 438, 439, 440 and 442 respectively associated with limit switches 443, 444, 445, 446 and 447, the purpose of which will be hereinafter described, through a gear train comprising gears 448 and 449 and pinion 450. Gear 430 and the connecting gear including gear portion 353 of the positioning member 352 is retained in selected rotational positions by means of a suitable shot pin 452 actuated by a conventional hydraulic cylinder 453, a suitable limit switch 454 sensing when the shot pin 452 is retracted.

Positioning member 352 and the front pin assembly 45 are further adapted to be rotated by a predetermined small angular amount, as will hereinafter be described, by shot pins 455 and 456 mounted on the upper surface of arm 47. Shot pins 455 and 456 are respectively selectively actuated by conventional hydraulic cylinders 457 and 458, and selectively engage notches 354 and 355 in the positioning member 352. As will be hereinafter more fully described, shot pin 455 when in engagement with one of the notches 354 suitably positions the member 352 in the front pin assembly 45 for winding. However, when the shot pin 455 is retracted and shot pin 456 extended to engage one of the notches 355, positioning member 352 and the front pin assembly 45 is rotated by a predetermined small angular amount in order to unload the coils therefrom onto the fingers of the coil inserter.

Referring now particularly to FIGS. 4 and 18, arm 47 has a portion, indicated in dashed lines 459 which in the winding position, extends under the forward portion of the top plate 42. Arm 47 is locked in its winding position by means of a shot pin 460 actuated by a conventional hydraulic cylinder 462 and selectively engaging an opening 463 in portion 459 of the arm 47. A suitable limit switch 464 senses positioning of the arm 47 in its winding position and another limit switch 465 senses engagement of the shot pin 460 in the opening 463.

Referring now particularly to FIGS. 2, 3, 4, 11a, 11b and 13, end 48 of arm 47 is pivotally mounted on the upper journal end 466 of post 51 by means of suitable bearings 467. Arm 47 may be pivotally moved from its winding position as shown in solid lines in FIGS. 2, 3 and 4 to its unloading position as shown in dashed lines in FIGS. 2 and 3 by means of a suitable gear 468 secured to a cap 469 which, in turn, is secured to the end 48 of the arm 47. Gear 46 is driven by means of a suitable drive motor 470 mounted on the top plate 42 through a gear train including gears 472, 474.

A suitable roller 475 is mounted on the end 48 of arm 47 and when the arm has been rotated to its unloading position, is received in a vertically extending slot in the guide member 476 mounted on the exterior surface of side plate 212 which thus guides the arm 47 during its downward movement, as will shortly be described. A limit switch 477 senses when the arm 47 has been pivotally moved to its unloading position.

Arm 47 with the front pin assembly 45 and previously wound coils thereon, after pivotal movement to its unloading position, is moved downwardly to its cooperative relationship with the fingers 34 of the coil inserter 31 by means of the hydraulic cylinder 53 having its piston rod 55 operatively connected to post 51 by means of a link 478. A suitable limit switch 479 mounted on the bearing member 52 senses when the arm 47 has been lowered to its lower position with the front pin assembly 45 in cooperative relationship with the coil inserting fingers 34.

It will now be seen that the winding assembly 43 including the wobble plate assembly 105 and the flyer assembly 108 is selectively movable upwardly in direction 104 in predetermined increments, as will hereinafter by described, by selective actuation of the cylinders 95, 96, 97. The rear pin assembly 61 is selectively movable between an upper position 263 and a lower winding position, and also, when in its upper position, between rear and forward positions. In the illustrated embodiment for winding two pole groups of concentric coils, the front pin assembly 45, when in the winding position of the arm 47, is selectively rotatable between a first position in which the pin group 356 is in cooperative relationship with the rear pin assembly 61, and a second position in which the other pin group 357 is in cooperative relationship with the rear pin assembly 61. Each of the pin groups 356, 357, when in its position in cooperative relationship with the rear pin assembly 61, may further be moved downwardly to a winding position. Finally, the arm 47 with the front pin assembly 45 thereon may be selectively pivotally moved from the winding position to an unloading position and then lowered so that the front pin assembly 45 embraces the coil inserted fingers 34 for transfer of the coils thereto.

Returning momentarily to FIG. 5d, the timing assembly 144 includes a turn counting disc 479 mounted on the timing shaft 143 and cooperating with a photoelectric sensing device 480 mounted upon a bracket 481. A plurality of commutators 482, 484, and 486 are respectively mounted on the timing shaft 143 and respectively cooperate with brushes also mounted on the bracket 481.

Referring now also momentarily to FIGS. 5e and 6c a plurality of limit switches 488, 489, 490, 492, 493, 494, 495 are mounted in vertically spaced apart relationship upon brackets 496 secured to the side frame member 86. A plurality of appropriately spaced apart limit switch stops 497, 498, 499, 500, 502, 503 and 504 are mounted upon a rod member 505 secured to and depending from the support plate 84 and cooperating with the limit switches 488 through 495, as will hereinafter be described.

OPERATION

Starting with the at rest condition with no coils on the front pin assembly 45, the winding assembly 43 including the wobble plate assembly 105 and the flyer 108 is in its lowermost position, thus causing stop 497 to actuate limit switch 488 (FIG. 6c). The arm 47 is in its full-up position and pivoted to its winding position with the gear portion 353 of the positioning member 352 in mesh with gear 429 (FIGS. 1, 2, 3, 4, 5a, 5b, 6a) both of the sides 394, 395 and their respective pin groups 356, 357 are in their uppermost positions and the pairs of clamping fingers 409, 410 are in their closed positions (FIGS. 1 and 2).

Slide 226 and rear pin assembly 61 are in their uppermost positions thus closing limit switch 253 and mounting member 246 and the rear pin assembly 61 are in their rearmost positions thus closing limit switch 254 (FIG. 5a). Referring additionally to FIG. 19a, the flyer 108 is to the rear and on one side of the axis 266, as shown in solid lines at 108d. The clamping and severing head 318 is fully retracted and the free end 506 of the wire 154 is clamped between the upper portion of the head 318 and the clamping portion 330 (FIGS. 5a, 15 and 19a), limit switch 310 being thereby closed.

The shot pin 460 is seated in the opening 463 in portion 459 of arm 47 thereby locking the arm in its winding position and limit switches 464 and 465 are both closed (FIG. 18). With the arm 47 pivoted to its winding position, limit switch 477 is open (FIGS. 4 and 11a). Both of the stripping members 419, 420 are in their upper positions and limit switch 428 is open (FIGS. 5a, 5b and 6a).

Shot pin 455 is extended to engage a respective notch 354 in the positioning member 352 and shot pin 456 is retracted (FIG. 4). Shot pin 452 is extended to engage an appropriate notch in the index member 431 attached to gear 430 and the indexing drive motor 432 is in its "start" position (FIGS. 4 and 17). The brake portion of the clutch-brake 137 is energized and the flyer drive motor 135 is de-energized (FIGS. 5d and 13).

A cycle of operation is now initiated which may either be in response to manual actuation by an operator of a "start" switch, or may be automatic in response to conventional interlock circuitry which provides a signal indicating that all of the assemblies are in their at rest positions, as above described. The cylinder 244 is first actuated to extend its piston rod 245 and thereby move the mounting member 246 and the front rear pin assembly 61 to its forwardmost position at which point the limit switch 255 is actuated, which, in turn, actuates cylinder 249 to move the slide 226 and the rear pin assembly 61 downwardly to its winding position (FIG. 5a). At the same time, cylinders 403 of the pin actuating assembly 58 are actuated to extend their piston rods and the bridging member 409 to move the respective slide 394, 395 and the associated pin group 356, 357 downwardly to its lowermost winding position. Here, pin group 356 is shown as being in winding relationship with the rear pin assembly 61 and thus actuation of cylinders 403 will push the actuating rod 396 downwardly against spring 398 thereby to move slide 394, pin mounting block 383 and pin group 356 downwardly to the winding position (FIGS. 5a, 5b). Also at the same time, cylinder 402 is actuated to extend its piston rod and thereby to push actuating rod 415 downwardly against spring 417 so as to pivotally move the clamping fingers 409 to their open position (FIGS. 5a, 5b, 7).

When the rear pin assembly 61 has been moved outwardly to its winding position, limit switch 255 is actuated (FIGS. 5a and 11a). This actuates cylinder 306 to lower the wire positioning pin 304 from its initial upper position disposed over the free end 506 of the wire 154 to a lower position thereby to engage and lower the wire to the level of the wire pusher blocks 106, 107 (FIGS. 11a, 12 and 19a). Cylinder 285 is actuated thereby to extend its piston rod 286 and to pivot arm 283 with its hook end 284 rearwardly. At the same time, cylinder 278 is actuated to retract its piston rod 279 so that the spring 276 pivots the lever member 274 downwardly thereby to move the hooked end 284 downwardly to the winding level (FIGS. 5a, 11a, 12).

Cylinder 95 is now actuated to raise the winding plate assembly by a first increment, which in a specific embodiment is 3/16 inch. This moves stop 497 away from limit switch 488 and causes stop 498 to actuate limit switch 489 (FIGS. 5e and 6c). Referring now particularly to FIGS. 9, 10 and 20a, this initial upward movement of the winding assembly 43 by the first increment moves the wire pusher blocks 106, 107 upwardly so that the distal ends 220 of the inner pair of rear pins 216 enter the openings 267 in the rear pusher block 106, and the distal ends 378 of the inner pair of pins 358, 363 of the front pin group 356 into the respective openings 385, 389 of the front wire pusher block 107, the distal ends 220, 378, 379 of the remaining rear and front pins remaining spaced above the upper surfaces of the wire pusher blocks 106, 107 by distances greater than the diameter of the wire 154.

Closing of limit switch 489 by the stop 498 in response to upward movement of the winding assembly 43 releases the brake 137 and starts the flyer motor 135 at slow speed, such as 50–100 r.p.m., and also actuates the turn counter 480 (FIG. 5d).

Assuming now a clockwise rotation of the flyer 108, as shown by the arrow 510 in FIG. 19a, the flyer will rotate from its initial position, as shown in solid lines at 108d, in the circular path 147 in the winding plane 148 through the position shown in dashed lines at 108a toward the position shown in dashed lines at 108b thereby wrapping the wire 154 around rear pin 216 and front pins 358, 363, as shown.

At approximately 180° of rotation of flyer 108 from its starting position, commutator assembly 482 (FIG. 5d) which is rotated by the timing shaft 143 at the same speed as the flyer 108 makes contact with the respective brush assembly resulting in actuation of cylinder 278 to extend its piston rod 279 thereby to pivot lever member 277 and hook assembly 283 upwardly, and cylinder 306 is actuated thereby to extend piston rod 307 so as to pivot lever member 305 and pin 304 upwardly (FIGS. 5a, 11a, 12), it being observed that the wire 154 wound on the rear and front pin assemblies 61, 45 during the first 180° of rotation of flyer 108 is not passed around and thus has not been engaged by the hook 384. The flyer drive motor 135 is also at this point actuated for operation at a predetermined higher speed, which may be in excess of 2000 r.p.m., for winding the remainder of the coil, and a timing relay (not shown) is also actuated.

Referring now momentarily to FIGS. 5c and 10, it will be recalled that the wobble plate assembly 105 and flyer 108 are arranged so that when the flyer is in alignment with the axis 266, the wire pusher block adjacent thereto is in its lowermost position while the wire pusher block remote therefrom is in its uppermost position. Referring now particularly to FIGS. 20a, b, c and d in addition to FIGS. 19a and b, at the start of the cycle with the flyer 108 positioned adjacent axis 266 and toward the rear, i.e., rearwardly of the rear pin assembly 61, wire pusher block 106 will be at its lowermost position while wire pusher block 107 will be at its uppermost position as shown in FIG. 20a (the lowermost position of wire pusher block 107) is shown in dashed lines at 107a. This permits flyer 108 during the start of its first 180° of rotation to wind the wire 154 around one of the pins 216 on top of the wire pusher block 106.

Referring now to FIG. 20b in addition to FIG. 19a, when the flyer 108 has completed its initial 180° of rotation, being now in a position close to that shown at 108b in FIG. 19a, wire pusher block 107 has been moved downwardly by the wobble plate assembly 105 in the direction shown by the arrow 206a to its lowermost position 107a below the winding plane 148 so that the flyer 108 winds the wire 154 around the front pins 358, 363 on top of the wire pusher block 107. Meanwhile, wire pusher block 106 has been moved upwardly by the wobble plate assembly 105 in the direction shown by the arrow 206b to its uppermost position shown in solid lines (the lowermost position being shown in dashed lines 106a) above the winding plane 148 thereby pushing the portion of the wire 154 wound around pin 216 upwardly thereon in the direction shown by the arrow 519 away from the winding plane.

Reference to FIG. 19a will now reveal that as the flyer continues its rotation in the direction 510 from the position shown at 108b to the position shown at 108c, i.e., approximately 450° from its starting point, one turn of an inner coil 511 has been wound on the rear and front pin assemblies 61, 45, the rear pins 216 forming a rear end portion 512, the rear and front pins 216, 358 respectively forming side portions 513, 514 and the front pins forming a front end portion 515. For a purpose to be hereinafter described, front pins 358, 363 respectively form portions 516, 517 of the end portion 515 which are inclined toward the axis 266 while the pair of pins 363 form portion 518 which joins the portions 516 and 517.

Referring now additionally to FIG. 20c, when the flyer 108 is rotated from its position 108b to generally its position shown at 108a in FIG. 19a, the wobble plate assembly 105 has again moved the rear wire pusher block 106 downwardly in the direction shown by the arrow 206a to its lowermost position 106a and has moved the front pusher block 107 upwardly in the direction shown by the arrow 206b to its uppermost position, thereby pushing the end portion 515 of the coil 511 upwardly on pins 358, 363 in the direction shown by the arrow 519 away from the winding plane 148. Recalling that the wire initially wound around the pin 216 has been pushed upwardly thereon in direction 519, downward movement of the wire pusher block will leave a space 521 previously vacated by the section of wire pushed upwardly on pin 216, and the flyer 108 now winds the end portion 512 of the first turn in that space.

Reference to FIG. 20d will now reveal that as rotation of the flyer 108 continues accompanied by the reciprocal movement of the wire pusher blocks 106, 107 imparted by the wobble plate assembly 105 each end portion 512, 515 is wound in a space 521 vacated by a previously wound end portion, and that each end portion 512, 515 so wound when pushed upwardly in direction 519 by the respective wire pusher blocks 106, 107, will push the previously wound end portions upwardly thereby to form the complete coil 511.

It will now be seen that the coil is formed or generated by winding the individual turns on the rear and front pin assemblies 61, 45 in the winding plane 148 which is fixed with respect to the pins (during the winding of each coil), each turn which is so wound being pushed on the pins in the direction away from the winding plane and each successive turn as it is wound thus pushing previously wound turns away from the plane to form the complete coil.

It will further be observed that the distances moved by the wire pusher blocks 106, 107 between their extreme lowermost and uppermost positions, i.e., the space 521 is not critical. While the thickness of the space 521 is preferably at least as great as the diameter of the wire 154, it will be seen that even if it is slightly less than the wire diameter, the wire being wound on the pins in the space 521 under the previously wound and pushed turn will be squeezed into this space thus further pushing the previously wound turn upwardly in direction 519. On the other hand, the space 521 can be substantially greater than the diameter of the wire being wound since each successive turn when pushed upwardly in direction 519 by the distance 521 will still engage the turn wound just before and will push it and all of the previously wound turns upwardly. Thus, in the design of the apparatus of the invention, the travel of the wire pusher blocks 106, 107, and thus the dimension of the space 521, if made sufficiently great to accommodate the diameter of the largest wire size to be wound, will automatically accommodate all smaller wire sizes.

Returning now to the cycle of operation, after the first three or four turns have been so wound, the aforementioned timing relay times out resulting in actuation of cylinder 285 to retract its piston rod 286 and pivot the hook member 283 and the hook end 284 forwardly. However, as has previously been pointed out, the hook 283 serves no function during the winding of the innermost coil 511. Timing out of the timing relay after the first three or four turns are wound further releases the hydraulic pressure applied to the cylinder 295 thereby to release the clamping force exerted by the clamping and cut-off head 318 so as to release the clamped end 506 of the wire 154 (FIGS. 5a, 19a).

The winding of the inner coil 511 now continues, as above described, with the counter apparatus 479, 480 (FIG. 5d) counting out the predetermined number of turns desired to be wound. The counting apparatus is conventional and includes an early warning feature (not shown) which provides a signal at a predetermined number of turns in advance of the total number of turns in the coil, for example, six to eight turns, at which point the flyer drive motor 135 is actuated to its slow speed operation. When the predetermined desired number of turns of the inner soil 511 have been wound, as counted by the turn counting apparatus 479, 480, the flyer drive motor 135 is stopped and the commutator assembly 482 (FIG. 5d) actuates the brake 137 to stop the flyer 108 at the proper position toward the rear and on one side of the axis 266. In the event that winding has been in the clockwise direction 510, flyer 108 is stopped in the position as shown in dashed lines 108a in FIG. 19b.

Actuation of the index cam assembly 442 (which is interlocked with the turn counting apparatus and thus not effective until the predetermined number of turns of the coil have been wound) further actuates cylinder 96 to extend the same by the amount of its stroke, which in a specific embodiment is ⅜ inch and retracts cylinder 95 by the amount of its stroke which as indicated in a specific embodiment is 9/16 inch, thereby resulting in a net upward movement of the winding assembly 43 in the direction 104 by a predetermined increment so as to wind the next concentric coil. In the specific embodiment, this net incremental upward movement is ⅜ inch. This upward movement of the winding assembly 43 is accompanied by the stop 498 moving off the limit switch 489 and stop 499 actuating limit switch 490 (FIGS. 5e and 6c).

At the same time, cylinder 306 is actuated to pivot lever member 305 and pin 304 downwardly (FIGS. 5a, 11a, 12), although this movement of pin 304 is not used at this point in the cycle, cylinder 285 is actuated thereby to extend its piston rod 286 and pivot the hook member 283 and hook 284 toward the rear, and cylinder 278 is actuated to retract its piston rod 279 thus causing spring 276 to pivot lever member 277 and the hook member 283 downwardly thereby to position the hook 284 so as to pull-off a loop of the first turn of the second coil (FIGS. 5a, 11a, 12 and 19b).

Referring to FIGS. 20a through d, it will be observed that in the first incremental position of the winding assembly 43 above its lowermost position, as a result of actuation of cylinder 95, as heretofore described (FIGS. 5e and 6c), the winding plane 148 intercepts portions 216a and 358a of the pins 216, 358 adjacent their distal ends 220, 378 (and also corresponding portions of the pins 363 adjacent their distal ends) which project downwardly beyond the distal ends of the remaining pins. Referring now particularly to FIG. 20e, the aforesaid incremental upward movement of the winding assembly 43 together with the wire pusher blocks 106, 107 to the position for winding the second coil results in the distal ends 220, 378 of the pins 217, 359, and also the distal ends of the pins 364, entering the corresponding openings 268 in the rear pusher block 106, and 386, 390 in the front pusher block 107 (FIG. 10), and it will further be observed that the winding plane 148 now intercepts portions 217a, 359a of pins 217, 359 adjacent their distal ends (and also corresponding portions of the pins 364) which project downwardly below the remaining pins.

Actuation of limit switch 490 in response to the aforesaid upward movement of the winding assembly 43 to its second incremental position again starts the flyer drive motor 135 at slow speed.

Referring particularly to FIGS. 19b and 20e and observing that the hook member 283 is in its lower position, rotation of the flyer 108 from the position shown in dashed lines 108a to its position shown in solid lines in FIG. 19b will cause the end portion 512a to be engaged with the hook 284 the wire then being wound around pin 217, as shown, to start forming the second coil 520.

The winding then proceeds in the same manner as the above-described winding of the first coil, clockwise rotation in direction 510 of the flyer 108 winding the second coil 520 on the pins 217 of the rear pin assembly 61 and the pins 359, 364 of the front pin assembly 45 with the reciprocal movement of the rear and front pusher blocks 106, 107 in direction 206 pushing the turns of the second coil 520 upwardly in direction 519 on the pins 217, 359, 364 thereby to form the second coil 520 thereon concentric with the first coil 511.

As in the case of winding the first coil 511, when the flyer 108 reaches a position approximately 180° away from its initial position, i.e., close to the position shown at 108b of FIG. 19a, commutator assembly 482 actuates cylinder 278 to extend its piston rod thereby pivoting lever member 277 upwardly thereby raising hook member 283 in the direction shown by the arrow 524 to its upper position as shown in dashed lines 283a in FIG. 20e to thereby pull-out a predetermined length of slack wire from the source (FIGS. 5a, 5d, 19b and 20e). Recalling now that the last turn wound, 513a, 514a of the first coil 511, is at the bottom of that coil, whereas the first turn wound 513b, 514b of the second coil will ultimately be at the top thereof as a result of the aforementioned pushing of successive turns upwardly in direction 519 (FIG. 20f), the loop 512a (FIG. 19b) thus pulled-off by the hook 284 forms the interconnection between the inner coil 511 and the second coil 520, as shown by the dashed line 525 in FIG. 20f.

Cylinder 306 is again actuated to extend its piston rod 307 and move lever member 305 and pin 304 upwardly (FIGS. 5a, 11a and 12) and the flyer drive motor 135 is again actuated to operate at low speed and the timing relay is actuated. Again, after three or four turns of the second coil 520 have been wound, the timing relay times-out, thus actuating cylinder 285 to retract its piston rod 286 thereby pivoting hook member 283 forwardly to release hook 284 from the loop 512a. Winding then continues at high speed until the early warning provided by the turn counter assembly 479, 480 and the steps involved in terminating the winding of the second coil 520 thus proceed in precisely the same manner as in the case of the termination of the winding of the first coil 511, i.e., the flyer drive motor is reduced to slow speed, and the brake is actuated by the commutator assembly 482 to stop the flyer in the position shown at 108d in FIG. 19e. The commutator assembly 482 (FIG. 5d) now again actuates cylinder 95 to extend its piston rod, cylinder 96 remaining extended, and thus the winding assembly 43 is raised by its third increment, which in the specific embodiment is another 3/16 inch or a total of 9/16 inch above its lowest position for winding the third coil 522 on the pins 218 of the rear pin assembly 61 and the pins 360 and 365 of the front pin assembly 45. Upward movement of the winding assembly 43 in the direction 104 by a third increment causes the stop 499 to deactuate limit switch 490 and stop 500 to actuate limit switch 492 (FIG. 5e and 6c). The same sequence of operation as above described in connection with winding the first and second coils 511, 520 is then repeated for winding the third coil 522.

After winding of the third coil has been completed, commutator assembly 482 retracts cylinders 95 and 96 and extends cylinder 97 thereby to raise the winding assembly 43 by its fourth increment, which in the specific embodiment raises the winding assembly to a total of 3/4 inch above its lowermost position, and thereby to wind fourth concentric coil 523, limit switch 493 now being actuated by stop 502 (FIGS. 5e, 6c). Winding of the fourth concentric coil 523 now proceeds in the same manner as above-described in connection with the inner coils 511, 520, 522.

In the illustrated embodiment in which only four concentric coils 511, 520, 522 and 523 are being wound in each pole group, upon completion of the winding of the outer coil 523, commutator assembly 482 extends both of the cylinders 95, 96 along with cylinder 97 remaining extended, thereby to raise the winding assembly 43 to its uppermost position which, in the specific embodiment, is 1 1/8 inch above its lowermost position, thus causing stop 504 to actuate limit switch 495 (FIGS. 5e and 6c). With only four coils being wound, limit switch 494 is bypassed.

Program cams 437 through 441 are arranged in a predetermined pattern in accordance with the number of pole groups of coils to be wound, the number of concentric coils in each group, and the direction of winding for the respective groups, i.e., clockwise and/or counterclockwise. The apparatus of the illustrated embodiment is arranged to wind two pole groups of coils 525, 526, each group comprising four concentric coils 511, 520, 522 and 523, the coils of the first group 525 being wound in clockwise direction 510, as above described, and the coils of the second group 526 as being wound in the counterclockwise direction 531.

As previously indicated, commutator assembly 482 actuates brake 137 to stop the flyer assembly 108 in the the winding of each coil 511, 520, 522, 523, and thus, position 108a (FIGS. 19a, 19b, 19c) at the conclusion of the flyer 108 is stopped in position 108a upon completion of the winding of the outer coil 523, as shown in FIG. 19c. Movement of the winding assembly 43 to its uppermost position and the accompanying actuation of limit switch 495 breaks an interlock circuit initally set up by actuation of limit switch 489 (FIG. 6c) in order to permit subsequent downward movement of the winding assembly 43, as will shortly be described. Actuation of limit switch 495 further deactuates cylinder 402 so that slide 413 and actuating rod 415 move upwardly under the influence of spring 417 so that spring 412 closes the clamping fingers 409 thereby to retain the coils 511, 520, 522, 523 of the first pole group 525 on the pin group 356 during the subsequent rotation of the front pin assembly 45, to be shortly described (FIGS. 5a, 5b, 7).

Actuation of limit switch 495 further actuates cylinder 295 to retract the same thereby extending rod 298 to its extended position 309 (FIGS. 5a and 15). Referring to FIG. 19c, with the flyer 108 stopped in position 108a it will be seen that a length of wire 512b extends from the flyer 108 to one of the pins 219. This length of wire 512b is pulled-out, clamped and cut off prior to winding of the next pole group 526, as will shortly be described. Determination of whether the upper or lower portion of the clamping and cut-off head 318 picks up the length 512b (FIGS. 5a and 15) is made by one of the program cams 437 through 441. In this case, since the next direction of rotation will be counterclockwise, program cam 439 is positioned to actuate limit switch 445 and thus, when limit switch 495 (FIG. 6c) is actuated as above-described, cylinder 300 is actuated to raise lever member 292 and the clamping and cut-off assembly 299 (FIGS. 5a, 12) so that the bottom part of the cut-off and clamping head 318 picks up the length 512b (FIGS. 5a and 15).

Thus, the lever member 292 and the cut-off and clamping assembly 299 is raised and the rod 298 and head 318 extended simultaneously to position 309 thereby to engage the bottom portion 318b of head 318 with the length 512b (FIGS. 5a, 15 and 19c). Extension of the rod 298 to its fully forward position by the cylinder 295 closes limit switch 312 which immediately again actuates cylinder 295 to retract rod 298 and head 318 thus pulling the loop 512b of wire toward the plate member 324 into the opening 334 in the direction shown by the arrow 527 (FIGS. 5a, 15 and 19c). When the lower portion 318b of the head 318 enters the opening 334 in plate 324, the sharp edges 336, 338 cooperate to cut-off the wire, as at 528, thereby providing an end 529 for the pole group 525, and a new free end 530 of the wire 154 which is clamped between the portion 318b and the clamping portion 332 (FIGS. 15 and 19c).

Retraction of the rod 298, as above-described, again actuates limit switch 310. Actuation of limit switch 310 in turn actuates cylinder 249 to raise the rear pin assembly 61 in direction 232 to its upper position. As soon as slide 226 and arms 224 move upwardly away from plate member 259, spring 262 causes the arms 224, mounting member 223, block 222 and the rear pins to pivot forwardly, as shown in dashed lines 263, thereby to free and remove the rear pin assembly 61 from the coils 511, 520, 522, and 523 (FIG. 5a). Upward movement of the rear pin assembly 61 to its upper position actuates limit switch 253 which in turn actuates cylinder 244 to move the mounting member 246 and the rear pin assembly 61 rearwardly to its rearmost position, thereby actuating limit switch 254 (FIG. 5a).

Actuation of limit switch 310 further actuates cylinders 403 to retract its piston rod thus permitting actuating rod 396, slide 394 and the front pin group 356 with the pole group 525 of coils retained thereon by the clamping fingers 409 to move upwardly under the influence of spring 398 to the upper position.

Actuation of limit switch 254 (FIG. 5a) actuates all three cylinders 95, 96, 97 fully to retract the same and thus to lower the winding assembly 43 to its lowermost position. Return of the winding assembly 43 to its lowermost position again causes stop 497 to actuate limit switch 488 (FIGS. 5c, 5e, 6c).

Actuation of limit switch 488 actuates cylinder 453 to retract the index shot pin 452 closing limit switch 454, and also actuates cylinder 457 to retract shot pin 455 so as to permit indexing of the front pin assembly 45 (FIGS. 4 and 17).

Closing the limit switch 454 actuates the indexing motor 432 so as to rotate gears 430, 429 and 353 and in turn the front pin assembly 45. In the illustrated embodiment adapted to generate two pole groups of coils 325, 326, the front pin assembly 45 is rotated or indexed by 180° thus to move the other pin group 357 into winding relationship with the rear pin assembly 61. However, since the apparatus can be utilized in the forming of four or six pole groups in addition to two pole groups (four and six pole stators), the index portion 431 attached to gear 430 is shown as being provided with a plurality of notches cooperating with the shot pin 452. Index cams 433, 434 are driven by the index motor 432, cam 433 having adjustable stops thereon to provide a 180°, 90°, or 60° index, as required for winding two, four or six pole groups. Index cam 434 is arranged to actuate limit switch 436 approximately 45° prior to the end of the indexing rotation which, in turn, actuates cylinder 453 to start extending the index shot pin 452, the indexing continuing until the index cam 433 actuates limit switch 435. At the proper position, 180° in the case of the illustrated embodiment, the index shot pin engages the appropriate notch in the index member 431 thereby to terminate rotation of the front pin assembly 61. Meanwhile, actuation of limit switch 435 by the indexing cams 433 causes reversal of the indexing drive motor 432 which ratchets back to its initial position. Actuation of limit switch 435 further actuates cylinder 457 to extend shot pin 455 to engage notch 354 in the positioning member 352 (FIGS. 4 and 17).

Rotation of the indexing gear 430, as above described, also rotates the program cams 437 through 441 through the gear train 448, 449, 450. Upon completion of the indexing operation, program cam 437 actuates limit switch 443 to restart the winding cycle, as above described, program cam 440 and limit switch 446 now actuating the flyer drive motor 135 to rotate in the counterclockwise direction 531 in which commutator assembly member 484 is employed (FIG. 5e, 6d, 17).

Referring momentarily to FIG. 19d, at the conclusion of the winding of the first pole group of coils 525 and after removal of the rear pin assembly 61 therefrom and raising of the inner pin group 356 of the front pin assembly 45 with the coils forming the pole group 525 thereon, but prior to indexing, the first pole group of coils 525 is positioned as shown in solid lines. The front pin assembly 45 is indexed, as above described, in the direction shown by the arrow 532 to the diametrically opposite position with the first pole group of coils 525 then being in the position shown in dashed lines at 525a.

As indicated, completion of the indexing of the front pin assembly 45 accompanied by rotation of the program cams 437 through 441 results in program cam 437 actuating limit switch 443 to initiate a new winding cycle for winding the second pole group of coils 526. This cycle proceeds identically to the above-described cycle of operations performed in winding the first pole group of coils 525, with the following exceptions: pin group 357 of the front pin assembly 45 now cooperates with the rear pin assembly 61, it being observed with reference to FIG. 5a that with the front pin assembly 45 rotated and the pin group 356 with the coils of the first pole group 525 thereon raised to their uppermost position (provided to permit flyer 108 to rotate beneath pin group 356), flyer 108 now rotates in the counterclockwise direction as shown by the arrow 531, the initial starting point of flyer 108 being position 108a, as shown in FIG. 19c, that being the point at which flyer 108 was stopped at the conclusion of the winding of the outer coil 523 of the first pole group 525 by the commutator 482 as above described. However, commutator 484 is active during winding of the second pole group of coils 526 and acts to stop the flyer 108 on the other side of the axis 266 in the position shown at 108d in FIG. 19e at the conclusion of the winding of each coil 511, 520, 522, 523 of the second pole group of coils 526.

After the outer coil 523 of the second pole group 526 has been fully wound and the flyer 108 stopped at position 108d, it will be observed that a length of wire 512c extends from the flyer 108 to one of the pins 219. Program cam 437 in conjunction with limit switch 443 then provides a signal to actuate cylinder 300 thereby to position lever member 292 and the cut-off and clamping assembly 299 so that the upper portion 318a of the cut-off and clamping head 318 engages the length of wire 512c, then pulling the same in the direction 527 into the opening 333 in plate 325 so that the sharp edges 335, 337 cooperate to cut-off the wire, as at 533 leaving end 534 of the pole group 526, with the portion 318a thus clamping free end 506 of the wire 154 against clamping block 330. It will now be observed by comparing FIGS. 19a and 19e that the conditions which prevailed immediately prior to commencing the winding of the first pole group 525 have been restored, i.e., flyer 108 is in the position 108d and the free end 506 of the wire 154 is clamped against clamping portion 330 by the upper portion 318a of the cut-off and clamping head 318.

At the conclusion of the winding of the fourth coil 523 of the second pole group 526, rear pin assembly 61 is again retracted, clamping fingers 410 are closed thereby to retain the coils on the pin group 357, pin group 357 is raised to its upper position, and the winding assembly 43 is raised to its uppermost position and then lowered to its lowermost position, as at the conclusion of the winding of the coils of the first pole group 525 (FIGS. 2, 5a).

Lowering of the winding assembly 43 to its lowermost position again causes stop 497 to actuate limit switch 488 (FIG. 6c) which, with program cam 440 and limit switch 446 set up an unloading circuit which may be manually actuated by the operator by means of an "unload" switch or automatically actuated by a limit switch 598 at the inserter (FIG. 25) indicating that an unwound stator core member is properly positioned on the inserter fingers 34. This unloading signal actuates cylinder 462 to retract the pivot arm shot pin 460 to release the arm 47, thereby actuating limit switch 465 which actuates the pivot arm drive motor 470 thereby pivotally to move the arm 47 in the direction shown by the arrow 535 from its winding position to its inserting position in which the axis 56 of the front pin assembly 45 is in alignment with the axis 35 of the inserter fingers 34. Limit switch 477 is actuated when the arm 47 approaches the inserting position (FIG. 2, 3, 11a, 18, 19e).

It will be observed in FIG. 19e that at the winding location, the pole groups of coils 525, 526 were symmetrically disposed with respect to axis 266 on either side of the front pin axis 56. In the illustrated embodiment, the pivotal motion 535 of the arm 47 from its winding to its inserting position is 90° and thus, at the inserting location, the pole groups of coils 525, 526 are symmetrically disposed about an axis 536 extending through the axis 35 of the inserter fingers 34 and parallel with axis 266 (FIG. 19f). In the illustrated embodiment, the inserter 31 is provided with twenty-four inserter fingers 34 equally spaced about a circle 543 having axis 35 and adapted respectively to engage the inner ends of the teeth of a twenty-four slot stator core member (not shown). Inspection of FIGS. 19f and 19g will reveal that the inserter fingers 34 are arranged with the axis 536 passing between respective pairs of the inserter fingers.

Referring now particularly to FIGS. 19b and 19g, it is necessary that the side portions 516, 517 of the end portion 515 of each coil extend substantially radially inwardly between respective pairs of inserter fingers 34 with the end portion 518 being disposed within the circle 543 of inserter fingers. For this reason, it is necessary that the portions 516, 517 of each coil of each pole group lie substantially on radials of the circle 543 of inserter fingers which, in turn, dictates that the outer pins 358 through 376 and the inner pins 363 through 379 of each group 356, 357 of the front pin assembly 45, which respectively lie on concentric inner and outer circles 540, 542, respectively lie substantially on radials thereof having the same angular spacing as the radials of the circle 543 of inserter fingers upon which the inserter fingers respectively lie.

Still referring specifically to FIGS. 19f and 19g, with the particular geometry of the apparatus of the illustrated embodiment, which is dictated by the requirement that the apparatus be employed for generating and inserting two, four or six pole groups of coils, with the illustrated embodiment in which the front pin assembly 45 is arranged for generating two pole groups, it will be seen by particular reference to FIG. 19f that when the arm 47 rotates the front pin assembly 45 to its inserting position, the portions 516, 517 of the end portions 515 of the coils will lie in radial alignment with the inserter fingers 34, thus inhibiting transfer of the coils to the inserter fingers. This conditions, however, is not found in certain other coil arrangements including the four pole arrangement of coils.

For this reason, i.e., rotational misalignment of the pins of the front pin assembly 45 with respect to the inserter teeth, it is necessary in the case of the illustrated embodiment to further rotate the front pin assembly 45 in the direction shown by the arrow 537 by an additional 7½°, as shown at 538, thereby to bring the portions 516, 517 of the end portions 515 of the coils into radial alignment with the spaces 539 between the inserter fingers 34, as shown in FIG. 19g.

It will be observed by reference to FIGS. 19f and 19g that the concentric circles 540, 542 upon which the large and small pins of the front pin assembly 45 respectively lie are concentric with and respectively larger and smaller than the circle 543 upon which the inserter fingers 34 lie.

This additional 7½° rotational movement of the front pin assembly 45 is provided by the shot pin 456 actuated by the cylinder 458 and which, upon engagement with the respective notch 355 in the positioning member 352, performs a wedging function thereby to rotate the front pin assembly 45 by the requisite angular amount (FIG. 4). Thus, when the limit switch 477 is closed in response to the arm 47 approaching the inserting position (FIGS. 4 and 11a), cylinder 457 is actuated to retract shot pin 455 and cylinder 458 is actuated to extend shot pin 456 to engage a respective notch 355 and thereby to provide the requisite 7½° of rotation of the front pin assembly 45 (FIGS. 4, 19f, 19g). Additionally, cylinder 53 is actuated to retract its piston rod 55 thereby to move the post 51, the pivot arm 47 and the front pin assembly 45 with the pole groups of coils 525, 526 thereon, downwardly so that the pins of the front pin assembly partially overlap and embrace the inserter fingers 34 (FIGS. 2, 19g, 21).

As the post 51 together with the pivot arm 47 and the front pin assembly 45 approaches its lowermost position, limit switch 479 is actuated (FIG. 11b) thereby actuating cylinders 402, 405 so as to move actuating rods 415, 416 and slides 413, 414 downwardly to open the clamping fingers 409, 410, and cylinder 404 is actuated thereby to move actuating rods 422, 423 downwardly thereby moving the stripper members 419, 420 downwardly to push the coils of the pole groups 525, 526 downwardly off of the pins of the front pin assembly 45 onto the inserter fingers 34 (FIGS. 5a, 5b, 6a, 7, 19g, 21). This downward movement of the bridging members 426, 427 connected to the upper ends of the actuating rods 422, 423 actuates limit switch 428 (FIGS. 4, 6a), which, in turn, actuates cylinder 53 to extend its piston rod 55 and thereby move the post 51, pivot arm 47 and the front pin assembly back to its uppermost position. When the post 51 and the arm 47 reach the uppermost position, limit switch 544 is actuated which actuates the pivot arm drive motor 470 in the opposite direction to pivotally move arm 47 and the front pin assembly 45 from the inserting position back to the winding position. Movement of the arm 47 away from the inserting position deactuates the limit switch 477 which actuates cylinder 458 to retract shot pin 456 and actuates cylinder 457 to extend the shot pin 455 to engage a respective notch 354 thereby to rotate the position member 352 and the front pin assembly 45 back to its initial position. Actuation of limit switch 477 further deactuates cylinders 402, 405 thereby to close the clamping fingers 409, 410 and deactuates cylinder 404 so that the springs 424, 425 move the actuating rods 422, 423 and the stripper members 419, 420 upwardly to their uppermost positions. When the pivot arm 47 reaches its winding position, limit switch 464 is actuated thereby actuating cylinder 462 to extend shot pin 460 into the opening 463 in the portion 459 of arm 47 which, in turn, actuates limit switch 465 to restore the system to its initial condition (FIGS. 2, 3, 4, 5a, 5b, 6a, 7, 11a, 11b, 18). The apparatus is now ready for initiation of a new cycle of winding and coil transfer.

SECOND EMBODIMENT

The coil generating apparatus and method of the invention are not restricted to the generation of dynamoelectric machine field coils and the transfer of such coils to the fingers of coil insertion apparatus but may be employed for the generation of other types of coils having a desired number of turns, such as transformer coils and the like. Referring now to FIGS. 22 and 23, there is shown a second embodiment of the invention adapted continuously to generate coils, like elements being indicated by like reference numerals and similar elements by the same reference numeral prefaced by the numeral "1" or "11."

Here, the winding assembly 1143 comprises wobble plate assembly 1105 and flyer 108. A pair of wire pusher block members 1106, 1107 are provided spaced on opposite sides of the axis 44 and respectively connected to pusher block mounting members 1195, 1196 which, in turn, are respectively coupled to wobble plate 193 (FIG. 5c) by actuating pins 197, 198. Flyer 108 is rotated and the wobble plate 193 actuated to impart reciprocal movement in the direction shown by the arrows 104 to the pusher blocks 1106, 1107 by the same apparatus and in the same manner as described above in connection with the previous embodiment.

Two pairs of pins 552, 553 and 554, 555 are provided respectively associated with the wire pusher blocks 1106, 1107 and each having a distal end 556 and a lower end 557. In this embodiment, each of the pins 552 through 555 extends downwardly through an opening 551 in the respective wire pusher block 1106, 1107 and has its lower end 557 secured in a suitable opening 558 in plate member 1184 of the wobble plate assembly 1105. It will now be observed that the pins 552 through 555 extend upwardly from the plate member 1184 in spaced parallel relationship with the winding axis 44 and with their distal ends 556 spaced above the winding plane 148. Particular reference to FIG. 22 will reveal that the pins 552 through 555 are disposed in a pattern so as to define end portions 560, 562 and side portions 563, 564 of the turns of the coil 559.

Generation of the coil 559 is accomplished in the same manner as that described above in connection with the first embodiment of the apparatus and method of the invention. Rotation of the flyer 108 winding turns of the wire 154 around the pins 552 through 555 is accompanied by alternate reciprocal movement of the wire pusher blocks 1106, 1107 so that each turn, as it is wound, is pushed upwardly on the pins in the direction 519 so that each successive turn is wound in the space vacated by the previous turn and in turn pushes previously wound turns upwardly on the pins toward their distal ends.

It will now be seen that with the apparatus and method of the second embodiment, a coil having an infinite number of turns and infinite axial length may be continuously generated. It will be seen that the pins 552 through 555 may be of any desired length and that individual coils having the desired number of turns and axial length may be cut off from the endless coil continuously generated by rotation of the flyer 108 and reciprocal motion of the wire pusher blocks 1106, 1107.

AUTOMATIC STATOR PRODUCTION

As previously indicated, the coil generating apparatus of the invention, integrated with coil insertion apparatus, lends itself to further integration with transfer apparatus to transfer unwound stator core members to the coil insertion apparatus, and thereafter to transfer fully wound stator core members from the coil insertion apparatus, thereby permitting complete automation. Referring now to FIGS. 24 and 25 in which like elements are again indicated by like reference numerals, a conventional conveyor 565 is driven in the direction shown by the arrow 566 by conventional drive motor 567 for conveying unwound stator core members 568 to the transfer apparatus 569. Suitable stator orientation apparatus 570 is provided for properly rotationally orienting the stators 568 on the conveyor 565. A selectively actuable gate 572 is provided for restraining the stators 568 on the conveyor 565 and for selectively releasing one unwound stator core member to the transfer apparatus 569 at the proper time.

Transfer apparatus 569 comprises a member 573 mounted on the piston rod 574 of a suitable hydraulic cylinder 575 which is mounted for rotation by a suitable bearing 576 and arranged for selective rotation by means of gears 577 driven by motor 578.

Member 573 has stator-receiving slots 579, 580 formed in its opposite ends, each of the slots 579, 580 being defined by arms 582, 583 having inward extending flange portions 584 for supporting a stator in the respective slots 579, 580. Suitable solenoids 585, 586 are provided in the member 573 adjacent the slots 579, 580 for magnetically attracting an unwound stator core member 568 from the conveyor 565 and moving it into the respective slot 579, 580. Suitable hydraulic cylinders 587, 588 are also provided in the member 573 and respectively having piston rods 589, 590 communicating with the slots 579, 580 and adapted, when extended, to eject a wound stator core member 592 from the respective slot onto conventional conveyor 593. The unloading conveyor 593 is driven by a conventional motor 594 in the direction shown by the arrow 595.

Suitable limit switches 596, 597 are mounted on the member 573 and respectively sense the presence and absence of a stator core member in the respective slot 579, 580. Drive motor 578 is selectively actuable to rotate cylinder 575 and the member 573 from the position shown in solid lines in FIG. 24 to the position at right angles thereto, as shown in dashed lines 573a with the respective slot 579, 580 in axial alignment with the axis 35 of the circle of inserter fingers 34 of the coil insertion apparatus 31. Actuation of cylinder 575 lowers the member 573, when in its position 573a to a lower position, as shown at 573b in FIG. 25, in which the stator core member 568 is properly positioned over the inserter fingers 34. A limit switch 598 senses the presence of the member 573 in its lower, rotated position 573b. Cams 599, 600 are driven by the drive motor 578 and have limit switches 602, 603 associated therewith for respectively providing signals in response to the two rotational positions of the arm 573.

In operation of the fully automatic system, limit switches 598 and 602 sense positioning of the transfer member 573 in its lower unloading position, as shown in dashed lines 573b in FIGS. 24 and 25, and thus, in conjunction with limit switch 488 (FIG. 6c) provide a signal to actuate drive motor 472 to rotate pivot arm 47 from its winding position to its inserting position, which is followed by transfer of the coils from the front pin assembly 45 to the inserter fingers 34, and return of the arm 47 to its winding position, all as above described. Return of the arm 47 to its winding position is accompanied by actuation of shot pin 460 and limit switch 465 (FIG. 18) which, as above described, initiates a new coil generating cycle. Actuation of limit switch 465, together with actuation of limit switch 604 indicating that the transfer member 573 is in its upper, loading and unloading position, and limit switch 596 indicating that a slot 579, 580 is vacant, actuates gate 572 and the respective solenoid 585, 586 to permit one unwound stator core member 568 to be moved off of the conveyor 565 into the respective slot 579, 580. When this unwound stator core member 568 is properly seated in the respective slot 579, 580, the respective limit switch 596, 597 is actuated which, in turn, actuates the drive motor 578 to rotate the transfer member 573 to its coil inserter position 573a, limit switch 603 then actuating hydraulic cylinder 575 to lower the member 573 to its lower position 573b with the unwound stator core member 568 then suitably positioned on the inserter fingers 34. Limit switch 598 senses positioning of member 573 in its lower position 573b and actuates the inserter mechanism 31 to insert the coils in the stator core member 568. Limit switch 544 (FIG. 11a) provides a signal when the arm 47 has been raised to its upper position, thus indicating that the coil insertion operation has been completed which again actuates cylinder 575 to raise the member 573 to its upper position and actuates drive motor 578 to rotate the member 573 in the direction shown by the arrow 605 to bring the wound stator core member into alignment with the conveyor 593. Limit switches 602, 604 sense this positioning of the member 573 and actuate the respective cylinder 587, 588 to extend the respective piston rod 589, 590, thereby to eject the fully wound stator 592 onto the belt 593. Meanwhile, another unwound stator core member 568 is being transferred into the slot 579, 580 at the other end of the member 573 and the transfer cycle is repeated, as above described.

While there have been described above the principles of this invention in connection with specific apparatus, it is to be clearly understood that this description is made only by way of example and not as a limitation to the scope of the invention.

What is claimed is:

1. The method of forming a multi-turn, single layer coil from an elongated strand, said coil being of the type in which each turn has the same configuration and dimensions as adjacent turns, comprising the steps of: winding one turn of said strand on longitudinally extending coil form means having a substantially uniform transverse cross-sectional shape proportioned to form said configuration and dimensions, said coil form means having a distal end, said winding being in a plane transverse to said coil form means adjaecnt said distal end, and fixed with respect thereto, said coil form means extending longitudinally in one direction from said plane; moving said one turn longitudinally on said coil form means in said one direction; winding a second turn of said strand on said coil form means in said plane; relatively moving said coil form means longitudinally in said one direction with respect to said plane thereby to move said distal end away from said plane, and removing said turns from said coil form means longitudinally in the direction opposite said one direction.

2. The method of forming a multi-turn, single layer coil from an elongated strand, said coil being of the type in which each turn has the same configuration and dimensions as adjacent turns, comprising the steps of: continuously and successively winding turns of said strand on longitudinally extending coil form means having a substantially uniform transverse, cross-sectional shape proportioned to form said configuration and dimensions, said winding being in a plane transverse to said coil form means, and fixed with respect thereto, said coil form means extending longitudinally in one direction generally normal to said plane; pushing each turn as it is wound to move the same longitudinally on said coil form means in said one direction whereby the next successive turn is wound in the space vacated by the preceding turn, each turn which is so moved longitudinally on said coil form means pushing previously wound turns to move the same longitudinally on said coil form means in said one direction thereby to form said coil; relatively moving a second longitudinally extending coil form means longitudinally with respect to said plane to a position to intersect said plane, said second form means in said position surrounding said first-named coil form means and said coil thereon, said second coil form means having a substantially uniform transverse cross-sectional shape proportioned to form a second coil concentric with said first coil, said second coil form means in said position extending longitudinally in said one direction; and similarly forming said second coil on said second coil form means.

3. The method of claim 2 wherein said first-named coil form means has a distal end, wherein said second coil form means surrounds said first coil form means and has a distal end longitudinally spaced from said distal end of first coil form means thereby to expose a portion thereof, wherein said plane initially intersects said exposed portion of said first coil form means during forming of said first coil, and wherein said second coil form means is relatively moved longitudinally with respect to said plane so that a portion thereof adjacent said distal end intersects said plane for forming said second coil.

4. The method of claim 3 wherein said one direction extends away from said distal ends, and comprising the further steps of initially relatively moving said exposed portion of said first coil form means longitudinally with respect to said plane to intersect said plane prior to forming of said first coil; relatively moving both of said coil form means longitudinally with respect to said plane in said one direction thereby to move both of said distal ends away from said plane following forming of both of said coils; and removing both of said coils longitudinally from said distal ends of said form means.

5. The method of claim 4 comprising the further steps of moving said coil form means with said coils thereon to a different location prior to said removing step.

6. The method of claim 2 wherein said strand is payed-out from a supply during the forming of said coils, and comprising the further step of pulling-out from said source a predetermined length of slack in said strand following the forming of said first coil and prior to winding the first turn of said second coil thereby to provide a connection between said first and second coils.

7. The method of claim 4 wherein said plane is movable in said one direction, said plane being initially moved by a first increment in said one direction so as to intersect said exposed portion of said first coil form means for forming said first coil, said plane being further moved by a second increment in said one direction so as to intersect said portion of said second coil form means for forming said second coil.

8. The method of claim 7 wherein both of said coil form means are longitudinally moved in unison in said one direction so as to move both of said distal ends away from said plane following forming of both of said coils, and wherein said coils are removed by pushing longitudinally in the direction opposite from said one direction.

9. The method of forming multi-turn, single layer dynamoelectric machine field coils from an elongated wire, said wire being payed-out from a source, said coils being of the type in which each turn has the same configuration and dimensions as adjacent turns, each said turn having first and second opposite end portions, comprising the steps of: securing the free end of said wire, continuously and successively winding in a first direction turns of said wire on longitudinally extending coil form means having at least first and second cooperative parts defining a uniform transverse cross-sectional shape proportioned respectively to form said first and second end portions, said winding being in a plane transverse to said coil form means and fixed with respect thereto, said coil form means having an initial position extending longitudinally in one direction generally normal to said plane; pushing each turn as it is wound on said coil form means to move the same longitudinally on said coil form means whereby the next successive turn is wound in the space vacated by the preceding turn, each turn which is so moved longitudinally on said form means pushing previously wound turns to move the same longitudinally on said form means in said one direction thereby to form a said coil; moving said first coil form means part to another position to remove the same from said coil form thereby freeing said first end portions of the turn of said coil, moving said second coil form means part with said coil thereon to a different location; and removing said coil longitudinally from said second coil form means part.

10. The method of claim 9 wherein said steps of moving said second coil form means part comprises first rotating said second coil form means part a partial turn, and then moving said second coil form means part to said different location.

11. The method of claim 9 wherein said coil form means comprises at least first, second and third parts, said second and third parts being substantially identical and being movable between a first position in which said second part cooperates with said first part to form said first and second end portions of the turns of a first coil, and a second position in which said third part cooperates with said first part to form said first and second end portions of the turns of a second coil; wherein said step of moving said second coil form means part comprises moving the same to said second position thereof; and comprising the further steps of returning said first coil form means part to said initial position thereof; similarly forming a second coil on said first and third coil form means parts; moving said first coil form means part to said other position thereby freeing said first end portions of the turns of said second coil; and simultaneously removing both of said coils longitudinally from said second and third coil form means parts.

12. The method of claim 11 wherein said winding step in forming said second coil is in the direction opposite said first direction.

13. The method of claim 11 wherein both of said second and third coil form means parts with said coils thereon are moved to yet another location prior to said coil removing step.

14. The method of claim 11 comprising the further steps of, prior to moving said first coil form means part to said other position upon completion of forming of said first coil, releasing said free end of said wire, pulling-out a length of wire from said source, severing said wire intermediate said length thereby leaving an end extending from said coil and a new free end extending from said source, and securing said new free end.

15. The method of claim 13 wherein said second and third coil form means are rotatable about a longitudinal axis thereby to move between said first and second positions, and comprising the further step of rotating said second and third coil form means parts with said first and second coils thereon by a predetermined angular amount prior to said removal step.

16. The method of forming multi-turn single layer dynamo electric machine field coils from an elongated wire and transferring the coils to the upstanding fingers of coil insertion apparatus, said coils being of the type in which each turn has the same configuration and dimensions as adjacent turns, said fingers being disposed on a circle about and parallel with a first axis, comprising the steps of: continuously and successively winding turns of said wire on a first part of coil form means, said winding being in a plane transverse to and about a second axis in spaced parallel relationship with said first axis, said plane being fixed with respect to said first coil form means part, said coil form means having a second part and being rotatable about a third axis parallel with said first and second axes, each of said coil form parts extending longitudinally parallel with said axes; pushing each turn as it is wound longitudinally on said first coil form means part ot move the same longitudinally away from said plane on said first part whereby each successive turn is wound in the space vacated by the preceding turn, each turn which is so moved longitudinally on said first part pushing previously wound turns to move the same longitudinally on said first part away from said plane thereby to form a first coil; rotating said coil form means with said first coil on said first part about said third axis by a predetermined angular amount; similarly forming a second coil on said second coil forming means part; moving said coil forming means with said coils thereon to another position with said third axis coincident with said first axis; and pushing said coils longitudinally from said coil form means onto said fingers.

17. The method of claim 16 comprising the further step of further rotating said coil forming means with said coils thereon about said third axis by an additional predetermined angular amount following forming of said second coil and prior to said last-named coil pushing step.

18. Apparatus for forming a multi-turn, single layer coil comprising: longitudinally extending coil form means having a substantially uniform, coil-defining, transverse cross-sectional configuration throughout its length; means for winding an elongated strand of material on said coil form means in a plane transverse to said coil form means and fixed with respect thereto; means for moving each turn so wound longitudinally on said coil form means in one direction away from said plane whereby each successive turn is wound on said coil form means in the space vacated by the preceding turn, said coil form means having a distal end and an opposite end, and further comprising means for mounting said coil form means at said opposite end thereof, said coil form means normally intercepting said plane adjacent said distal end, said one direction being toward said opposite end, said coil form means extending longitudinally away from said mounting means whereby a completed coil is removed from said distal end in the direction opposite to said one direction.

19. Apparatus for forming a multi-turn, single layer coil comprising: longitudinally extending coil form means having a substantially uniform, coil-defining, transverse cross-sectional configuration throughout its length; means for winding an elongated strand of material on said coil form means in a plane transverse to said coil form means and fixed with respect thereto; means for moving each turn so wound longitudinally on said coil form means in a direction away from said plane whereby each successive turn is wound on said coil form means in the space vacated by the preceding turn, said coil form means having first and second parts each having a distal end and an opposite end, said second part surrounding said first part, and means for moving said first and second parts longitudinally relatively with respect to said plane between first and second positions, said first coil form means part intercepting said plane in said first position whereby a first coil is formed thereon, said second coil form means part intercepting said plane in said second position whereby a second coil concentric with said first coil is formed thereon.

20. The apparatus of claim 19 further comprising means for mounting said opposite ends of said coil form means parts, said second part being longitudinally shorter than said first part thereby exposing a portion of said first part adjacent said distal end thereof, said exposed portion intercepting said plane in said first position.

21. The apparatus of claim 20 wherein said mounting means is longitudinally spaced from said plane and said distal ends extend toward said plane, said direction being toward said mounting means.

22. The apparatus of claim 21 wherein said means for relatively longitudinally moving said coil form means parts comprises means for moving said winding means in said direction thereby moving said plane.

23. Apparatus for forming a multi-turn, single layer coil comprising: longitudinally extending coil form means having a substantially uniform, coil-defining, transverse cross-sectional configuration throughout its length, said coil form means being proportioned to form each turn of said coil with first and second opposite end portions; means for winding an elonagted strand of material on said coil form means in a plane transverse to said coil form means and fixed with respect thereto; means for moving each turn so wound longitudinally on said coil form means a direction away from said plane whereby each successive turn is wound on said coil form means in the space vacated by the preceding turn; and a frame; said winding means including flyer means mounted on said frame for rotation about an axis normal to said plane; said coil form means extending substantially normal to said plane; said moving means including means for pushing each said turn longitudinally on said form in said direction away from said plane whereby each turn which is so moved pushes previously wound turns on said form in said direction, said pushing means being mounted on said flyer means and operated thereby in response to rotation thereof, and means connecting said frame to said pushing means for preventing rotation thereof; said pushing means comprising first and second pushing members spaced apart on opposite sides of said axis, said flyer means including a hollow drive shaft coaxial with said axis with means for rotatably mounting the same on said frame and a flyer arm extending radially from said shaft for winding said turns on said coil form means in said plane, an actuating member mounted on said shaft, said pushing members being operatively coupled to said actuating member, a restraining member extending through said flyer shaft and having opposite ends, first means coupling one end of said restraining member to said pushing members and second means coupling the other end of said restraining member to said frame for restraining rotation of said pushing members, said actuating member including means for imparting reciprocal longitudinal movement to said pushing members between outer and inner positions in response to rotation of said shaft, said actuating member being positioned on said shaft so that when said pushing members and flyer arm are generally in radial alignment, the pushing member remote from said arm is in its outer position and the pushing member adjacent said arm is in its inner position whereby the remote pushing member pushes the first end portion of one turn in said direction as said flyer arm is winding the second end portion of the same turn, and pushes the second end portion of said one turn in said direction as said flyer arm is winding the first end portion of the next successive turn.

24. The apparatus of claim 23 wherein said first coupling means comprises a plate member secured to said one end of said restraining member and having guide openings therein spaced on opposite sides of said axis, said pushing members being disposed on one side of said plate member and said actuating member on the other, and push rods respectively extending through said plate member openings and respectively connecting said pushing members to said actuating member.

25. The apparatus of claim 23 wherein said flyer shaft has a longitudinal strand passage therein eccentric with respect to said axis and having opposite ends adjacent said arm and said other shaft end, respectively, for supplying said strand to said arm; and further comprising means coaxial with said axis and longitudinally spaced from said other end of said flyer shaft for guiding said strand from a source to said other end of said passage, and drive means on said flyer shaft for rotating the same; said second coupling means comprising cam means on said flyer shaft, and cam follower means cooperatively engaging said cam means and having diametrically opposite radial projections thereon whereby rotation of said flyer shaft and cam means cause said projections to reciprocate radially between opposite extreme positions, said frame having a portion surrounding said cam follower means with opposite openings therein in alignment with said axis so that one of said projections in one extreme position thereof is seated in one of said openings while the other projection is spaced from the other opening, said cam follower means being spaced from said frame portion with said other end of said strand passage communicating with said space whereby said strand passes through said space from said guide means to said other end of said passage, said cam means being positioned on said flyer shaft so that one of said projections is seated in one of said openings thereby holding said restraining member against rotation while said strand is passing the other projection.

26. The apparatus of claim 23 wherein said reciprocal motion imparting means comprises a journal portion of said shaft having its axes defining an angle with said first-named axis, said actuating member being rotatably mounted on said journal portion whereby rotation of said shaft imparts a longitudinal wobbling motion to said actuating member.

27. Apparatus for forming a multi-turn, single layer coil comprising: longitudinally extending coil form means having a substantially uniform, coil-defining, transverse cross-sectional configuration throughout its length; means for winding an elongated strand of material on said coil form means in a plane transverse to said coil form means and fixed with respect thereto; means for moving each turn so wound longitudinally on said coil form means a direction away from said plane whereby each successive turn is wound on said coil form means in the space vacated by the preceding turn; and a frame, said winding means including flyer means mounted on a drive shaft for rotation about an axis normal to said plane, first means mounting said shaft on said frame for axial movement of said shaft and flyer means between first and second positions, said coil form means being normal to said plane and having first and second parts each having a distal end and an opposite end, said second coil form means part surrounding said first part, second means for mounting said opposite ends on said frame with said opposite ends remote from said plane, said second part being longitudinally shorter than said first part thereby exposing a portion of said first part adjacent said distal end thereof, said plane intercepting said exposed portion of said first part in said first position of said shaft mounting means thereby to form a first coil on said first part, said plane intercepting said second part adjacent said distal end in said second position of said shaft mounting means thereby to form a second coil on said second part concentric with said first coil.

28. The apparatus of claim 27 wherein said second mounting means includes means for transferring said coil forming means parts with said coils thereon to a position spaced from said flyer means; and further comprising means for longitudinally removing said coils from said distal ends of said parts.

29. The apparatus of claim 28 wherein said transferring means comprises a transfer member movably mounted on said frame, said opposite ends of said coil form means parts being mounted on said transfer member, said transfer member being movable from a first position with said coil form means parts in winding relationship with said flyer to a second position laterally spaced therefrom.

30. The apparatus of claim 27 wherein said second mounting means includes means for longitudinally moving said coil forming means parts from a first position in winding relationship with said flyer to a second position with said distal ends longitudinally spaced from said plane when in said second shaft position.

31. The apparatus of claim 27 wherein said second mounting means includes an arm having opposite ends, means for mounting said opposite ends of said coil forming means parts on said arm adjacent one end thereof, means for pivotally mounting said arm adjacent the other end thereof on said frame for movement in a plane parallel with and longitudinally spaced from said first-named plane between a first position with said distal ends of said coil forming means parts extending toward said flyer means and in winding relation therewith and a second position with said parts laterally spaced from said flyer means, said last-named mounting means including means for longitudinally moving said coil form means parts between a protracted winding position and a retracted position, and stripping means mounted on said last-named mounting means for selectively longitudinally removing said coils from said distal ends of said coil from means parts.

32. The apparatus of claim 31 further comprising means for longitudinally moving said arm when in said second position thereof between transferring and coil-unloading positions.

33. Apparatus for forming a multi-turn, single layer coil comprising: longitudinally extending coil form means having a substantially uniform, coil-defining, transverse cross-sectional configuration throughout its length; means for winding an elongated strand of material on said coil form means in a plane transverse to said coil form means and fixed with respect thereto; means for moving each turn so wound longitudinally on said coil form means a direction away from said plane whereby each successive turn is wound on said coil form means in the space vacated by the preceding turn; said coil form means comprising first and second parts each having a distal end and opposite end, said parts having first positions with said distal ends intercepting said plane in winding relationship with said winding means for respectively forming opposite end portions of the coil formed thereon, and further comprising a first means for removing said first part from the coil formed thereon thereby freeing one of said end portions, and second means for moving said second part with said coil thereon to a second position spaced from said plane end winding means.

34. The apparatus of claim 33 wherein said coil form means parts are transversely spaced-apart in said first position with said opposite ends longitudinally spaced from said plane and said distal ends extending toward said plane, said first means including means for moving said first part transversely toward said second part and longitudinally away from said plane to a position with said distal end thereof free of the coil thereon, said second moving means including means for moving said second part longitudinally away from said plane and transversely to said second position thereof.

35. Apparatus for forming multi-turn, single layer dynamoelectric machine coils comprising: coil form means having at least first and second parts each having a distal end and an opposite end, said parts having at least first positions mutually forming a substantially uniform, coil defining, transverse cross-sectional configuration throughout their lengths, said first and second parts in said first positions respectively forming first and second end portions of a coil formed thereon; means for winding an elongated wire on said coil form means parts in said first positions thereof in a plane normal to and intercepting said parts and fixed with respect thereto, said opposite ends of said parts in said first positions being longitudinally spaced from said plane; means for pushing each turn of said wire as it is so wound on said parts in said first positions longitudinally on said parts in a direction away from said plane and toward said opposite ends whereby each successive turn is wound in the space vacated by previous turns and pushes previously wound turns in said direction; means for moving said first part to a second position removed from the coil wound thereon thereby freeing said first end portions thereof, and means for transferring said second part with said coil thereon to a second position in which said plane does not intercept said second part.

36. The apparatus of claim 35 wherein said transferring means includes second means for moving said second part longitudinally to an intermediate position in which said distal end thereof is longitudinally spaced from said plane in said direction, and means for rotating said second part a partial turn from said intermediate position to said second position.

37. The apparatus of claim 36 further comprising first means for mounting said opposite end of said first part, said first moving means being operatively connected to said first mounting means, and second means for mounting said opposite end of said second part, said second mounting means being mounted on said rotating means.

38. Apparatus for forming multi-turn, single layer dynamoelectric machine coils comprising: coil form means having at least first and second parts each having a distal end and an opposite end, said parts having at least first positions mutually forming a substantially uniform, coil-defining, transverse cross-sectional configuration throughout their lengths, said first and second parts in said first positions respectively forming first and second end portions of a coil formed thereon; means for winding an elongated wire on said coil form means parts in said first positions thereof in a plane normal to and intercepting said parts and fixed with respect thereto, said opposite ends of said parts in said first positions being longitudinally spaced from said plane; means for pushing each turn of said wire as it is so wound on said parts in said first positions longitudinally on said parts in a direction away from said plane and toward said opposite ends whereby each successive turn is wound in the space vacated by previous turns and pushes previously wound turns in said direction; said coil form means including a third part substantially identical to said second part and having distal and opposite ends, and further comprising means for interchanging the positions of said second and third parts whereby another coil may be formed on said first and third parts in said first positions thereof.

39. The apparatus of claim 38 further comprising first and second means for respectively mounting said opposite ends of said second and third parts, said interchanging means comprising means for rotating said mounting means and second and third parts a partial turn thereby to interchange said positions thereof.

40. The apparatus of claim 38 further comprising first and second means for respectively independently moving said third and fourth parts longitudinally from said first position to a second position in which said distal ends are spaced from said plane in said direction.

41. The apparatus of claim 39 further comprising means for moving said interchanging means and second and third parts with said coils thereon to an unloading position spaced-apart from said winding means.

42. The apparatus of claim 41 further comprising stripping means mounted on said moving means for longitudinally removing said coils from said distal ends of said second and third parts in the direction opposite said direction.

43. The apparatus of claim 39 further comprising means for further rotating said mounting means and second and third parts with said coils thereon by a predetermined angular amount.

44. Apparatus for forming multi-turn, single layer dynamoelectric machine coils comprising: coil form means having at least first and second parts each having a distal end and an opposite end, said parts having at least first positions mutually forming a substantially uniform, coil-defining, transverse cross-sectional configuration throughout their lengths, said first and second parts in said first positions respectively forming first and second end portions of a coil formed thereon; means for winding an elongated wire on said coil form means parts in said first positions thereof in a plane normal to and intercepting said parts and fixed with respect thereto, said opposite ends of said parts in said first positions being longitudinally spaced from said plane; means for pushing each turn of said wire as it is so wound on said parts in said first positions longitudinally on said parts in a direction away from said plane and toward said opposite ends whereby each successive turn is wound in the space vacated by previous turns and pushes previously wound turns in said direction; each of said first and second parts including at least first and second sections mutually cooperating in said first positions respectively to form at least first and second concentric coils, said second sections having distal ends and being longitudinally shorter than said first sections thereby exposing portions of said first sections adjacent said distal ends thereof; and further comprising means for longitudinally moving said first and second parts when in said first position thereof relatively with respect to said plane between a first winding position with said exposed portion of said first section intercepting said plane thereby to form said first coil on said first sections, and a second winding position with said section intersecting said plane thereby to form said second coil on said second section.

45. The apparatus of claim 44 further comprising means for guiding said wire from a source thereof to said winding means, and means for pulling-out a predetermined length of said wire from said source at a point intermediate said winding means and said first section of said coil form means parts thereby to form a connection between said first and second coils.

46. The apparatus of claim 38 wherein said winding means includes rotatable flyer means, means for guiding said wire from a source thereof to said flyer means, said wire having a free end on the side of said flyer means remote from said guiding means, means for selectively securing said free end of said wire during forming of said first-named coil, means for pulling-out a predetermined length of said wire at a point intermediate said flyer means and said coil form means parts in said first position, said securing means including means for severing said length of wire and for securing the new free end thereof during forming of said other coil.

47. The apparatus of claim 46 further comprising drive means for selectively rotating said flyer means in opposite directions, said drive means rotating said flyer means in one direction during forming of said first named coil and in the opposite direction during forming of said other coil.

48. Apparatus for forming multi-turn, single layer dynamoelectric machine coils comprising: coil form means having at least first and second parts each having a distal end and an opposite end, said parts having at least first positions mutually forming a substantially uniform, coil-defining, transverse cross-sectional configuration throughout their lengths, said first and second parts in said first positions respectively forming first and second end portions of a coil formed thereon; means for winding an elongated wire on said coil form means parts in said first positions thereof in a plane normal to and intercepting said parts and fixed with respect thereto, said opposite ends of said parts in said first positions being longitudinally spaced from said plane; means for pushing each turn of said wire as it is so wound on said parts in said first positions longitudinally on said parts in a direction away from said plane and toward said opposite ends whereby each successive turn is wound in the space vacated by previous turns and pushes previously wound turns in said direction; said first part comprising at least two elongated, spaced parallel pins arranged in a pattern to form said first coil end portions, said second part being laterally spaced from said first part thereby forming side portions of a coil formed thereon, said second part having a first section comprising at least two elongated, spaced, parallel pins and a second section comprising at least one elongated pin spaced from said first section pins on the side thereof remote from said first part and parallel with said first section pins, all of said pins being parallel in said first positions of said parts, said second part pins being arranged in a pattern to form said second coil end portions with side sections respectively joined to said coil side portions and converging to and joining an end section.

49. The apparatus of claim 48 wherein said winding means is rotatable about a first axis, all of said pins in said first positions of said coil form parts being parallel with said first axis, said first and second parts being spaced on opposite sides of said first axis on a second axis lying in said plane, said two first part pins being spaced on opposite sides of said second axis on a third axis lying in said plane and normal to said second axis, said two first section pins being spaced on opposite sides of said second axis on a fourth axis lying in said plane and normal to said second axis, there being two second section pins spaced on opposite sides of said second axis on a fifth axis lying in said plane and normal to said second axis, said fifth axis being spaced from said fourth axis on the side thereof remote from said first axis, said second section pins being spaced-apart by a distance less than the spacing of said first section pins.

50. Apparatus for forming multi-turn, single layer dynamoelectric machine coils comprising: coil form means having at least first and second parts each having a distal end and an opposite end, said parts having at least first positions mutully forming a substantially uniform, coil-defining, transverse cross-sectional configuration throughout their lengths, said first and second parts in said first positions respectively forming first and second end portions of a coil formed thereon; means for winding an elongated wire on said coil form means parts in said first positions thereof in a plane normal to and intercepting said parts and fixed with respect thereto, said opposite ends of said parts in said first positions being longitudinally spaced from said plane; means for pushing each turn of said wire as it is so wound on said parts in said first positions longitudinally on said parts in a direction away from said plane and toward said opposite ends whereby each successive turn is wound in the space vacated by previous turns and pushes previously wound turns in said direction; said first and second coil forms means parts respectively comprising a plurality of elongated, spaced pins, said pins being parallel in said first positions of said parts and being arranged in a pattern to define said coils; and further comprising means for inserting coils in the slots of a dynamoelectric machine stator core member and including a plurality of elongated, spaced, parallel finger members arranged on a circle and having distal ends extending in one direction; and means for moving at least one of said parts with a coil thereon to a second position with said pins of said one part parallel with said fingers, and with the distal ends of said pins of said one part extending in the direction opposite said one direction and having at least a portion adjacent said distal ends radially closely spaced from respective ones of said finger members whereby said coil may be transferred axially from said pins onto said fingers.

51. The apparatus of claim 49 wherein said first and second section pins respectively lie on first and second concentric circles having a sixth axis; and further comprising means for inserting coils in the slots of a dynamoelectric machine stator core member and including a plurality of elongated, spaced, parallel finger members arranged on a third circle having a seventh axis and having distal ends extending in one direction, said third circle having a radius greater than that of said second circle and less than that of said first circle, first means for moving said first part to a second position with said pins thereof removed from the coil wound thereon; and second means for moving said second part with said coil thereon to a second position with said sixth axis coincident with said seventh axis, and with the distal ends of said first and second section pins extending in the direction opposite said one direction and having at least a portion adjacent said distal ends in radial alignment with and closely spaced from respective ones of said finger members whereby said coil may be transferred axially from said pins onto said fingers.

52. The apparatus of claim 51 wherein said second moving means further comprises means for rotating said second part a predetermined angular amount thereby to bring said first and second section pins into radial alignment with said respective ones of said finger members.

53. Apparatus for forming at least first and second pole groups of dynamoelectric machine coils, each group comprising at least first and second concentric, multi-turn, single layer coils, said apparatus comprising: a frame; a flyer winder; means for mounting said winder on said frame for rotation in a circular path about a first axis for winding wire to form turns of said coils in a plane normal to said axis; a rear coil form assembly comprising at least first and second groups of elongated pins with each group having at least two pins respectively having distal and opposite ends; first means for mounting said opposite ends of said first and second groups of pins with said pins extending in spaced parallel relationship therefrom, said first group of pins being longitudinally longer than said second group whereby a portion of each pin of the first group adjacent said distal end thereof projects beyond the pins of the second group; second means for mounting said first mounting means on said frame for selective movement between a first winding position with said first and second groups of pins parallel with said first axis and within a cylindrical space defined by said circle and with said distal ends extending toward said plane, and a second position spaced from said first position with said first and second groups of pins removed from the coils wound thereon; at least first and second front coil form assemblies each comprising at least third and fourth groups of elongated pins with each group having at least two pins respectively having distal and opposite ends and third means for respectively mounting said opposite ends of said third and fourth groups of pins with said pins extending in spaced parallel relationship therefrom, said third group of pins being longitudinally longer than said second group whereby a portion of each pin of the third group adjacent said distal end thereof projects beyond the pins of the fourth group; fourth means for respectively mounting said third mounting means of said front coil form assemblies in adjacent relationship for independent, parallel selective movement between a first extended and a second retracted position with said pins of said third and fourth groups extending in parallel relationship; fifth means for mounting said fourth mounting means and said front coil assemblies on said frame for selective movement between a first active position with said third and fourth groups of pins of said front coil form assemblies parallel with said first axis and with said distal ends extending toward said plane, and a second unloading position spaced from said active position; means for selectively rotating said fourth mounting means and said front coil form assemblies thereby to move each of said assemblies between first and second rotational positions; a selective one of said front coil form assemblies being in a winding position when in said first rotational position, said extended position, and in said active position thereof with said third and fourth groups of pins thereof being parallel with said first axis, laterally spaced from said rear coil form assembly and within said cylindrical space, and with said distal ends extending toward said plane, and respectively mutually forming with said first and second groups of pins concentric patterns defining said first and second concentric coils; means for relatively moving said front and rear coil form assemblies with respect to said flyer in a direction parallel with said axis from an initial position through an intermediate position to a final position, said plane in said initial position being axially spaced from said pins in said winding positions, said plane in said intermediate position intercepting said projecting portions of said first and third groups of pins in said winding positions and being fixed with respect thereto whereby said flyer winds turns of said first coil thereon, and said plane in said final position intercepting said projecting portions of said second and fourth groups of pins in said winding positions and being fixed with respect thereto whereby said flyer winds turns of said second coil thereon; and means for pushing each turn of said wire as it is wound axially on the respective groups of pins toward said opposite ends thereof whereby each successive turn of a respective coil is wound in the space vacated by a previous turn and pushes previously wound turns toward said opposite ends.

References Cited

UNITED STATES PATENTS

| | | |
|---|---|---|
| 1,187,827 | 6/1916 | Gibbs _____ 242—82 |
| 1,379,755 | 5/1921 | Francis _____ 140—92.2 |
| 1,396,033 | 11/1921 | Francis _____ 140—92.2 |
| 1,987,333 | 1/1935 | Geer _____ 140—92.2 |
| 2,736,346 | 2/1956 | Ammann _____ 140—92.2 |
| 2,927,744 | 3/1960 | Nye et al. _____ 242—82 |
| 3,093,339 | 6/1963 | Godderidge _____ 242—82 |
| 3,147,934 | 9/1964 | Godderidge _____ 242—82 |
| 3,193,913 | 7/1965 | Moore _____ 242—9 |
| 3,331,403 | 7/1967 | De Young _____ 140—92.1 |
| 3,346,021 | 10/1967 | Ross _____ 140—92.2 |

FOREIGN PATENTS 3,387,634  6/1968  Hilsenberg.

CHARLES W. LANHAM, Primary Examiner

E. M. COMBS, Assistant Examiner

U.S. Cl. X.R.

29—205, 596, 605; 242—7.09

PO-1050
(5/69)

UNITED STATES PATENT OFFICE
CERTIFICATE OF CORRECTION

Patent No. 3,481,372        Dated   December 2, 1969

Inventor(s)  Robert J. Eminger #12  -  C. L. Tyson #1

It is certified that error appears in the above-identified patent and that said Letters Patent are hereby corrected as shown below:

SPECIFICATION

Column 2, line 22, "for" should be --from--;
Column 4, line 19, "the" shoud be --its--;
Column 7, line 62, --84-- should be inserted after "assembly"
Column 9, line 22, "198, 198" should be --197, 198--;
Column 14, line 34, "ot" should be --to--;
Column 15, line 4, "gear" (second occurrence) should be --gearing--;
Column 16, line 11, "inserted" should be --inserter--;
Column 18, line 19, the closing parenthesis after "107" should follow "107a";
Column 19, line 58, "soil" should be --coil--;
Column 21, lines 70 and 71, should be --position 108a (Figs. 19b, 19c) at the conclusion of the winding of each coil 511, 520, 522, 5 and thus,--
Column 25, line 23, "conditions" should be --condition--;

CLAIMS

Claim 1, line 58, "adjaecnt" should be --adjacent--;
Claim 3, line 28, after "of" insert --said--;
Claim 16, line 11, "ot" should be --to--;
Claim 23, line 15, "elonagted" should be --elongated--;
Claim 44, line 29, before "section" insert --second--;
Claim 50, line 35, "mutully" should be --mutually--.

SIGNED AND
SEALED
SEP 29 1970

(SEAL)
Attest:

Edward M. Fletcher, Jr.
Attesting Officer

WILLIAM E. SCHUYLER, JR.
Commissioner of Patents